United States Patent
Chen et al.

(10) Patent No.: US 12,253,707 B2
(45) Date of Patent: Mar. 18, 2025

(54) LIGHT GUIDE ELEMENT AND BACKLIGHT MODULE

(71) Applicant: Coretronic Corporation, Hsin-Chu (TW)

(72) Inventors: Ying-Hsiang Chen, Hsin-Chu (TW); Cheng-Yi Tseng, Hsin-Chu (TW); Chung-Yang Fang, Hsin-Chu (TW); Ping-Yen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 75 days.

(21) Appl. No.: 18/183,118

(22) Filed: Mar. 13, 2023

(65) Prior Publication Data

US 2023/0305215 A1    Sep. 28, 2023

(30) Foreign Application Priority Data

Mar. 25, 2022 (CN) .......................... 202210305170.5

(51) Int. Cl.
*F21V 8/00* (2006.01)
(52) U.S. Cl.
CPC .................. *G02B 6/0043* (2013.01)
(58) Field of Classification Search
CPC .............. G02B 6/0036; G02B 6/0043
See application file for complete search history.

(56) References Cited

U.S. PATENT DOCUMENTS

| | | | |
|---|---|---|---|
| 7,330,315 B2* | 2/2008 | Nilsen | G02B 5/045 |
| | | | 362/337 |
| 10,379,268 B2* | 8/2019 | Wang | G02B 5/045 |
| 2010/0085771 A1* | 4/2010 | Lin | G02B 6/0043 |
| | | | 362/606 |
| 2011/0267694 A1* | 11/2011 | Shiau | G02B 6/0053 |
| | | | 359/599 |

FOREIGN PATENT DOCUMENTS

| | | |
|---|---|---|
| CN | 200976055 | 11/2007 |
| TW | I286225 | 9/2007 |
| TW | M331675 | 5/2008 |
| TW | I707166 | 10/2020 |

* cited by examiner

*Primary Examiner* — Fatima N Farokhrooz
(74) *Attorney, Agent, or Firm* — JCIPRNET

(57) ABSTRACT

A backlight module includes a light guide element including first optical microstructures and second optical microstructures. An angle value of an angle of the first optical microstructures is V1. When the second optical microstructures are respectively recessed into or protrude from a bottom surface, a projection of each sub-optical microstructure on a reference plane has a peak point closest or to farthest from a light emitting surface and a first valley point and a second valley point farthest from or closest to the light emitting surface, a height difference between the peak point and the first valley point or the second valley point is ΔH, a length difference between the peak point and the first valley point or the second valley point is ΔL, and $\tan^{-1}(\Delta H/\Delta L)$ is V2, where V2>0 and V2≤0.5·V1.

23 Claims, 61 Drawing Sheets

130rE (130E)  130rE (130E)

1301

130rK (130K)

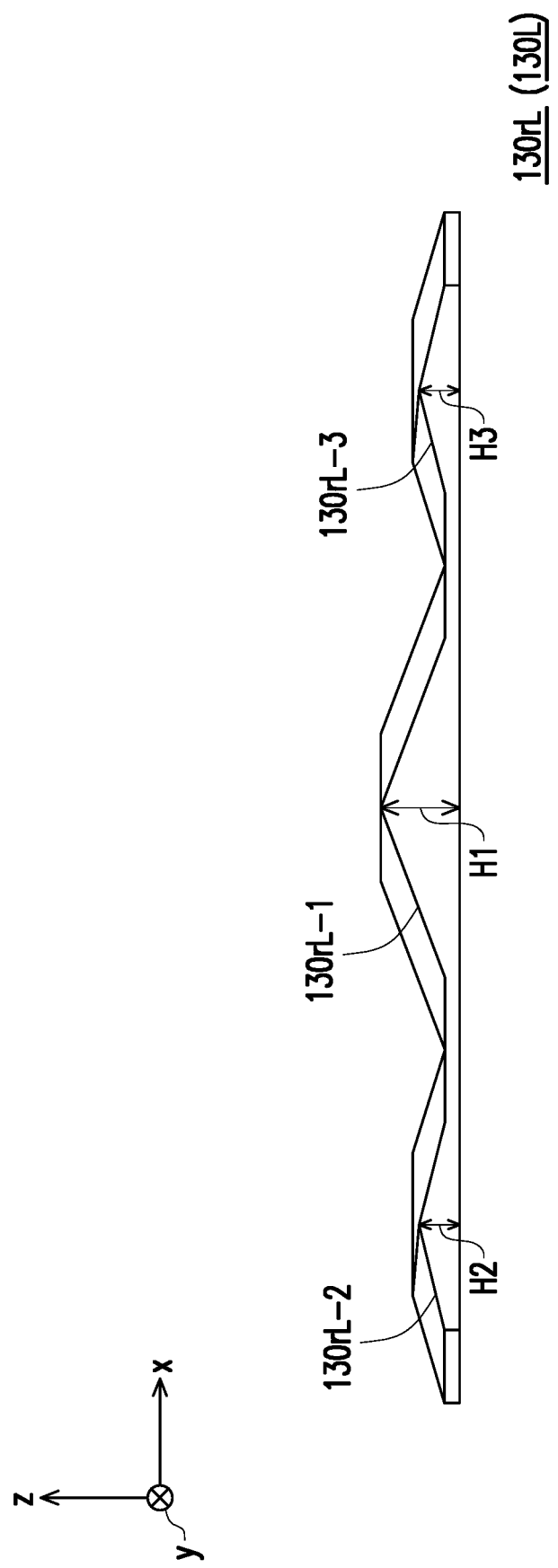

130rQ (130Q)

LIGHT GUIDE ELEMENT AND BACKLIGHT MODULE

CROSS-REFERENCE TO RELATED APPLICATION

This application claims the priority benefit of Chinese application no. 202210305170.5, filed on Mar. 25, 2022. The entirety of the above-mentioned patent application is hereby incorporated by reference herein and made a part of this specification.

BACKGROUND

Technical Field

The invention relates to a light guide element and a back light module.

Description of Related Art

In an existing side incident type backlight module, a light incident surface of a light guide plate receives a light beam from a light-emitting element. After the light beam enters the light guide plate, total internal reflection of the light beam is destroyed by optical microstructures disposed on a lower surface of the light guide plate, and the light beam emits from an upper surface of the light guide plate. Generally, in order for a light output distribution to be more uniform, more optical microstructures are arranged at a place far away from the light incident surface of the light guide plate. Namely, an arrangement density of the optical microstructures is relatively high at the place far away from the light incident surface of the light guide plate, and the arrangement density of the optical microstructures is relatively low at a place close to the light incident surface of the light guide plate. At the place where the arrangement density of the optical microstructures is relatively low, it is likely that a reflective sheet under the light guide plate is adsorbed to a main body of the light guide plate, resulting in an adverse phenomenon (for example, slight whitening at a position where the reflective sheet leans against the light guide element) of the backlight module.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The invention is directed to a light guide element, which is adapted to mitigate a problem of adsorption with a reflective sheet.

The invention is directed to a backlight module, which uses the above light guide element, and is less likely to have an adverse phenomenon caused by adsorption of a reflective sheet and the light guide element.

Other objects and advantages of the invention may be further illustrated by the technical features broadly embodied and described as follows.

In order to achieve one or a portion of or all of the objects or other objects, an embodiment of the invention provides a light guide element including a main body, a plurality of first optical microstructures and a plurality of second optical microstructures. The main body has a bottom surface, a light emitting surface opposite to the bottom surface, and a light incident surface connected between the light emitting surface and the bottom surface. The plurality of first optical microstructures are recessed into or protrude from the bottom surface. Each of the first optical microstructures has a first surface and a second surface. When the first surface and the second surface form the first optical microstructures recessed into the bottom surface, the first surface is located between the light incident surface and the second surface. When the first surface and the second surface form the first optical microstructures protruding from the bottom surface, the second surface is located between the light incident surface and the first surface. A first acute angle is included between the first surface and the bottom surface, and the first acute angle is a first angle of the first optical microstructure, and an angle value of the first angle is V1. The plurality of second optical microstructures are recessed into or protrude from the bottom surface. At least one of the second optical microstructures is disposed between two adjacent first optical microstructures. The plurality of second optical microstructures include a plurality of sub-optical microstructures. When the plurality of second optical microstructures are recessed into the bottom surface, a projection of each sub-optical microstructure on a reference plane perpendicular to the light incident surface has a peak point closest to the light emitting surface and a first valley point and a second valley point farthest from the light emitting surface, the peak point is located between the first valley point and the second valley point, the first valley point is located between the light incident surface and the second valley point, a height difference between the peak point and the first valley point in a z-axis direction perpendicular to the bottom surface is $\Delta H$, a length difference between the peak point and the first valley point in a y-axis direction perpendicular to the light incident surface is $\Delta L$, and a value obtained by $\tan^{-1}(\Delta H/\Delta L)$ is V2, where V2>0 and V2≤0.5·V1 When the plurality of second optical microstructures protrude from the bottom surface, a projection of each sub-optical microstructure on the reference plane perpendicular to the light incident surface has a peak point farthest from the light emitting surface and a first valley point and a second valley point closest to the light emitting surface, the peak point is located between the first valley point and the second valley point, the first valley point is located between the light incident surface and the second valley point, a height difference between the peak point and the second valley point in the z-axis direction perpendicular to the bottom surface is $\Delta H$, a length difference between the peak point and the second valley point in the y-axis direction perpendicular to the light incident surface is $\Delta L$, and a value obtained by $\tan^{-1}(\Delta H/\Delta L)$ is V2, where V2>0 and V2≤0.5·V1.

In order to achieve one or a portion of or all of the objects or other objects, an embodiment of the invention provides a backlight module including the above-mentioned light guide element and a light-emitting element. The light-emitting element is arranged beside the light incident surface of the main body of the light guide element.

Based on the above description, the second optical microstructures allow enough air gaps existing between the light guide element and a reflective sheet, so as to avoid adsorption between the reflective sheet and the light guide element, thereby mitigating the adverse phenomenon caused by adsorption between the reflective sheet and the light guide element. In addition, since the value of $\tan^{-1}(\Delta H/\Delta L)$ calculated according to the height difference and the length difference between the peak point and the valley points of the projection of the second optical microstructure on the reference plane perpendicular to the light incident surface is less than or equal to a half of the angle value of the first angle of the first optical microstructure. Therefore, while using the second optical microstructures to mitigate the adverse phenomenon caused by adsorption between the reflective sheet and the light guide element, the arrangement of the second optical microstructures does not excessively affect a light output distribution of the backlight module.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 16C is a schematic side view of the sub-optical microstructure of the second optical microstructure according to an embodiment of the invention.

DESCRIPTION OF THE EMBODIMENTS

Figure 1A:
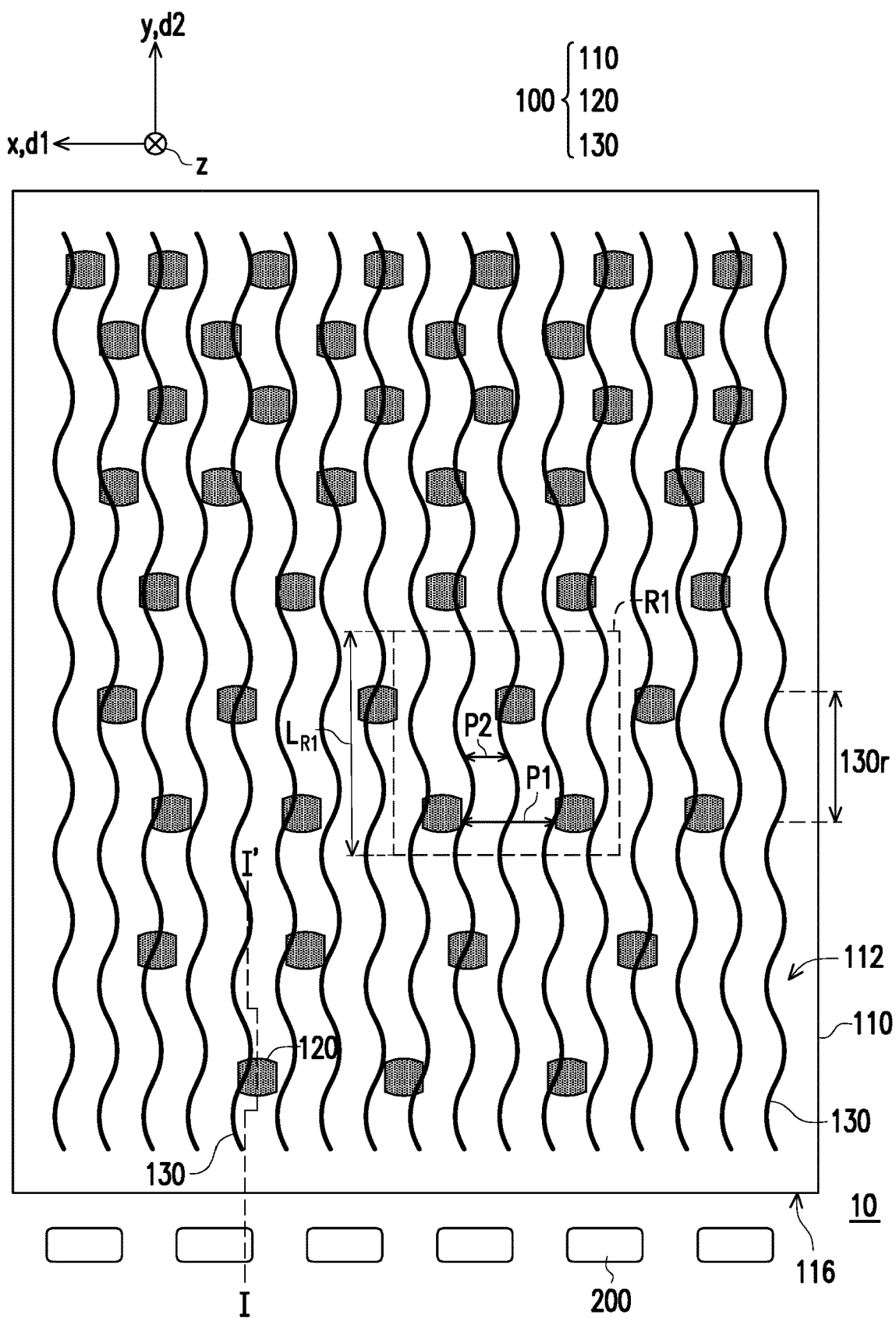
FIG. 1A is a schematic bottom view of a backlight module according to an embodiment of the invention.

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Reference will now be made in detail to exemplary embodiments of the invention, examples of which are illustrated in the accompanying drawings. Wherever possible, the same reference numbers are used in the drawings and description to refer to the same or like parts.

Figure 1B:
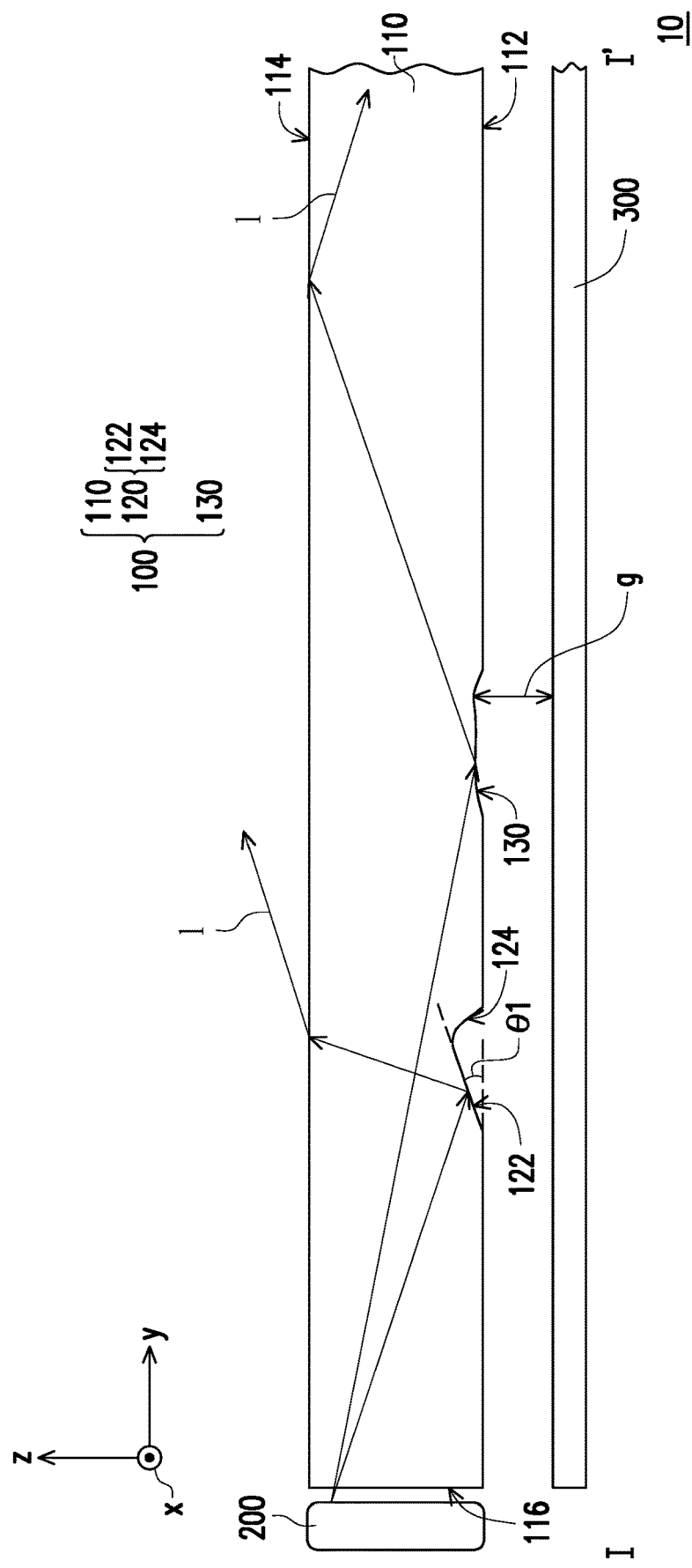
FIG. 1B is a schematic cross-sectional view of the backlight module according to an embodiment of the invention.

FIG. 1A is a schematic bottom view of a backlight module according to an embodiment of the invention. FIG. 1B is a schematic cross-sectional view of the backlight module according to an embodiment of the invention. FIG. 1B corresponds to a section line I-I' of FIG. 1A.

Referring to FIG. 1A and FIG. 1B, a backlight module 10 includes a light guide element 100. The light guide element 100 includes a main body 110. The main body 110 has a bottom surface 112, a light emitting surface 114 and a light incident surface 116. The light emitting surface 114 is opposite to the bottom surface 112. The light incident surface 116 is connected between the light emitting surface 114 and the bottom surface 112. The backlight module 10 further includes a light source 200, which is disposed beside the light incident surface 116 and configured to emit a light beam 1. In the embodiment, the light source 200 may include light-emitting diode elements. However, the invention is not limited thereto, and in other embodiments, the light source 200 may also include other types of light-emitting elements.

For clarity's sake, in each drawing, an x-axis direction x, the y-axis direction y and the z-axis direction z that are perpendicular to each other are drawn, where the x-axis direction x is parallel to the light incident surface 116 of the main body 110 of the light guide element 100, the y-axis direction y is perpendicular to the light incident surface 116 of the main body 110 of the light guide element 100, and the z-axis direction z is perpendicular to the bottom surface 112 of the main body 110 of the light guide element 100.

Figure 2A:
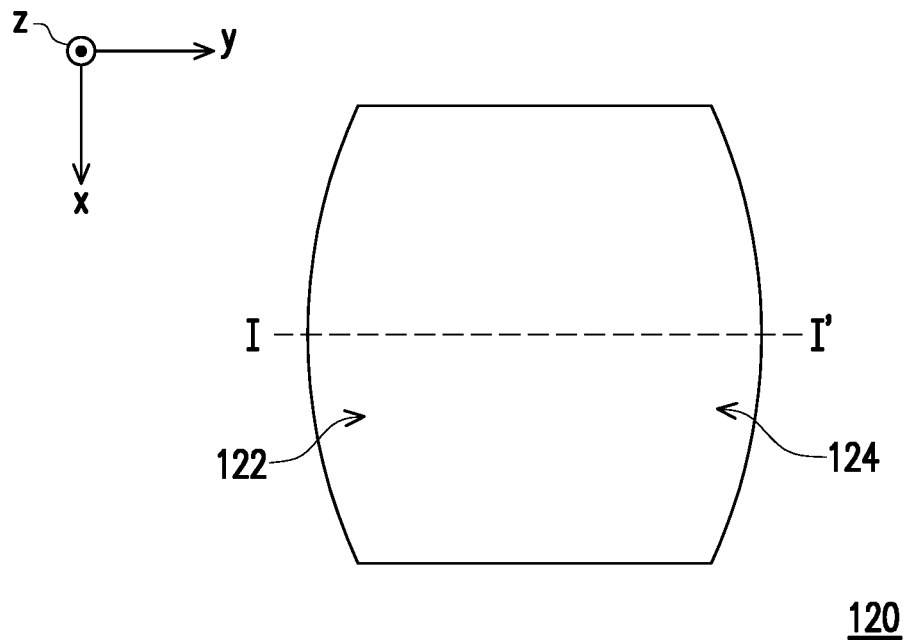
FIG. 2A is a schematic top view of a first optical microstructure according to an embodiment of the invention.
Figure 2B:
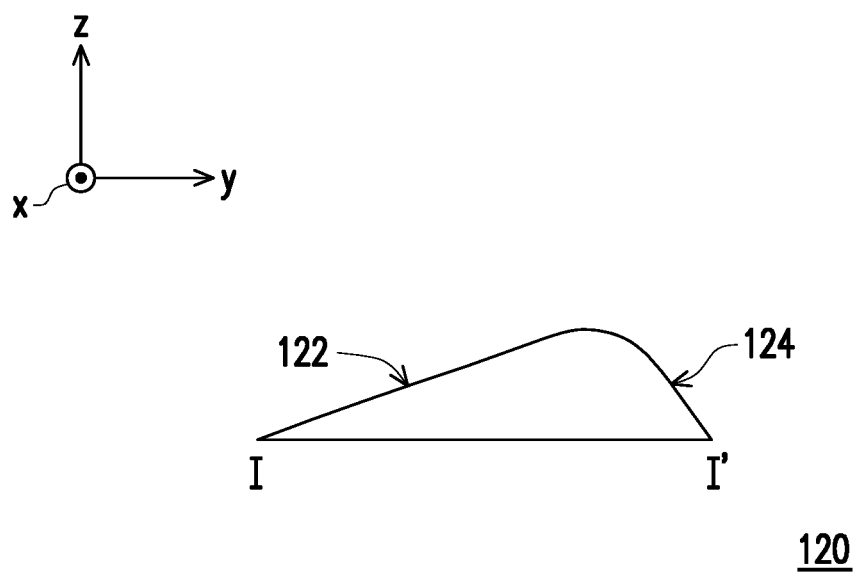
FIG. 2B is a schematic cross-sectional view of the first optical microstructure according to an embodiment of the invention.
Figure 2C:
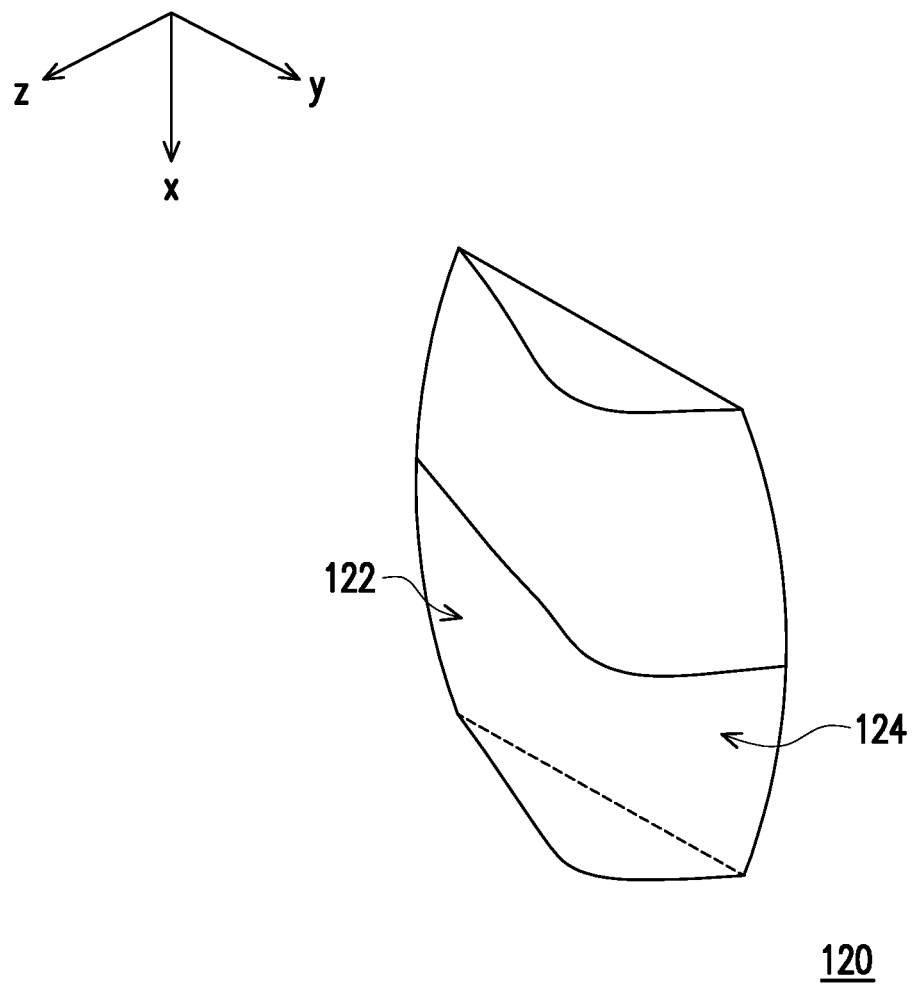
FIG. 2C is a schematic three-dimensional view of the first optical microstructure according to an embodiment of the invention.

FIG. 2A is a schematic top view of a first optical microstructure according to an embodiment of the invention. FIG. 2B is a schematic cross-sectional view of the first optical microstructure according to an embodiment of the invention. FIG. 2C is a schematic three-dimensional view of the first optical microstructure according to an embodiment of the invention. It should be noted that, for the convenience of illustration and description, the first optical microstructures 120 shown in FIG. 2A to FIG. 2C are shown as complementary to the first optical microstructure 120 shown in FIG. 1B.

Referring to FIG. 1A, FIG. 1B, FIG. 2A, FIG. 2B and FIG. 2C, the light guide element 100 further includes a plurality of first optical microstructures 120, which are recessed into or protrude from the bottom surface 112, where each first optical microstructure 120 has a first surface 122 and a second surface 124. In the embodiment, the first surface 122 and the second surface 124 may selectively form the first optical microstructures 120 recessed in the bottom surface 112, and the first surface 122 may be located between the light incident surface 116 and the second surface 124. However, the invention is not limited thereto. In other embodiments, the first surface 122 and the second surface 124 may also form a first optical microstructure protruding from the bottom surface 112, which will be described in the following paragraphs with reference of other drawings.

Referring to FIG. 1B, a function of the first optical microstructures 120 is to deflect the light beam 1 out of the light guide element 100. The light beam 1 is reflected at an interface between the first surface 122 and an environmental medium (for example, air), thus destroying the total internal reflection of the light beam 1 in the light guide element 100, so that the light beam 1 emits from the light emitting surface 114.

Referring to FIG. 1A and FIG. 2A, in the embodiment, an orthogonal projection of the first optical microstructure 120 on the bottom surface 112 may roughly present a barrel shape encircled by two arcs and two straight lines. However, the invention does not limit the shape of the first optical microstructure 120 as long as the first optical microstructure 120 may destroy the total internal reflection to make the light beam 1 to emit from the light emitting surface 114. In other embodiments, the first optical microstructure 120 may also have other shapes, which will be exemplified in the following paragraphs with reference of other drawings.

Figure 3A:
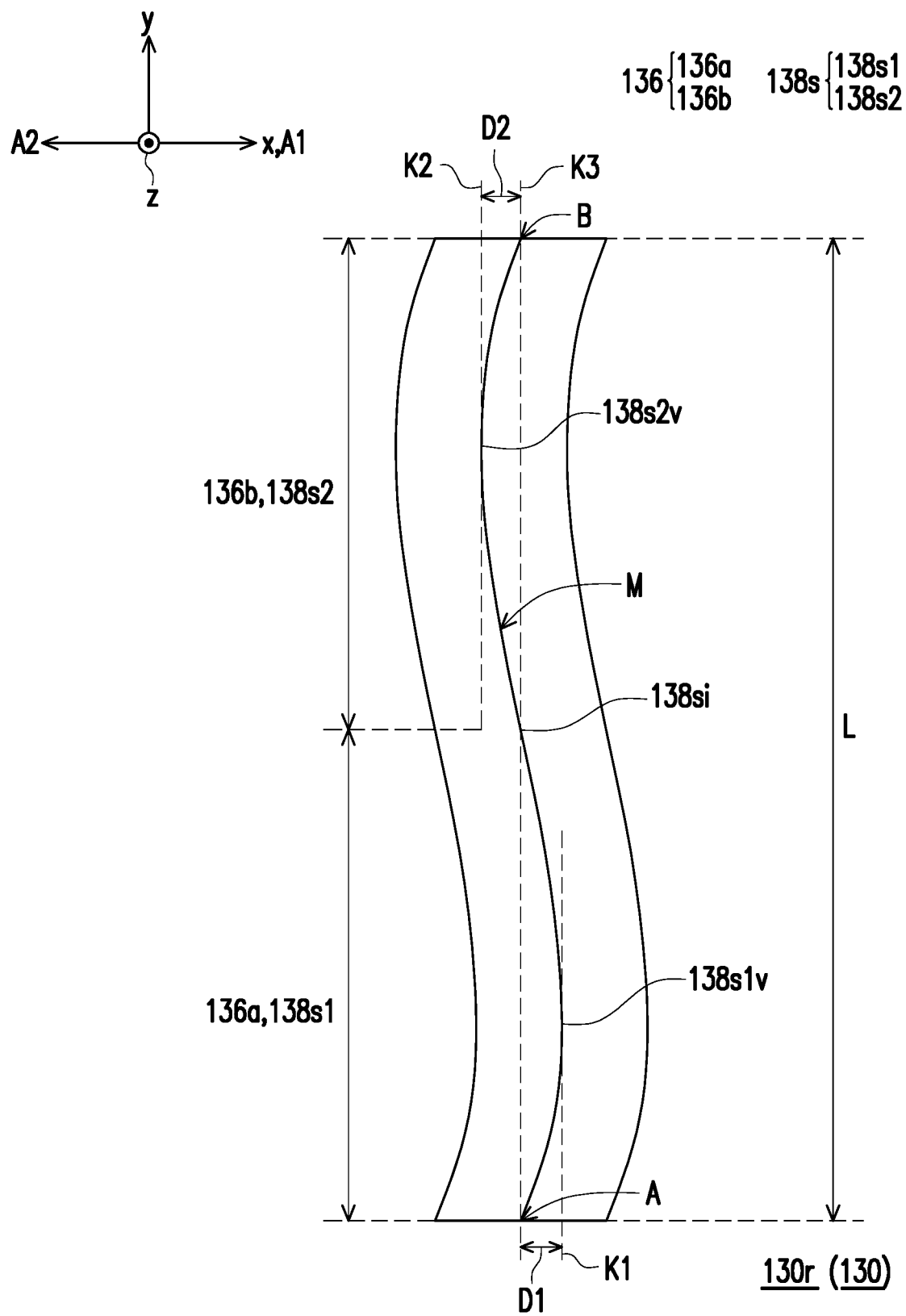
FIG. 3A is a schematic top view of a sub-optical microstructure of a second optical microstructure according to an embodiment of the invention.
Figure 3B:
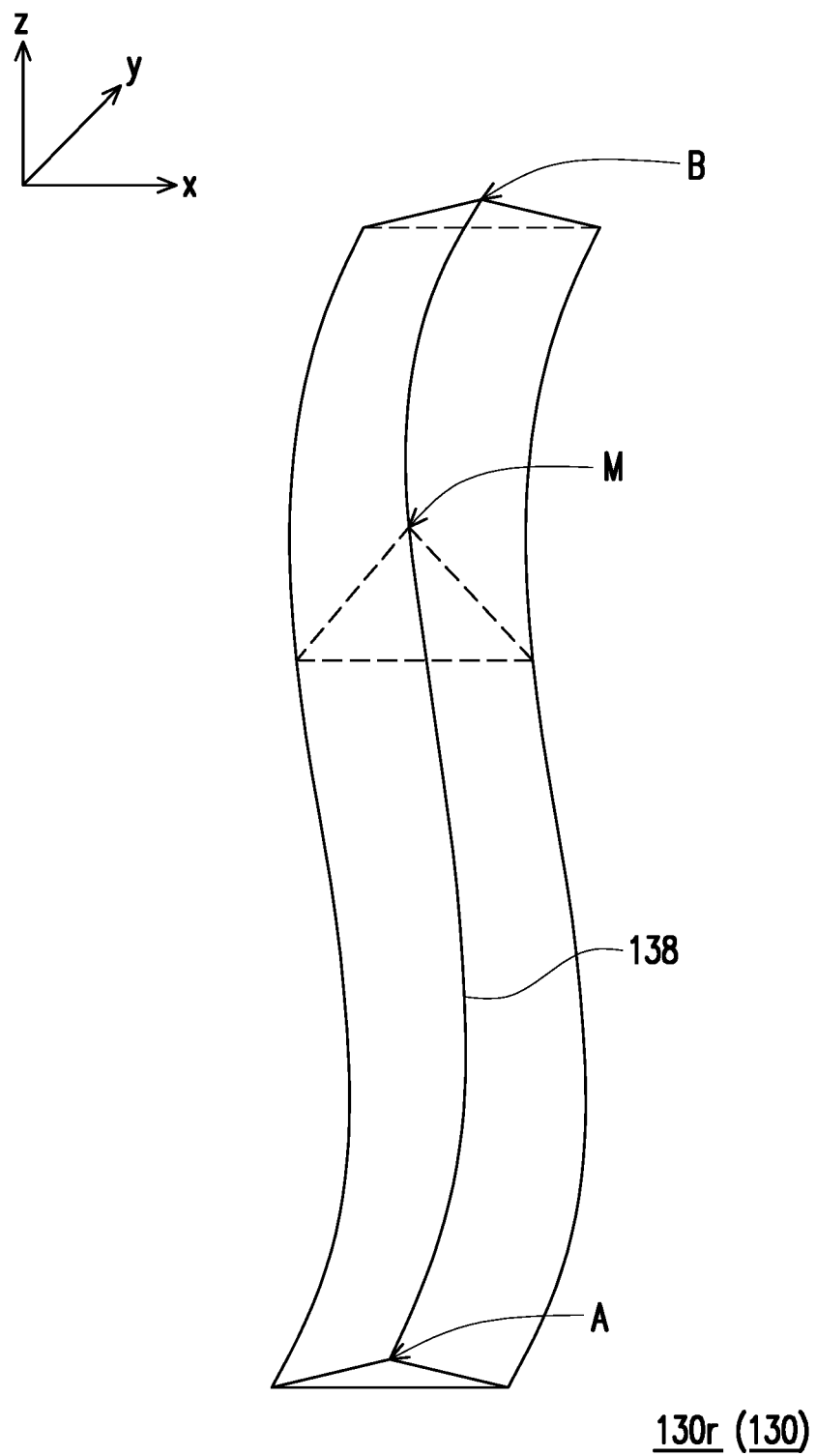
FIG. 3B is a schematic three-dimensional view of the sub-optical microstructure of the second optical microstructure according to an embodiment of the invention.
Figure 3C:
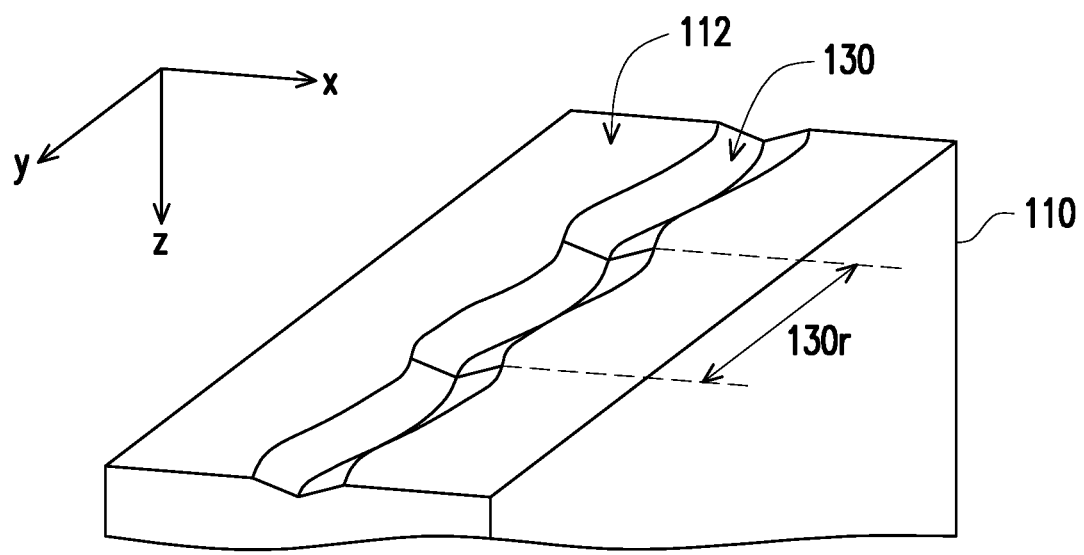
FIG. 3C is a schematic three-dimensional view of a part of a light guide element and a part of the second optical microstructure according to an embodiment of the invention.
Figure 3D:
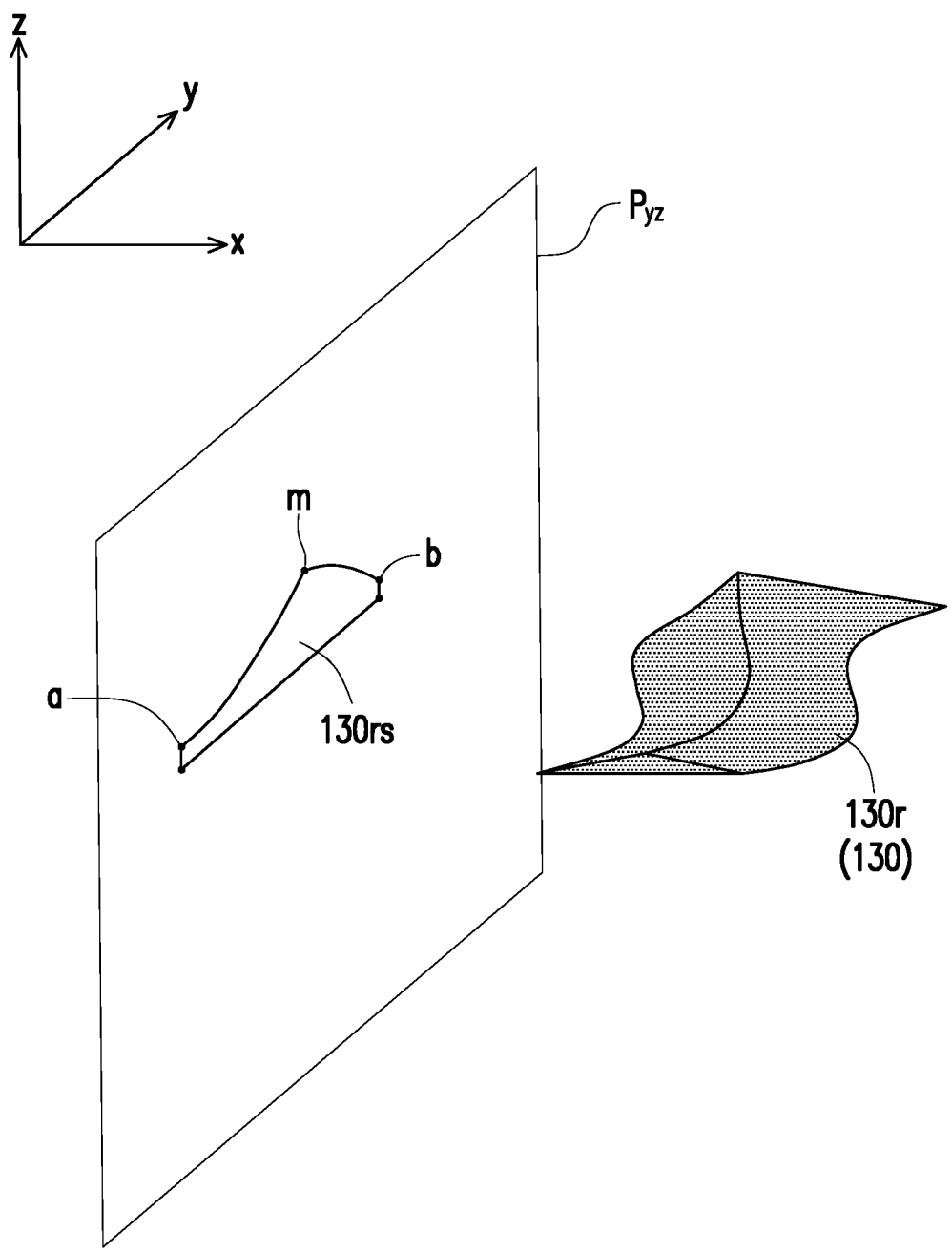
FIG. 3D illustrates the sub-optical microstructure of the second optical microstructure and a projection thereof on a reference plane according to an embodiment of the invention.
Figure 3E:
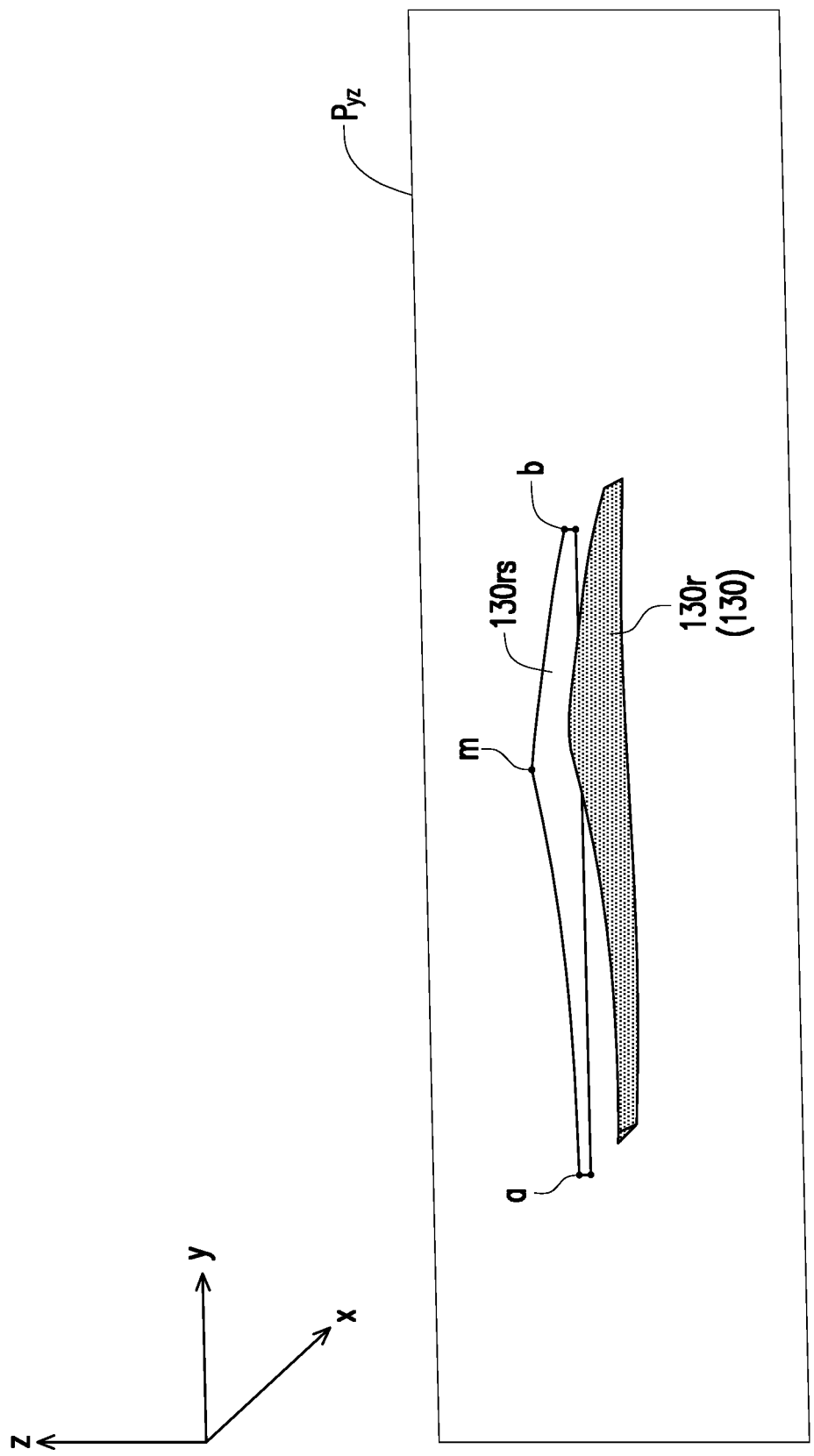
FIG. 3E illustrates the sub-optical microstructure of the second optical microstructure and a projection thereof on the reference plane according to an embodiment of the invention.
Figure 3F:
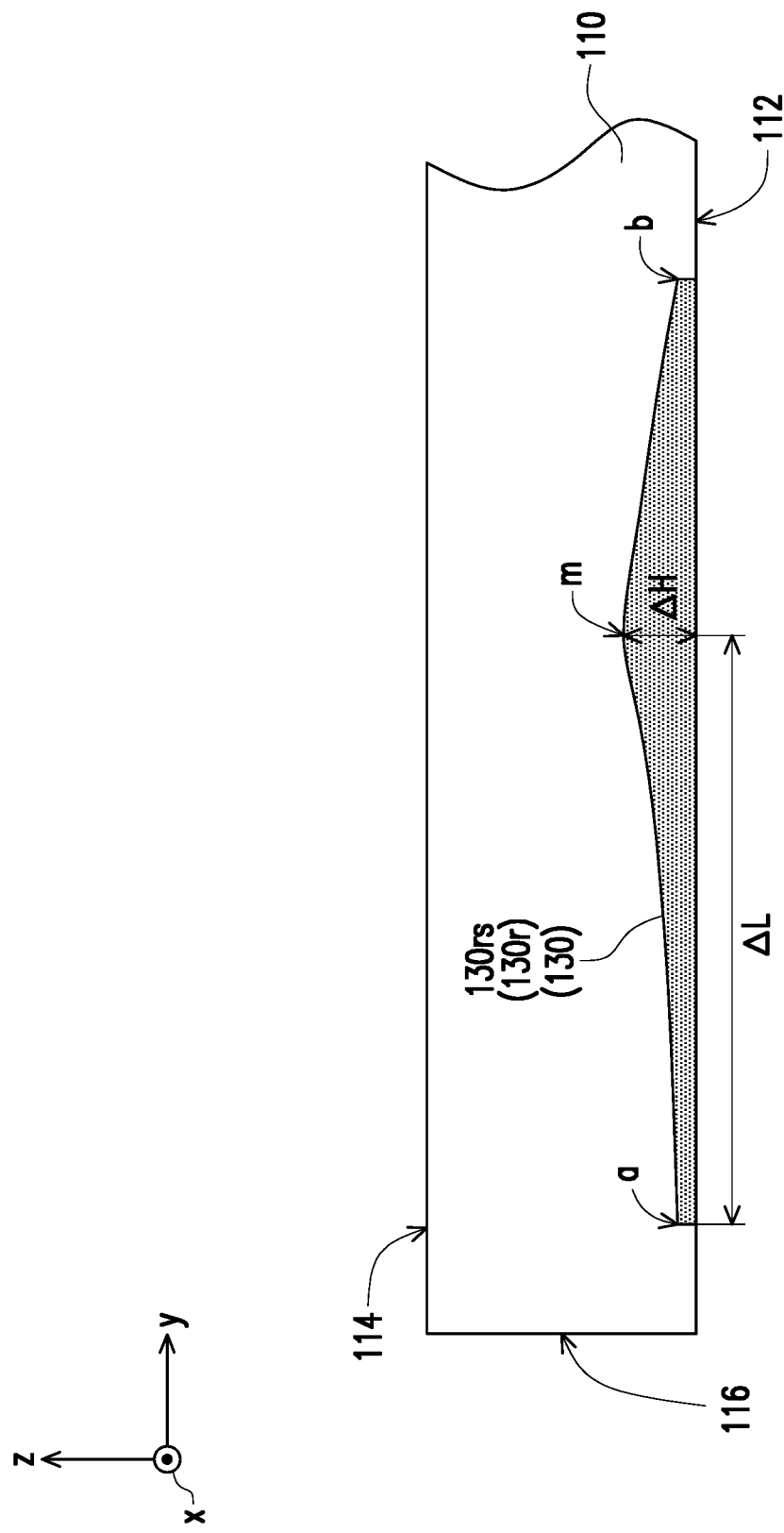
FIG. 3F illustrates a main body of the light guide element and a projection of the sub-optical microstructure of the second optical microstructure on the reference plane according to an embodiment of the invention.

FIG. 3A is a schematic top view of a sub-optical microstructure of a second optical microstructure according to an embodiment of the invention. FIG. 3B is a schematic three-dimensional view of the sub-optical microstructure of the second optical microstructure according to an embodiment of the invention. FIG. 3C is a schematic three-dimensional view of a part of the light guide element and a part of the second optical microstructure according to an embodiment of the invention. FIG. 3D illustrates the sub-optical microstructure of the second optical microstructure and a projection thereof on a reference plane according to an embodiment of the invention. FIG. 3E illustrates the sub-optical microstructure of the second optical microstructure and a projection thereof on the reference plane according to an embodiment of the invention. FIG. 3F illustrates a main body of the light guide element and a projection of the sub-optical microstructure of the second optical microstructure on the reference plane according to an embodiment of the invention. It should be noted that, for the convenience of illustration and description, the second optical microstructure 130 shown in FIG. 3A, FIG. 3B, FIG. 3D and FIG. 3E are shown as complementary to the second optical microstructure 130 shown in FIG. 1B.

Referring to FIG. 1A, FIG. 1B, and FIG. 3A to FIG. 3F, the light guide element 100 further includes a plurality of second optical microstructures 130, which are recessed into or protrude from the bottom surface 112. The plurality of second optical microstructures 130 include a plurality of sub-optical microstructures 130r. Referring to FIG. 1A, at least one second optical microstructure 130 is disposed between two adjacent first optical microstructures 120. In detail, in the embodiment, the bottom surface 112 has a square partition region R1, and a side length $L_{R1}$ of the partition region R1 is 20 mm. In the partition region R1, adjacent two of the plurality of first optical microstructures 120 have a first pitch P1, if the first pitch P1 is greater than 60 μm, at least one of the plurality of second optical microstructures 130 is disposed between the adjacent two of the plurality of first optical microstructures 120. In addition, in the embodiment, the plurality of second optical microstructures 130 are arranged in an arrangement direction d1, the plurality of sub-optical microstructures 130r of each second optical microstructure 130 are connected to each other in an extending direction d2, each of the sub-optical microstructures 130r extends in the extending direction d2, and the arrangement direction d1 and the extending direction d2 are intersected.

Referring to FIG. 1B and FIG. 3C, in the embodiment, the second optical microstructure 130 may be selectively recessed into the bottom surface 112 of the main body 110 of the light guide element 100. However, the invention is not limited thereto. In other embodiments, the second optical microstructure 130 may protrude from the bottom surface 112, which will be exemplified in the following paragraphs with reference of other drawings.

Referring to FIG. 1B, a first acute angle θ1 is included with the first surface 122 of the first optical microstructure 120 and the bottom surface 112 of the main body 110 of the light guide element 100, and the first acute angle θ1 is a first angle of the first optical microstructure 120, and an angle value of the first angle is V1, where V1>0. For example, in the embodiment, $0.5° \leq \theta1 \leq 30°$, i.e., $0.5 \leq V1 \leq 30$, but the invention is not limited thereto.

Referring to FIG. 1B and FIG. 3A to FIG. 3F, when the second optical microstructure 130 is recessed into the bottom surface 112, a projection 130rs (indicated in FIG. 3D, FIG. 3E and FIG. 3F) of each sub-optical microstructure 130r of the second optical microstructure 130 on a reference plane $P_{yz}$ perpendicular to the light incident surface 116 has a peak point m closest to the light emitting surface 114 and a first valley point a and a second valley point b farthest from the light emitting surface 114, the peak point m is located between the first valley point a and the second valley point b, and the first valley point a is located between the light incident surface 116 and the second valley point b. The reference plane $P_{yz}$ is, for example, a plane formed by the y-axis direction y and the z-axis direction z. The first valley point a, the peak point m, and the second valley point b shown in FIG. 3D and FIG. 3E respectively correspond to a point A, a point M, and a point B on a ridgeline 138 shown in FIGS. 3A and 3B.

Referring to FIG. 3F, a height difference between the peak point m and the first valley point a in the z-axis direction z perpendicular to the bottom surface 112 is ΔH, a length difference between the peak point m and the first valley point a in the y-axis direction y perpendicular to the light incident surface 116 is ΔL, and a value obtained by $\tan^{-1}(\Delta H/\Delta L)$ is V2, where V2>0 and $V2 \leq 0.5 \cdot V1$.

Referring to FIG. 1B, the backlight module 10 further includes a reflective sheet 300 disposed under the bottom surface 112 of the main body 110 of the light guide element 100. A function of the second optical microstructures 130 is to make the light guide element 100 to still have sufficient air gaps g between a low-density area of the first optical microstructures 120 and the reflective sheet 300, so as to prevent adsorption of the reflective sheet 300 to the light guide element 100. In addition, while avoiding the adsorption of the reflective sheet 300 and the light guide element 100, since $V2 \leq 0.5 \cdot V1$, the arrangement of the second optical microstructures 130 will not excessively affect a light output distribution of the backlight module 10. In detail, when the light beam 1 is transmitted to the interface between the second optical microstructure 130 and the environmental medium (for example: air), since V2 is smaller, the total internal reflection of the light beam 1 in the light guide element 100 is not easily destroyed. After being reflected at the interface between the second optical microstructure 130 and the environmental medium, most of the light beam 1 may still be transmitted within the light guide element 100. In a word, the arrangement of the second optical microstructure 130 may mitigate an adverse phenomenon (for example, slight whitening at a position where the reflective sheet 300 leans against the light guide element 100) caused by adsorption between the reflective sheet 300 and the light guide element 100 without excessively affecting the light output distribution of the backlight module 10.

Referring to FIG. 1A, in the embodiment, an arrangement density of the first optical microstructures 120 increases as a distance from the first optical microstructures 120 to the light incident surface 116 increases, and an arrangement density of the second optical microstructures 130 decreases as a distance from the second optical microstructures 130 to the light incident surface 116 increases. In detail, in a region close to the light incident surface 116, the arrangement density of the first optical microstructures 120 is low, and the second optical microstructures 130 located outside the first optical microstructures 120 occupy a large area, so that the second optical microstructures 130 located outside the first optical microstructures 120 show a high arrangement density. In an area far away from the light incident surface 116, the arrangement density of the first optical microstructures 120 is high, and the second optical microstructures 130 located outside the first optical microstructures 120 occupy a small area, so that the second optical microstructures 130 located outside the first optical microstructures 120 show a low arrangement density. Referring to FIG. 1A and FIG. 1B, tendency of the arrangement densities of the first optical microstructures 120 and the second optical microstructures 130 are opposite. When the arrangement density of the first optical microstructures 120 becomes lower, the arrangement density of the second optical microstructures 130 becomes higher, so that the second optical microstructures 130 may fill vacancies between the plurality of first optical microstructures 120, thereby reducing the probability of the reflective sheet 300 adsorbing the main body 110 of the light guide element 100 at a place where the arrangement density of the first optical microstructures 120 is low.

Referring to FIG. 1A and FIG. 1B, in the embodiment, the plurality of second optical microstructures 130 are arranged in the arrangement direction d1, and in a region of the bottom surface 112 close to the light incident surface 116 (for example, the partition region R1), two adjacent first optical microstructures 120 have a first pitch P1 in the arrangement direction d1, two adjacent second optical microstructures 130 have a second pitch P2 in the arrangement direction d1, and the second pitch P2 is smaller than the first pitch P1. Namely, at a place where the arrangement density of the first optical microstructures 120 is low (for example, the partition region R1), the second optical microstructures 130 are not only interspersed between the first optical microstructures 120, but also arranged more closely compared to the first optical microstructures 120.

Referring to FIG. 1A, FIG. 3A, FIG. 3B and FIG. 3C, in the embodiment, the plurality of second optical microstructures 130 are arranged in the arrangement direction d1, and each of the second optical microstructures 130 includes the plurality of sub-optical microstructures 130r, where the plurality of sub-optical microstructures 130r included in each second optical microstructure 130 are connected to each other in the extending direction d2, each sub-optical microstructure 130r extends in the extending direction d2, and the arrangement direction d1 and the extending direction d2 are intersected. In the embodiment, the arrangement direction d1 may be selectively consistent with the x-axis direction x (i.e., the arrangement direction d1 may be selectively parallel to the light incident surface 116), and the extending direction d2 may be selectively consistent with the y-axis direction y (i.e., the extending direction d2 may be selectively perpendicular to the light incident surface 116), but the invention is not limited thereto.

FIG. 1A and FIG. 3A, in the embodiment, an orthogonal projection of each sub-optical microstructure 130r of each second optical microstructure 130 on the bottom surface 112 includes a curved pattern 136, and the curved pattern 136 includes a first sub-curved pattern 136a and a second sub-curved pattern 136b respectively protruding toward opposite directions A1 and A2, where the plurality of first sub-curved patterns 136a and the plurality of second sub-curved patterns 136b of the plurality of sub-optical microstructures 130r included in each second optical microstructure 130 are alternately arranged and are connected to each other. To be specific, in the embodiment, the plurality of first sub-curved patterns 136a and the plurality of second sub-curved patterns 136b of the plurality of sub-optical microstructures 130r included in each second optical microstructure 130 may be substantially connected to form a wavy strip pattern. Referring to FIG. 1A, FIG. 1B and FIG. 3A, however, the invention does not limit the shape of the second optical microstructures 130, as long as the arrangement of the second optical microstructures 130 makes the reflective sheet 300 and the light guide element 100 to have the air gaps g at the low-density arrangement region (for example, the partition region R1) of the first optical microstructures 120 to result in uneasy adsorption between the reflective sheet 300 and the light guide element 100. In other embodiments, the second optical microstructure 130 may have any other shape, which will be exemplified in the following paragraphs with reference of other drawings.

Referring to FIG. 3A and FIG. 3B, in the embodiment, each sub-optical microstructure 130r has a ridgeline 138, and an orthogonal projection of the ridgeline 138 on the bottom surface 112 includes a repeating line segment 138s, and the repeating line segment 138s includes a first sub-line segment 138s1 and a second sub-line segment 138s2 respectively protruding in the opposite directions A1 and A2, where the first sub-line segment 138s1 and the second sub-line segment 138s2 are connected at an inflection point 138si of the repeating line segment 138s, and a first reference line K1 is tangent to a vertex 138s1v of the first sub-line segment 138s1, a second reference line K2 is tangent to a vertex 138s2v of the second sub-line segment 138s2, a third reference line K3 passes through the inflection point 138si and is parallel to the first reference line K1 and the second reference line K2. The repeating line segment 138s has a length L, the first reference line K1 and the third reference line K3 have a first distance D1, and the second reference line K2 and the third reference line K3 have a second distance D2, where (D1+D2)<L/10. Further, the length L of the repeating line segment 138s refers to a length of the repeating line segment 138s in the extending direction d2 (referring to FIG. 1A) of each sub-optical microstructure 130r, and in the embodiment, the length L refers to the length of the repeating line segment 138s in the y-axis direction y.

The expression "(D1+D2)<L/10" means that a degree of curvature of the second optical microstructure 130 toward opposite sides is within a certain range. Therefore, even if the second optical microstructure 130 is curved left and right in the x-axis direction x and undulated up and down in the z-axis direction z, the influence of the second optical microstructures 130 on the light output distribution of the backlight module 10 is still within a controllable range. Namely, in the case of configuring the second optical microstructures 130, the backlight module 10 may still have a uniform light output distribution.

Figure 4A:
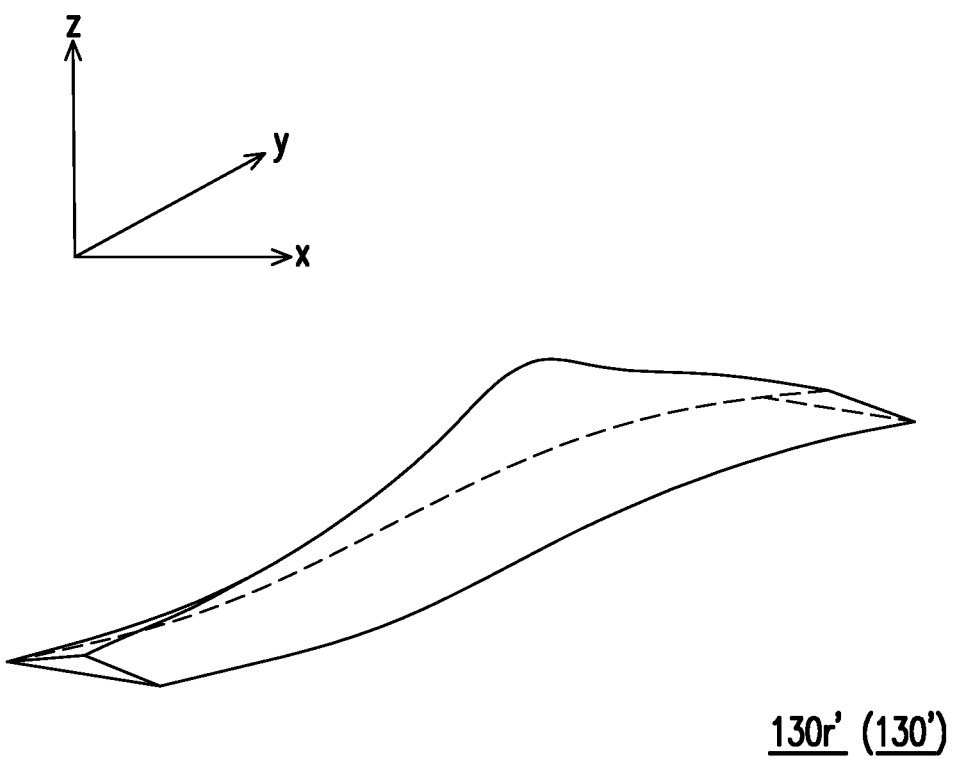
FIG. 4A is a schematic three-dimensional view of a sub-optical microstructure of a second optical microstructure of a first comparative example.
Figure 4B:
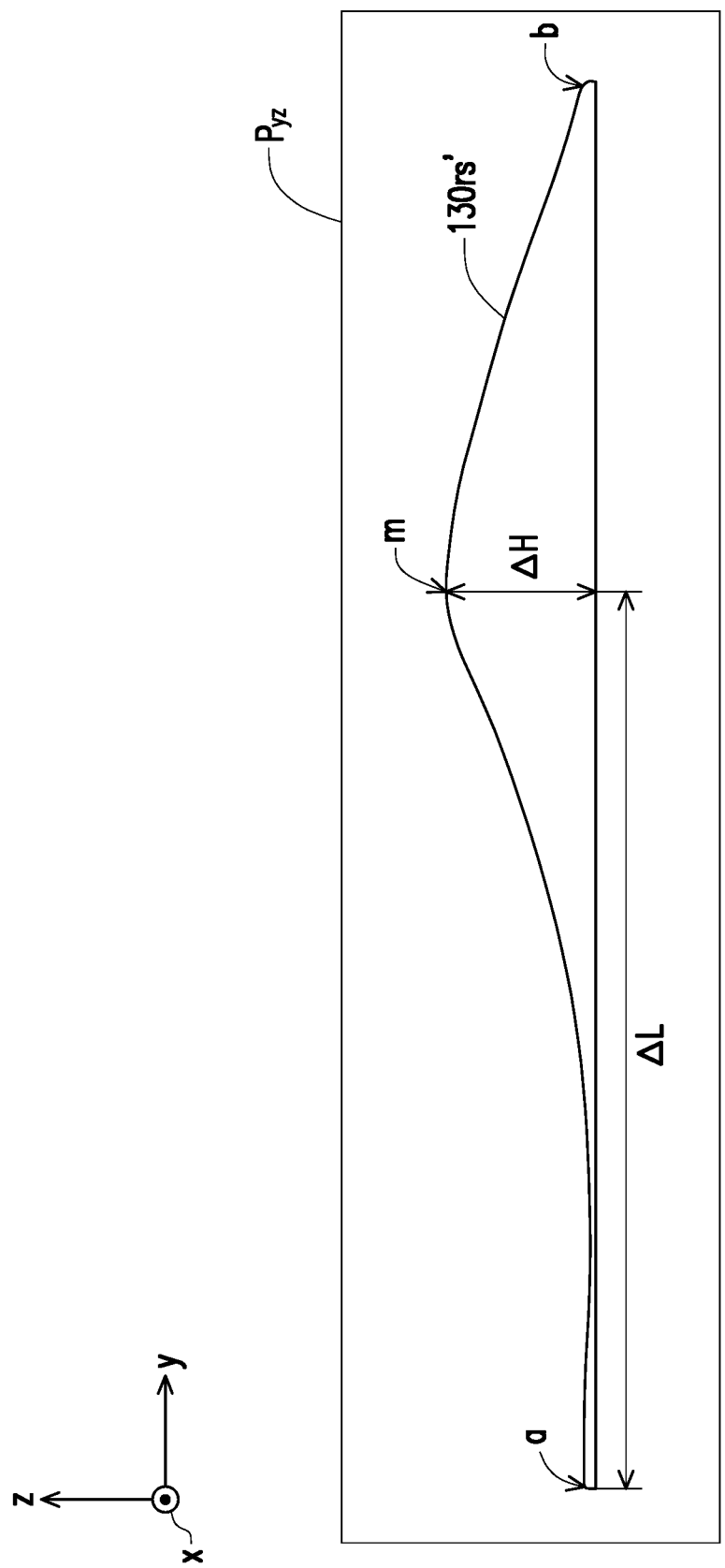
FIG. 4B illustrates a projection of the sub-optical microstructure of the second optical microstructure of the first comparative example on a reference plane.

FIG. 4A is a schematic three-dimensional view of a sub-optical microstructure of a second optical microstructure of a first comparative example. FIG. 4B illustrates a projection of the sub-optical microstructure of the second optical microstructure of the first comparative example on a reference plane. Referring to FIG. 4A and FIG. 4B, a projection 130rs' of a sub-optical microstructure 130r' of a second optical microstructure 130' of the first comparative example on the reference plane $P_{yz}$ has a first valley point a, a peak point m and a second valley point b, a height difference between the peak point m and the first valley point a in the z-axis direction z is ΔH, a length difference between the peak point m and the first valley point a in the y-axis direction y is ΔL, and a value obtained by $\tan^{-1}(\Delta H/\Delta L)$ is V2. Compared with the aforementioned embodiment of FIG. 3F, when ΔL remains unchanged and ΔH increases, V2 is increased. In this case, compared with the sub-optical microstructure 130r of the second optical microstructure 130 of the embodiment of FIG. 3F, the sub-optical microstructure of the second optical microstructure of the first comparative example have a steeper structural surface between the corresponding peak point m and the first valley point a, and the steeper structural surface is likely to cause destroying of the total internal reflection of the light beam in the light guide element to result in a fact that the light emits from the light-emitting surface, which will increase the influence on the light output distribution of the backlight module.

Figure 5A:
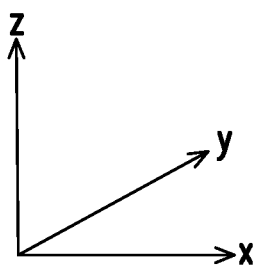
FIG. 5A is a schematic three-dimensional view of a sub-optical microstructure of a second optical microstructure of a second comparative example.
Figure 5A:
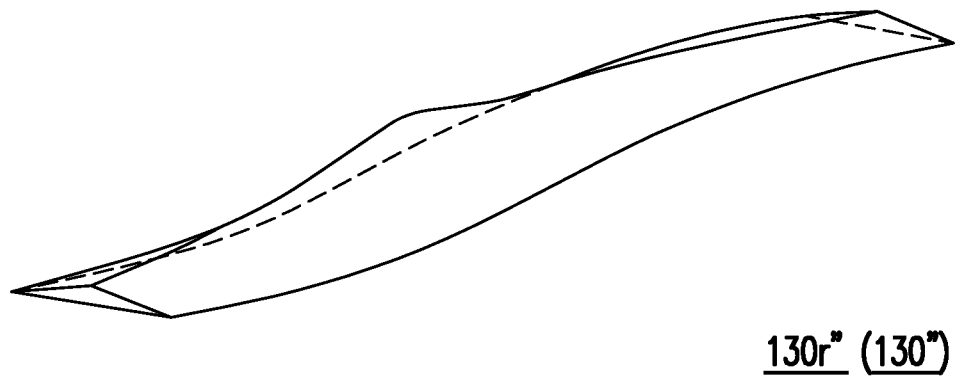
Figure 5B:
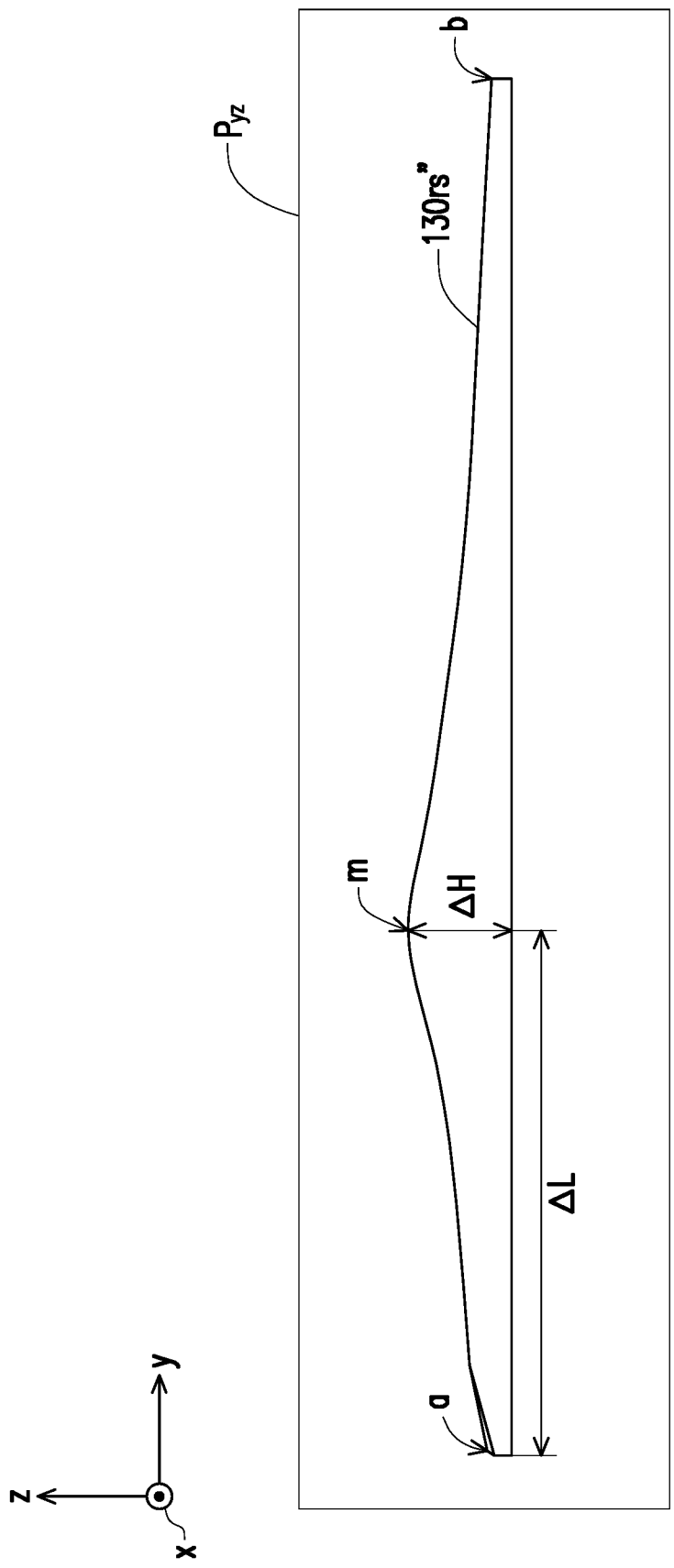
FIG. 5B illustrates a projection of the sub-optical microstructure of the second optical microstructure of the second comparative example on a reference plane.

FIG. 5A is a schematic three-dimensional view of a sub-optical microstructure of a second optical microstructure of a second comparative example. FIG. 5B illustrates a projection of the sub-optical microstructure of the second optical microstructure of the second comparative example on a reference plane. Referring to FIG. 5A and FIG. 5B, a projection 130rs" of a sub-optical microstructure 130r" of a second optical microstructure 130" of the second comparative example on the reference plane $P_{yz}$ has a first valley point a, a peak point m and a second valley point b, a height difference between the peak point m and the first valley point a in the z-axis direction z is ΔH, a length difference between the peak point m and the first valley point a in the y-axis direction y is ΔL, and a value obtained by $\tan^{-1}(\Delta H/\Delta L)$ is V2. Compared with the aforementioned embodiment of FIG. 3F, when ΔL decreases and ΔH remains unchanged, V2 is also increased. In this case, compared with the sub-optical microstructure 130r of the second optical microstructure 130 of the embodiment of FIG. 3F, the sub-optical microstructure of the second optical microstructure of the second comparative example have a steeper structural surface between the corresponding peak point m and the first valley point a, and the steeper structural surface is likely to cause destroying of the total internal reflection of the light beam in the light guide element to result in a fact that the light emits from the light-emitting surface, which will increase the influence on the light output distribution of the backlight module.

It should be noticed that reference numbers of the components and a part of contents of the aforementioned embodiment are also used in the following embodiment, where the same reference numbers denote the same or like components, and descriptions of the same technical contents are omitted. The aforementioned embodiment may be referred for descriptions of the omitted parts, and detailed descriptions thereof are not repeated in the following embodiment.

Figure 6A:
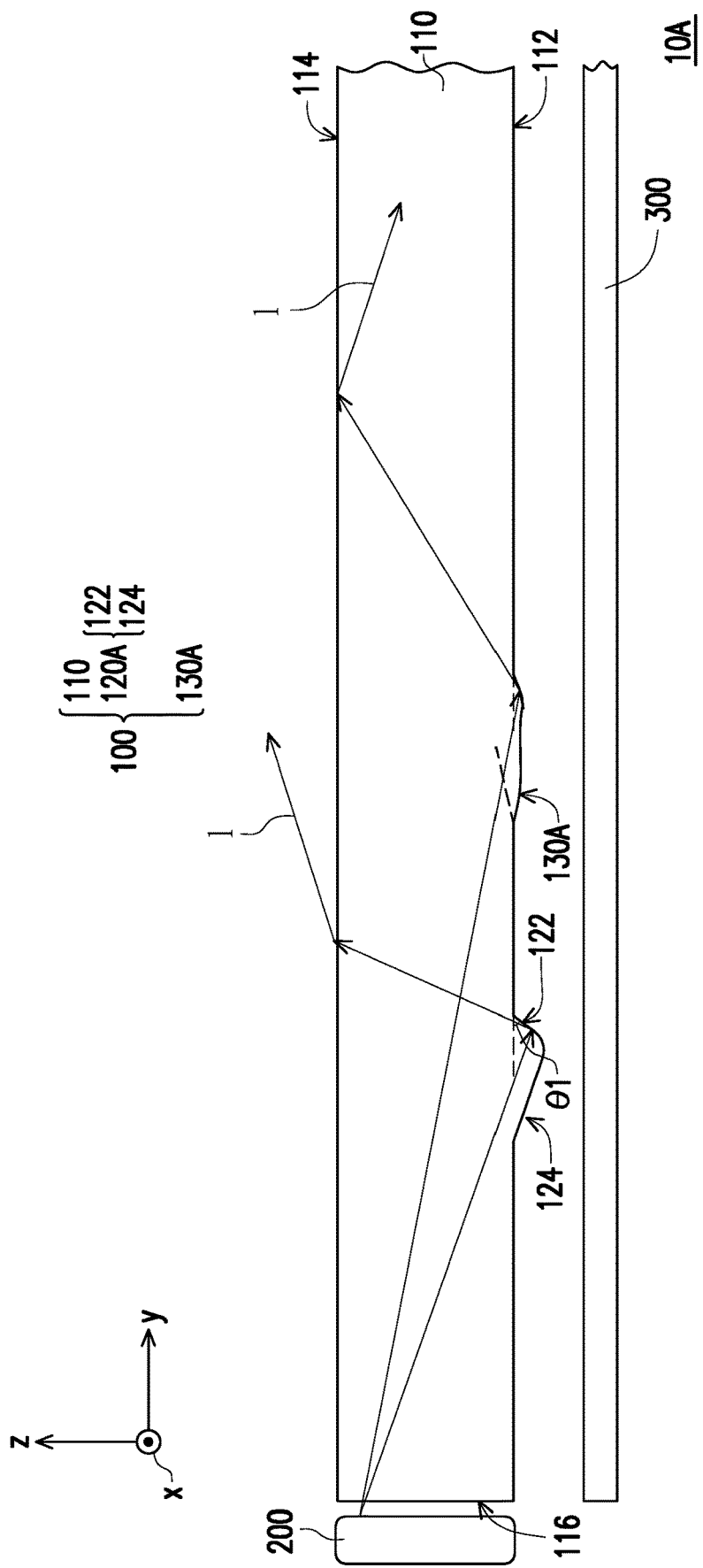
FIG. 6A is a schematic cross-sectional view of a backlight module according to another embodiment of the invention.
Figure 6B:
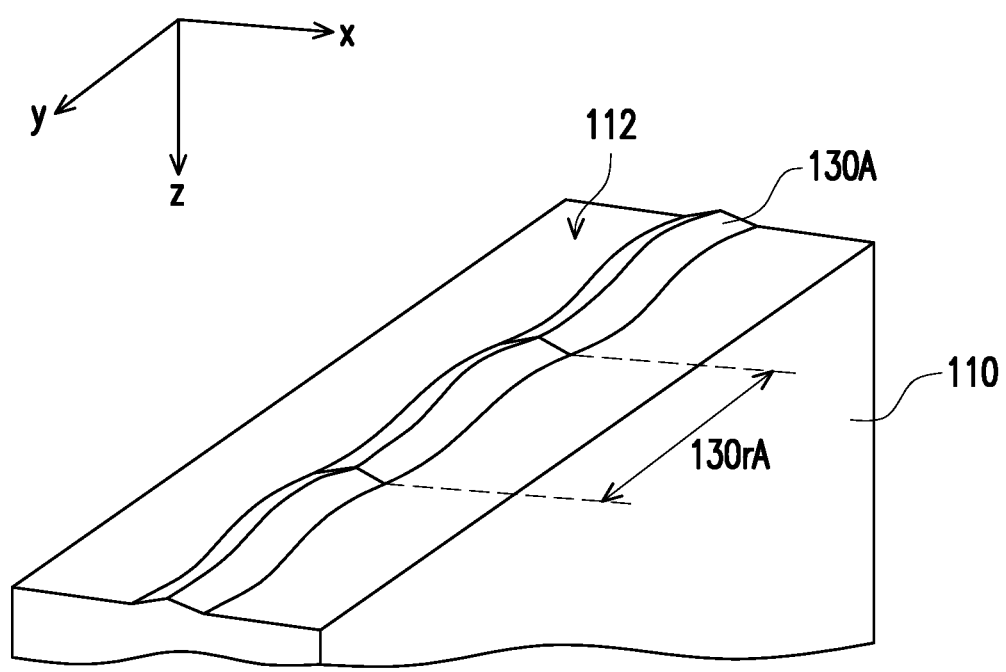
FIG. 6B is a schematic three-dimensional view of a part of a light guide element and a part of a second optical microstructure according to another embodiment of the invention.
Figure 6C:
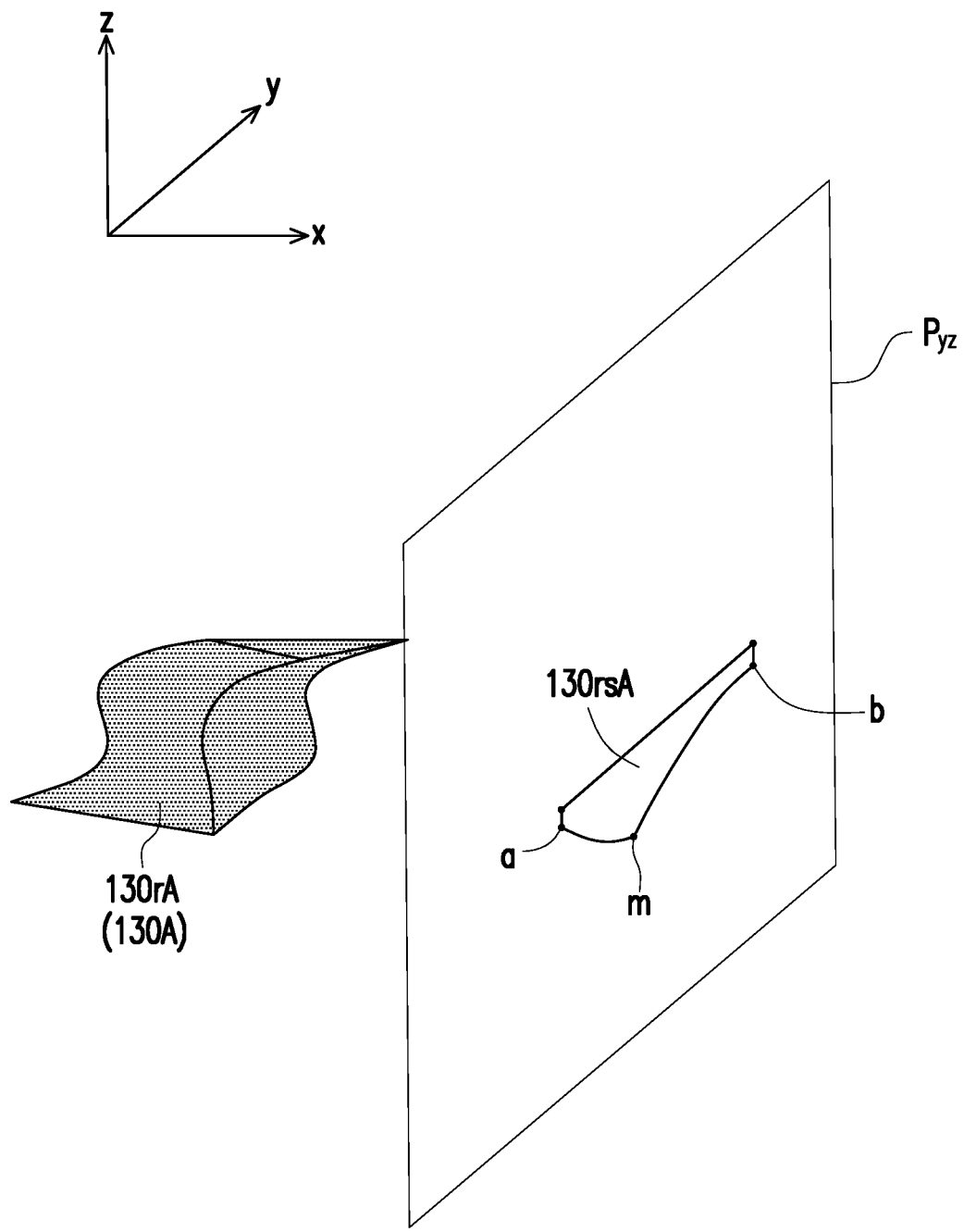
FIG. 6C illustrates a sub-optical microstructure of a second optical microstructure and a projection thereof on a reference plane according to another embodiment of the invention.
Figure 6D:
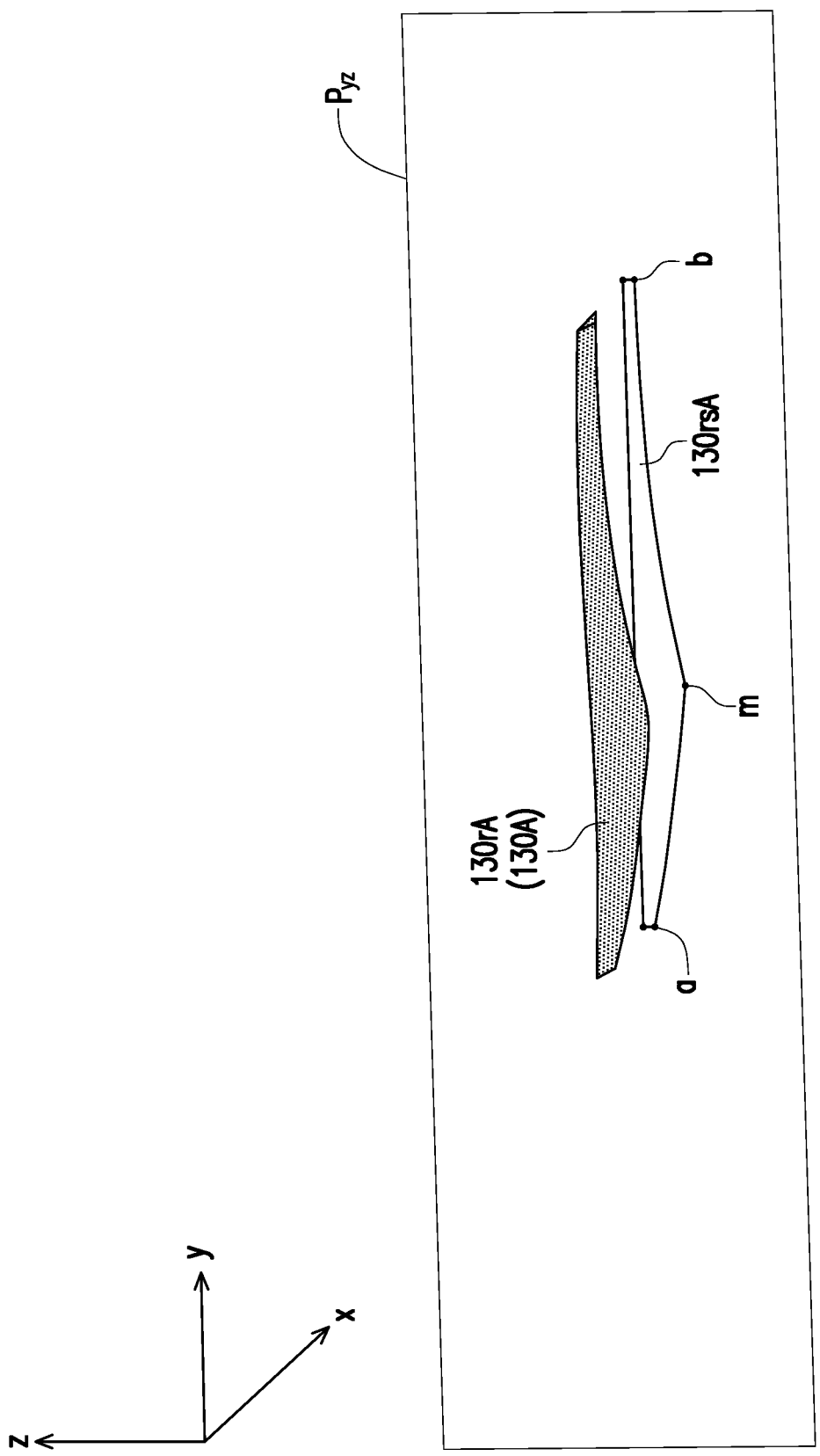
FIG. 6D illustrates a sub-optical microstructure of a second optical microstructure and a projection thereof on a reference plane according to another embodiment of the invention.
Figure 6E:
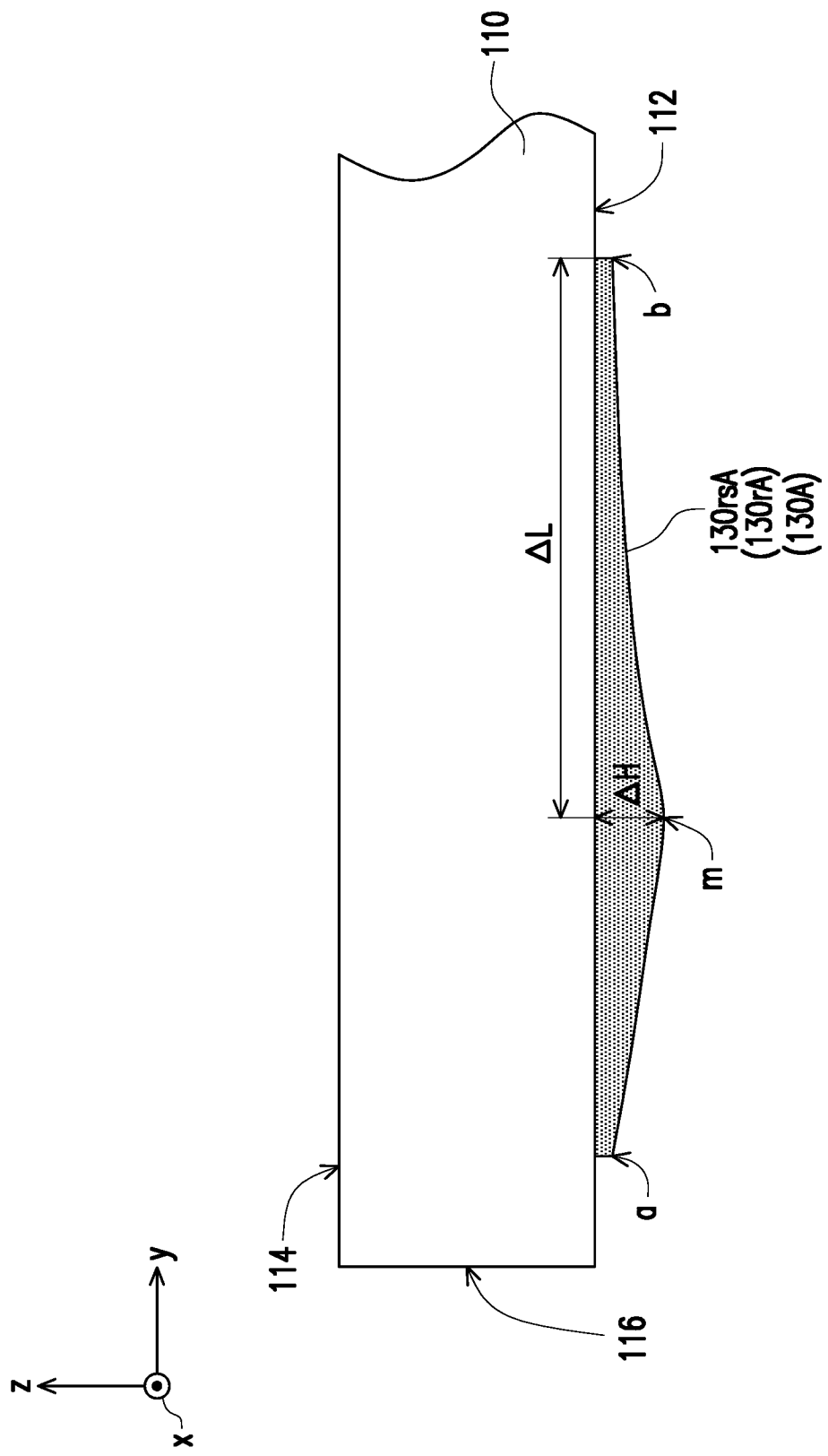
FIG. 6E illustrates a projection of a main body of a light guide element and a projection of a sub-optical microstructure of a second optical microstructure on a reference plane according to another embodiment of the invention.

FIG. 6A is a schematic cross-sectional view of a backlight module according to another embodiment of the invention. FIG. 6B is a schematic three-dimensional view of a part of a light guide element and a part of a second optical microstructure according to another embodiment of the invention. FIG. 6C illustrates a sub-optical microstructure of a second optical microstructure and a projection thereof on a reference plane according to another embodiment of the invention. FIG. 6D illustrates a sub-optical microstructure of a second optical microstructure and a projection thereof on a reference plane according to another embodiment of the invention. FIG. 6E illustrates a projection of a main body of a light guide element and a projection of a sub-optical microstructure of a second optical microstructure on a reference plane according to another embodiment of the invention.

Referring to FIG. 6A to FIG. 6E, a backlight module 10A of the embodiment is similar to the aforementioned backlight module 10, a difference there between is that in the embodiment of FIG. 6A to FIG. 6E, a first optical microstructure 120A and a second optical microstructure 130A protrude from the bottom surface 112 of the main body 110 of the light guide element 100.

Referring to FIG. 6A to FIG. 6E, when the second optical microstructure 130A protrudes from the bottom surface 112, a projection 130rsA of each sub-optical microstructure 130rA of the second optical microstructure 130A on the reference plane $P_{yz}$ perpendicular to the light incident surface 116 has a peak point m farthest from the light emitting surface 114 and a first valley point a and a second valley point b closest to the light emitting surface 114, the peak point m is located between the first valley point a and the second valley point b, the first valley point a is located between the light incident surface 116 and the second valley point b, a height difference between the peak point m and the second valley point b in the z-axis direction z perpendicular to the bottom surface 112 is $\Delta H$, and a length difference between the peak point m and the second valley point b in the y-axis direction y perpendicular to the light incident surface 116 is $\Delta L$, and a value obtained by $\tan^{-1}(\Delta H/\Delta L)$ is V2, where V2>0, and V2≤0.5·V1.

Figure 7:
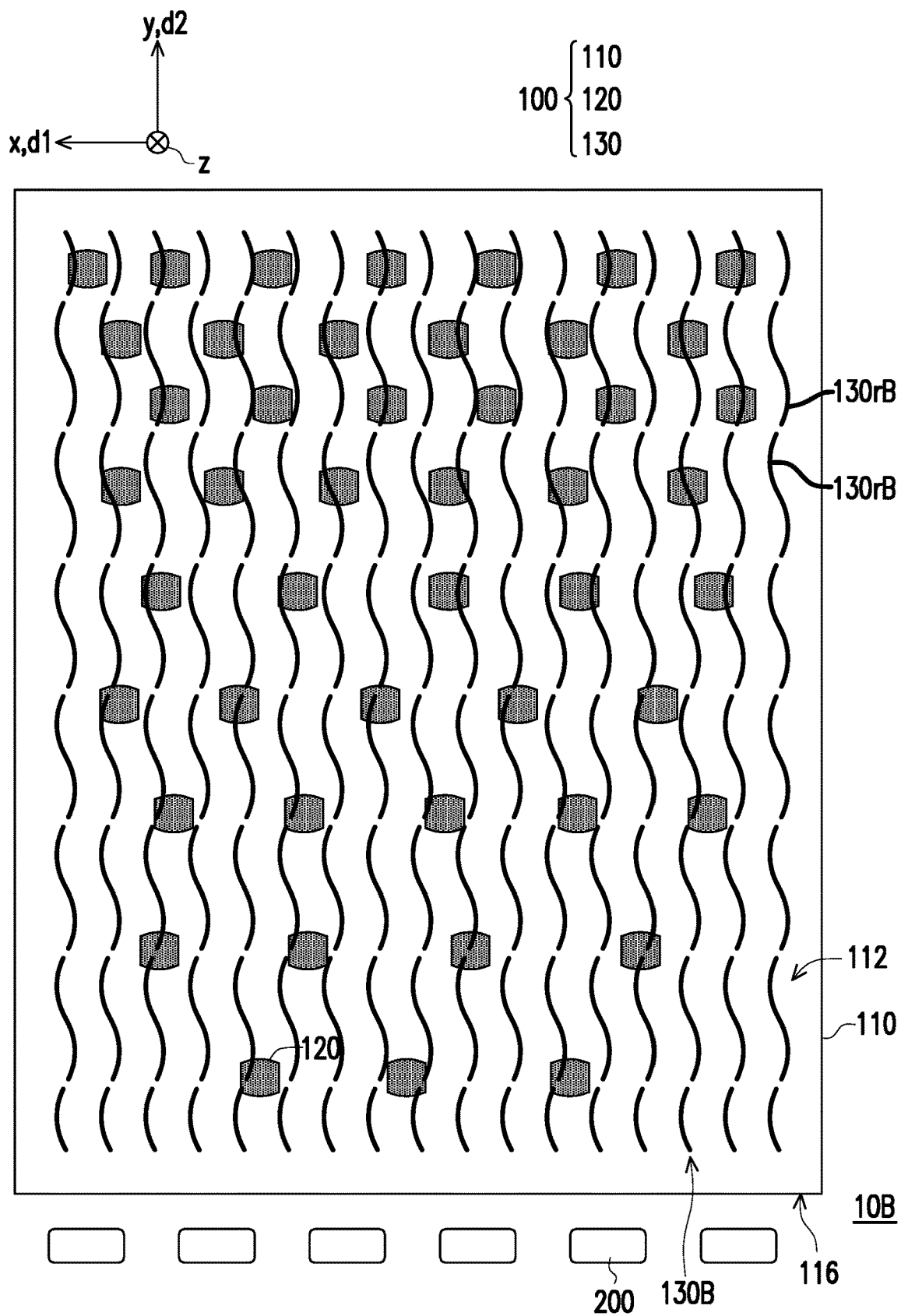
FIG. 7 is a schematic bottom view of a backlight module according to still another embodiment of the invention.

FIG. 7 is a schematic bottom view of a backlight module according to still another embodiment of the invention. A backlight module 10B of FIG. 7 is similar to the backlight module 10 of FIG. 1A, and a difference there between is that a second optical microstructure 130B of the backlight module 10B of FIG. 7 is different from the second optical microstructure 130 of the backlight module 10A of FIG. 4A. Referring to FIG. 7, to be specific, in the embodiment, a plurality of second optical microstructures 130B are arranged in the arrangement direction d1, and a plurality of sub-optical microstructures 130rB of each second optical microstructure 130B are spaced apart from each other in the extending direction d2, each of the sub-optical microstructures 130rB extends in the extending direction d2, and the arrangement direction d1 is intersected with the extending direction d2. Namely, in the embodiment, each of the second optical microstructures 130B may include the plurality of sub-optical microstructures 130rB disconnected from each other. For example, in the embodiment, the plurality of sub-optical microstructures 130rB of each second optical microstructure 130B may be arranged on a same wavy line, but the invention is not limited thereto. In other non-illustrated embodiments, the plurality of sub-optical microstructures 130rB may also be arranged in random distribution.

Figure 8:
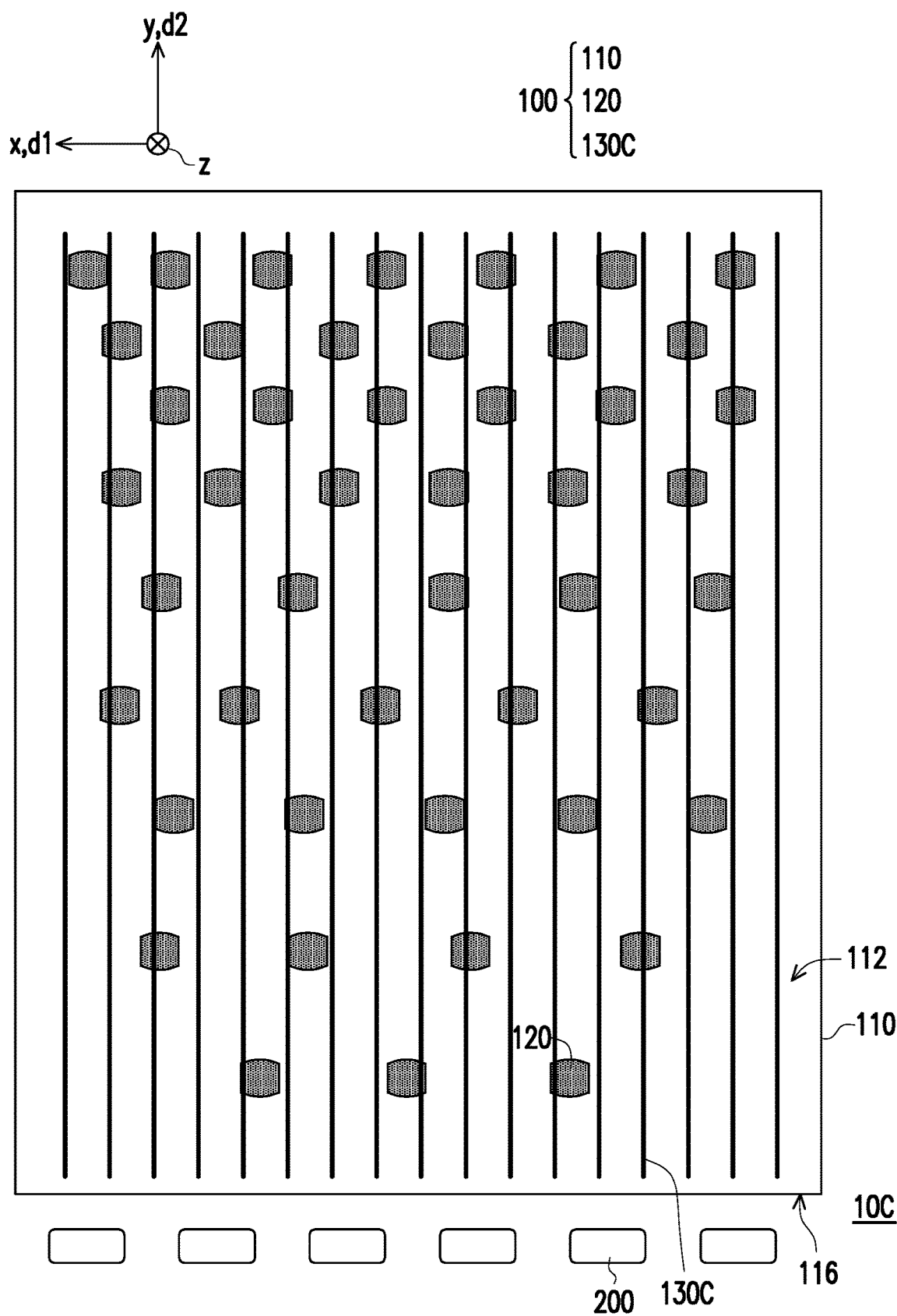
FIG. 8 is a schematic bottom view of a backlight module according to yet another embodiment of the invention.

FIG. 8 is a schematic bottom view of a backlight module according to yet another embodiment of the invention. A backlight module 10C of FIG. 8 is similar to the backlight module 10 of FIG. 1A, and a difference there between is that a second optical microstructure 130C of the backlight module 10C of FIG. 8 is different from the second optical microstructure 130 of the backlight module 10 of FIG. 1A. Referring to FIG. 8, to be specific, in the embodiment, an orthogonal projection of the second optical microstructure 130C on the bottom surface 112 may be a linear stripe pattern.

Figure 9:
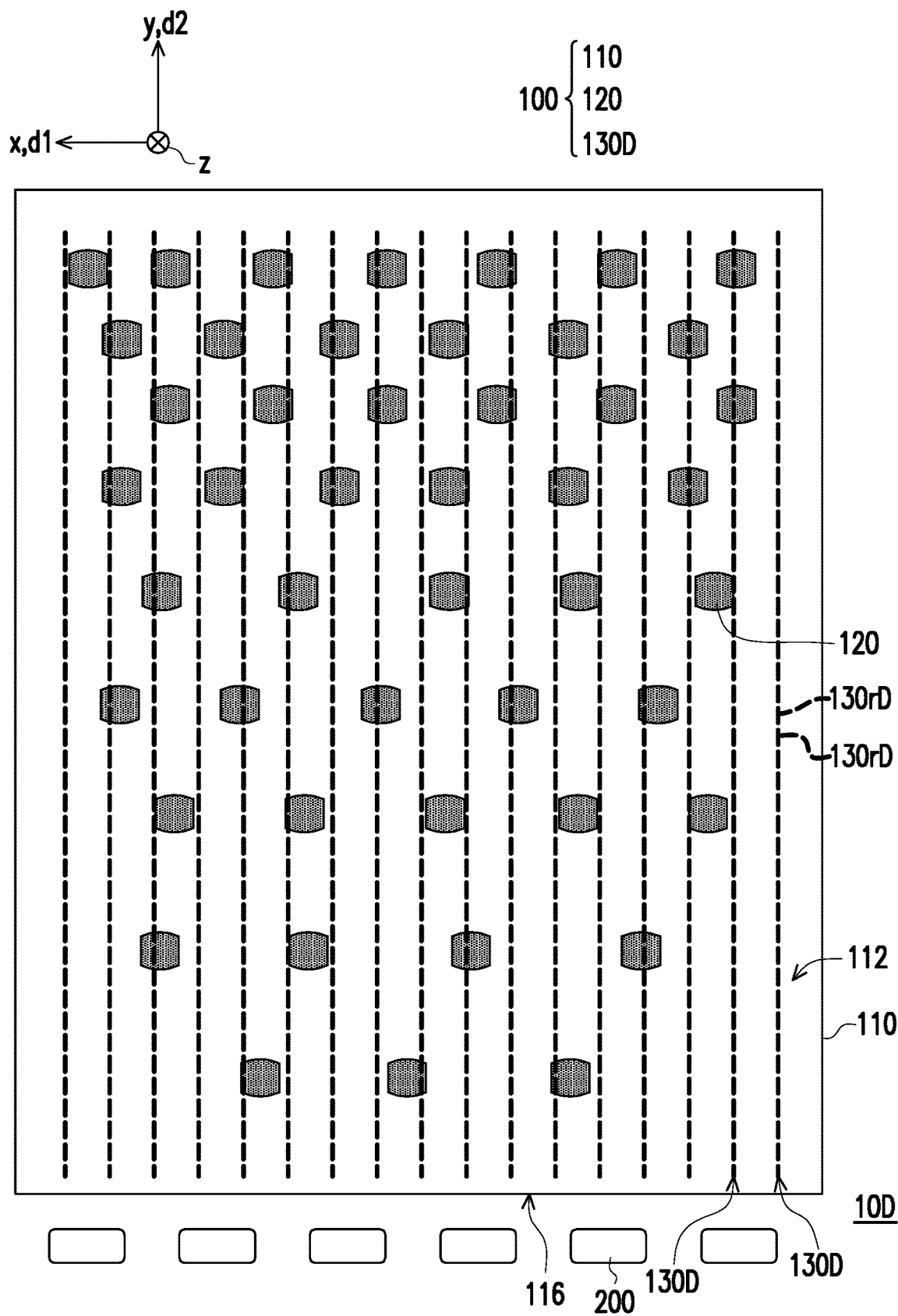
FIG. 9 is a schematic bottom view of a backlight module according to an embodiment of the invention.

FIG. 9 is a schematic bottom view of a backlight module according to an embodiment of the invention. A backlight module 10D of FIG. 9 is similar to the backlight module 10C of FIG. 8, and a difference there between is that a second optical microstructure 130D of the backlight module 10D of FIG. 9 is different from the second optical microstructure 130C of the backlight module 10C of FIG. 8. Referring to FIG. 9, to be specific, in the embodiment, a plurality of sub-optical microstructures 130rD of each second optical microstructure 130D are spaced apart from each other in the extending direction d2.

Figure 10A:
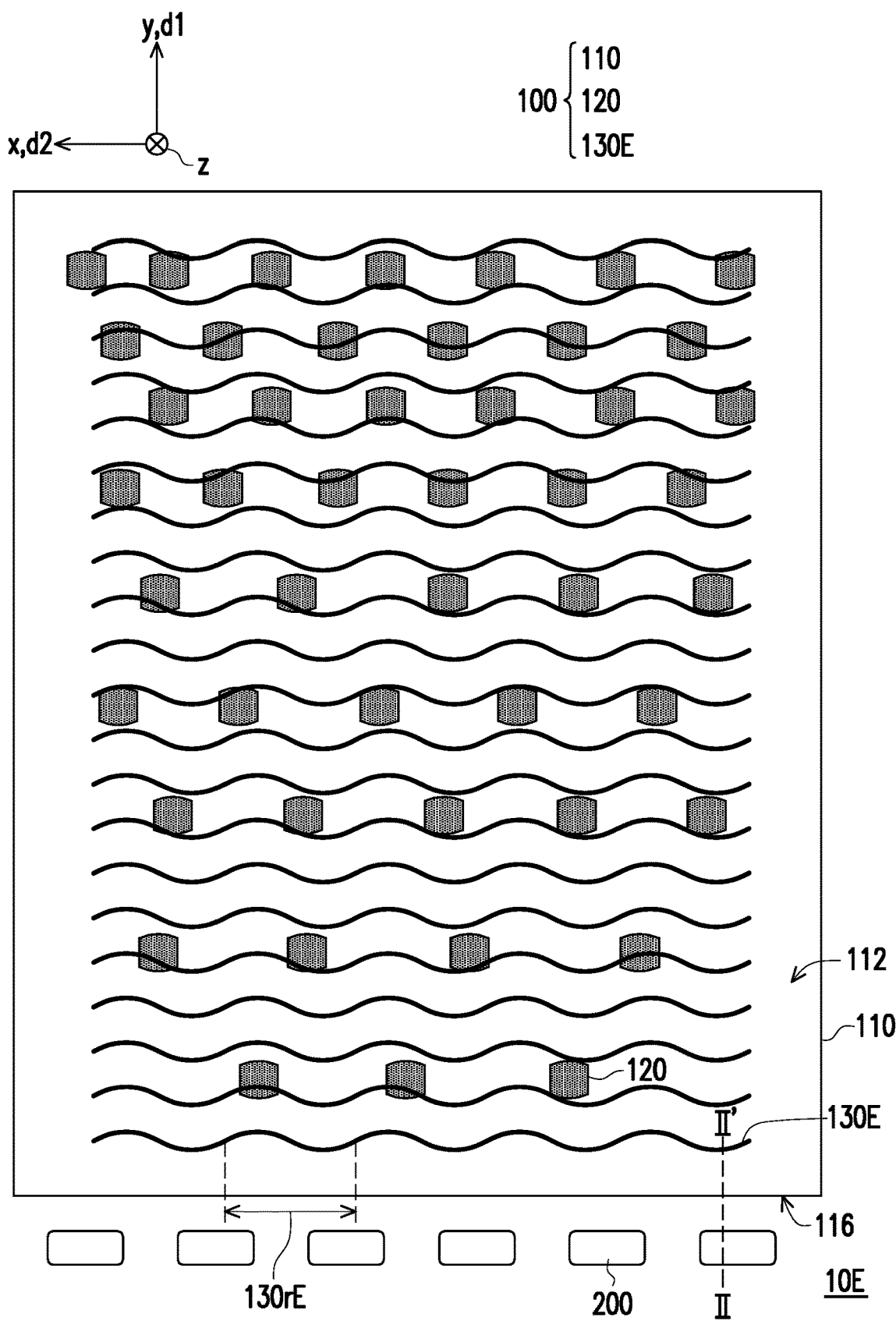
FIG. 10A is a schematic bottom view of a backlight module according to another embodiment of the invention.
Figure 10B:
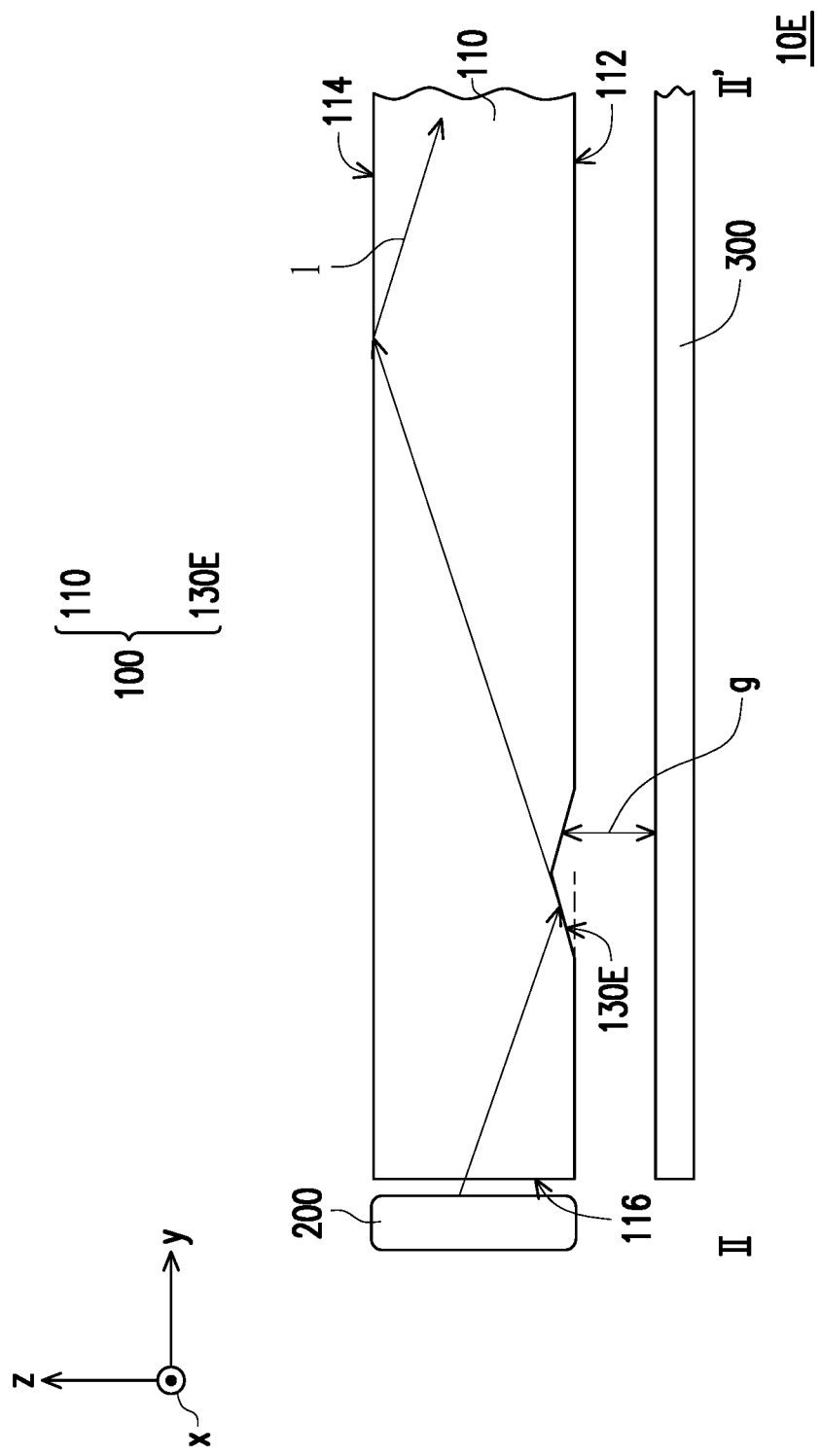
FIG. 10B is a schematic cross-sectional view of a backlight module according to another embodiment of the invention.
Figure 10C:
FIG. 10C is a schematic top view of a sub-optical microstructure of a second optical microstructure according to another embodiment of the invention.
Figure 10D:
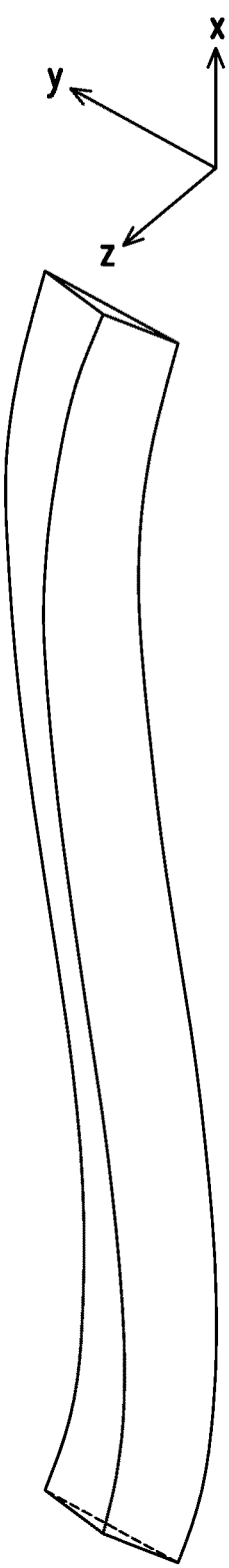
FIG. 10D is a schematic three-dimensional view of a sub-optical microstructure of the second optical microstructure according to another embodiment of the invention.
Figure 10E:
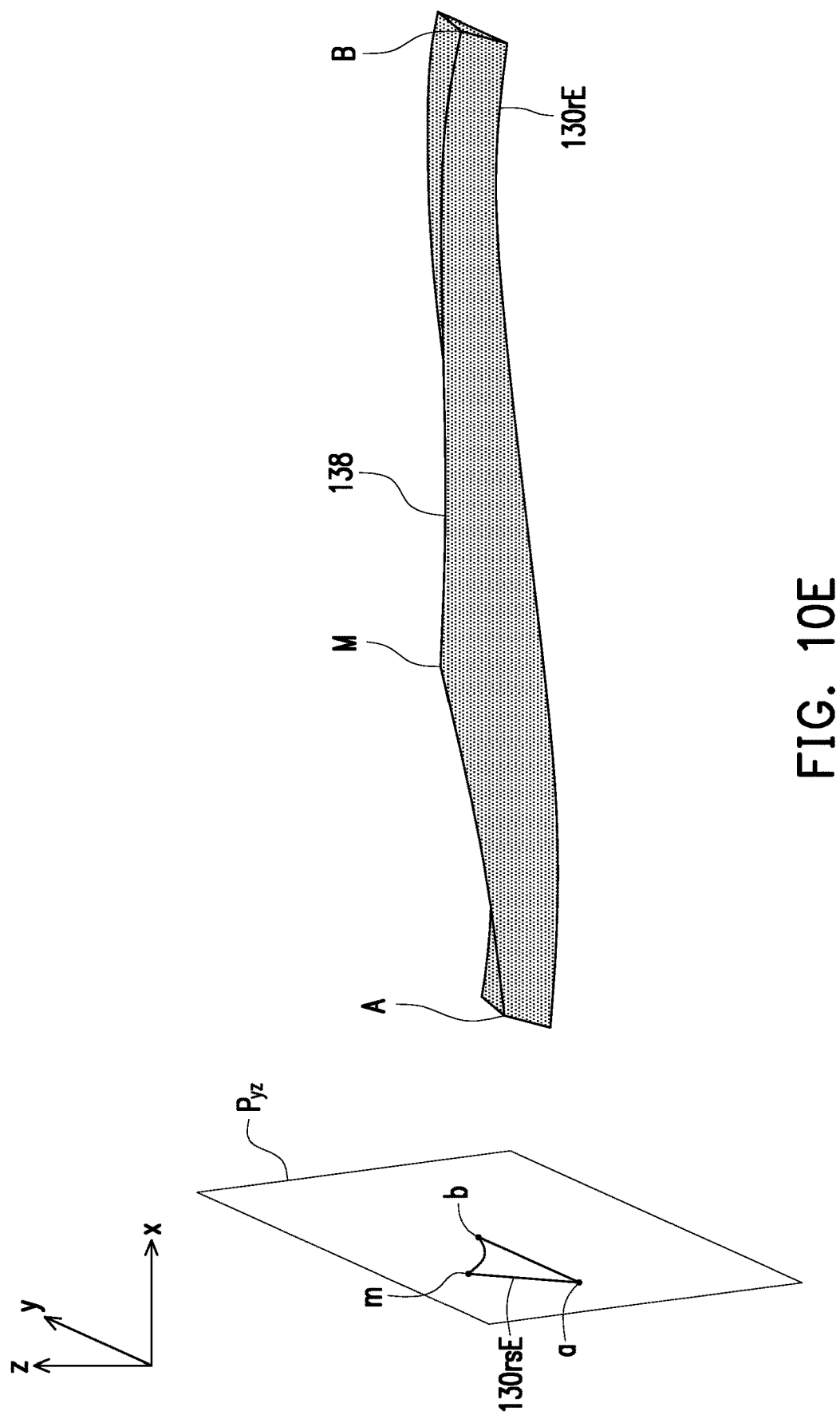
FIG. 10E illustrates a sub-optical microstructure of a second optical microstructure and a projection thereof on a reference plane according to another embodiment of the invention.
Figure 10F:
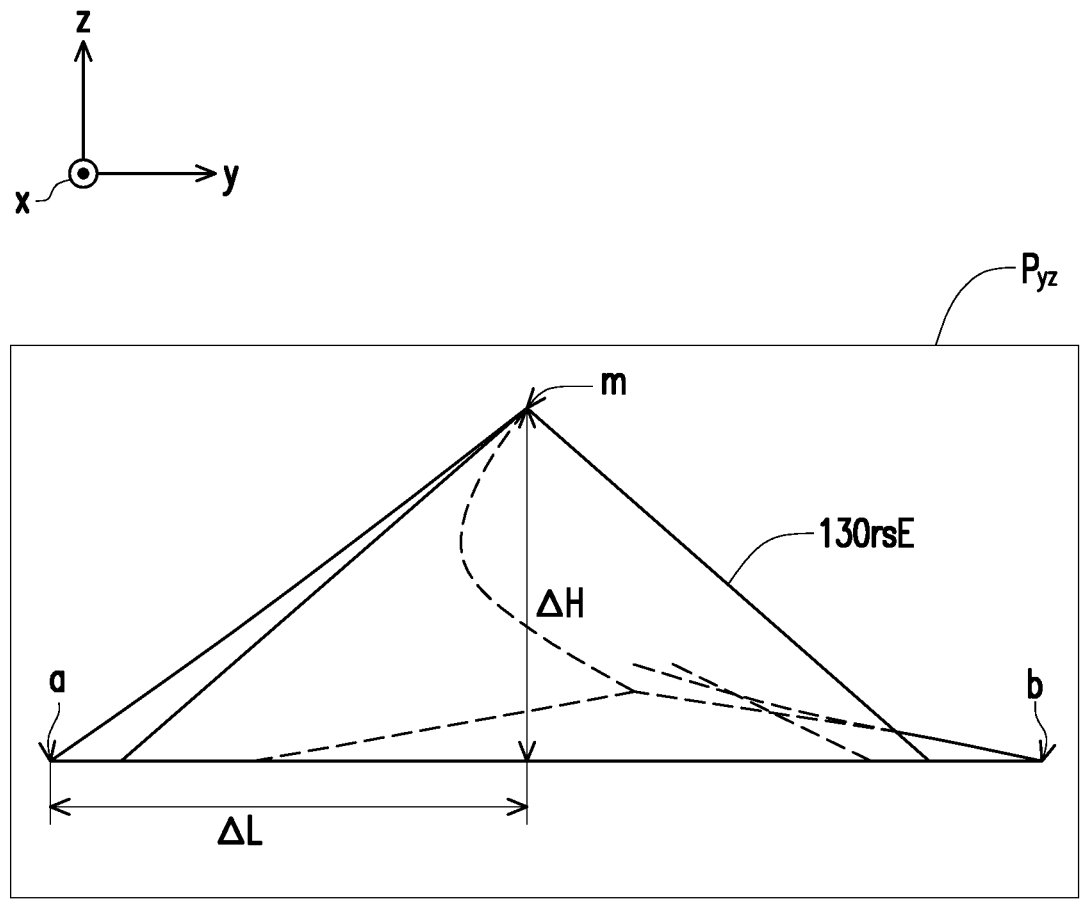
FIG. 10F illustrates a projection of the sub-optical microstructure of the second optical microstructure on the reference plane according to another embodiment of the invention.

FIG. 10A is a schematic bottom view of a backlight module according to another embodiment of the invention. FIG. 10B is a schematic cross-sectional view of a backlight module according to another embodiment of the invention. FIG. 10B corresponds to a section line II-II' of FIG. 10A. FIG. 10C is a schematic top view of a sub-optical microstructure of a second optical microstructure according to another embodiment of the invention. FIG. 10D is a schematic three-dimensional view of a sub-optical microstructure of the second optical microstructure according to another embodiment of the invention. FIG. 10E illustrates a sub-optical microstructure of a second optical microstructure and a projection thereof on a reference plane according to another embodiment of the invention. FIG. 10F illustrates a projection of the sub-optical microstructure of the second optical microstructure on the reference plane according to another embodiment of the invention. It should be noted that for the convenience of illustration and description, the second optical microstructure 130E presented in FIG. 10C to 10F are illustrated as being complementary to the second optical microstructure 130E presented in FIG. 10B.

Referring to FIG. 10A to FIG. 10F, a backlight module 10E of the embodiment is similar to the aforementioned backlight module 10, and a difference there between is that an arrangement of the second optical microstructures 130E of the backlight module 10E of the embodiment is different from the arrangement of the second optical microstructures 130 of the aforementioned backlight module 10.

Referring to FIG. 10A, the first surface 122 of the first optical microstructure 120 and the bottom surface 112 of the main body 110 of the light guide element 100 include a first acute angle θ1, the first acute angle θ1 is a first angle of the first optical microstructure 120, and an angle value of the first angle is V1, where V1>0. Referring to FIG. 10B to FIG. 10F, when the second optical microstructure 130E is recessed into the bottom surface 112, a projection 130rsE of each sub-optical microstructure 130rE of the second optical microstructure 130E on the reference plane $P_{yz}$ perpendicular to the light incident surface 116 has a peak point m closest to the light emitting surface 114 and a first valley point a and a second valley point b farthest from the light emitting surface 114, where the peak point m is located between the first valley point a and the second valley point b, and the first valley point a is located between the light incident surface 116 and the second valley point b. The reference plane $P_{yz}$ is, for example, a plane in which the y-axis direction y and the z-axis direction z are located. The first valley point a, the peak point m, and the second valley point b shown in FIG. 10F respectively correspond to points A, M, and B on the ridgeline 138 of the sub-optical microstructure 130rE shown in FIG. 10E. Referring to FIG. 10F, a height difference between the peak point m and the first valley point a in the z-axis direction z perpendicular to the bottom surface 112 is ΔH, and a length difference between the peak point m and the first valley point a in the y-axis direction y perpendicular to the light incident surface 116 is ΔL, and a value obtained by $\tan^{-1}(ΔH/ΔL)$ is V2, where V2>0, and V2≤0.5·V1.

Referring to FIG. 10A and FIG. 10C, a difference from the aforementioned backlight module 10 is that in the embodiment, the plurality of second optical microstructures 130E are arranged in the arrangement direction d1, the plurality of sub-optical microstructures 130rE included in each second optical microstructure 130E are arranged in the extending direction d2, each sub-optical microstructure 130rE extends in the extending direction d2, the arrangement direction d1 is intersected with the extending direction d2, and the extending direction d2 is parallel to the light incident surface 116, namely, in the embodiment, the extending direction d2 may be selectively consistent with the x-axis direction x.

Figure 10G:
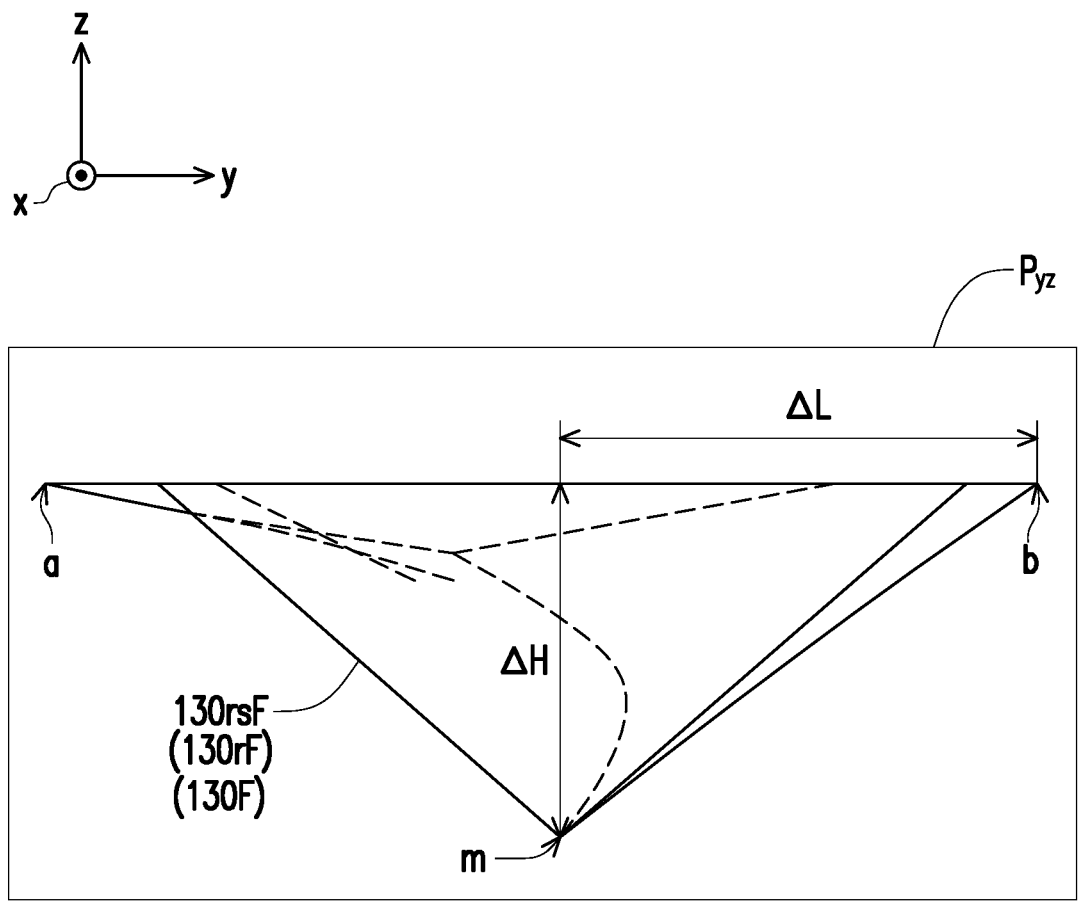
FIG. 10G illustrates a projection of a sub-optical microstructure of a second optical microstructure on the reference plane according to still another embodiment of the invention.

FIG. 10G illustrates a projection of a sub-optical microstructure of a second optical microstructure on the reference plane according to still another embodiment of the invention. In the embodiment of FIG. 10G, the second optical microstructure 130F protrude from the bottom surface 112 of the main body 110 of the light guide element 100 (referring to FIG. 10B together). When the second optical microstructure 130F protrude from the bottom surface 112, a projection 130rsF of each sub-optical microstructure 130rF of the second optical microstructure 130F on the reference plane $P_{yz}$ perpendicular to the light incident surface 116 has a peak point m farthest from the light emitting surface 114 and a first valley point a and a second valley point b closest to the light emitting surface 114. The peak point m is located between the first valley point a and the second valley point b, the first valley point a is located between the light incident surface 116 and the second valley point b, a height difference between the peak point m and the second valley point b in the z-axis direction z perpendicular to the bottom surface 112 is ΔH, and a length difference between the peak point m and the second valley point b in the y-axis direction y perpendicular to the light incident surface 116 is ΔL, and a value obtained by $\tan^{-1}(ΔH/ΔL)$ is V2, where V2>0, and V2≤0.5·V1.

Figure 11A:
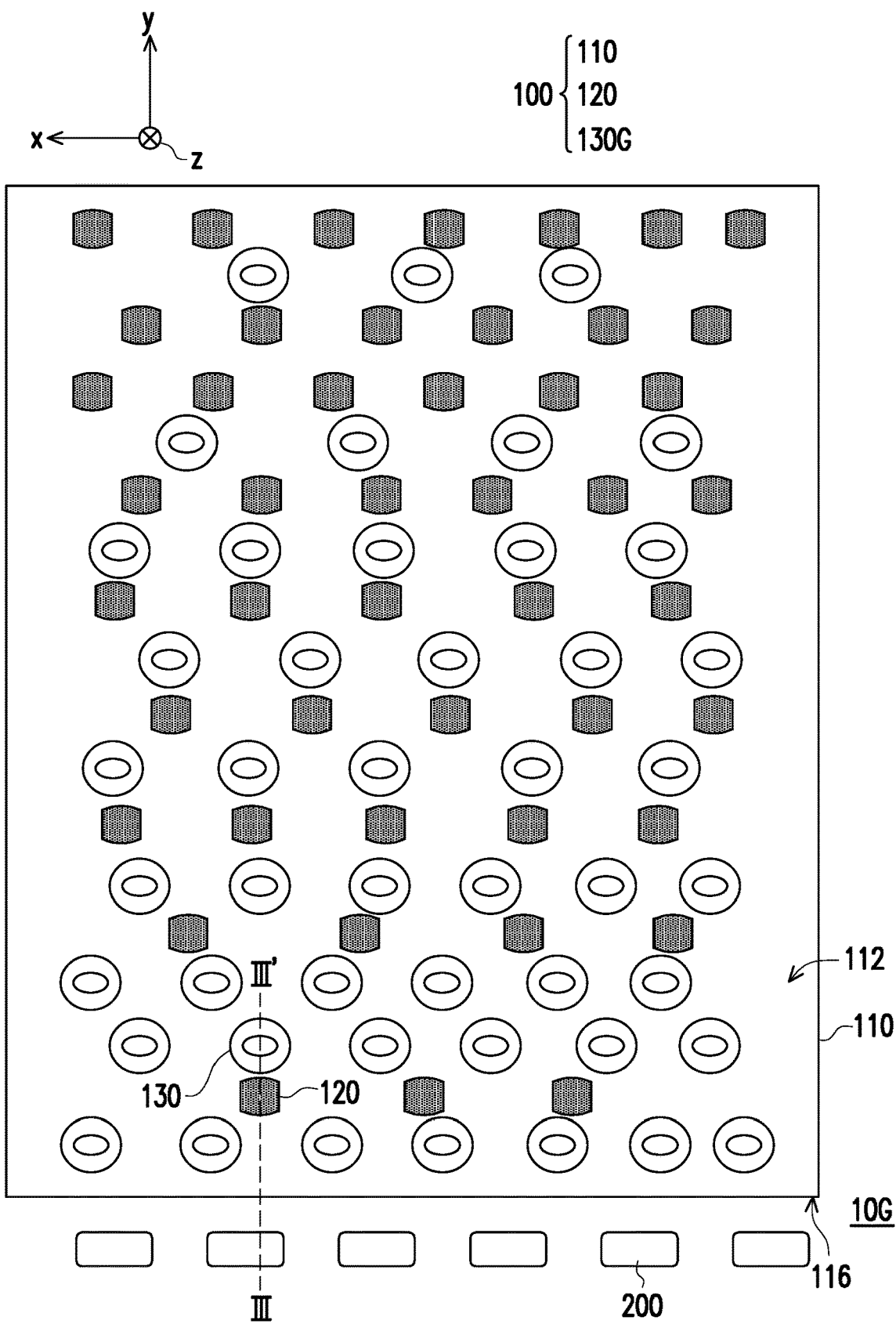
FIG. 11A is a schematic bottom view of a backlight module according to yet another embodiment of the invention.
Figure 11B:
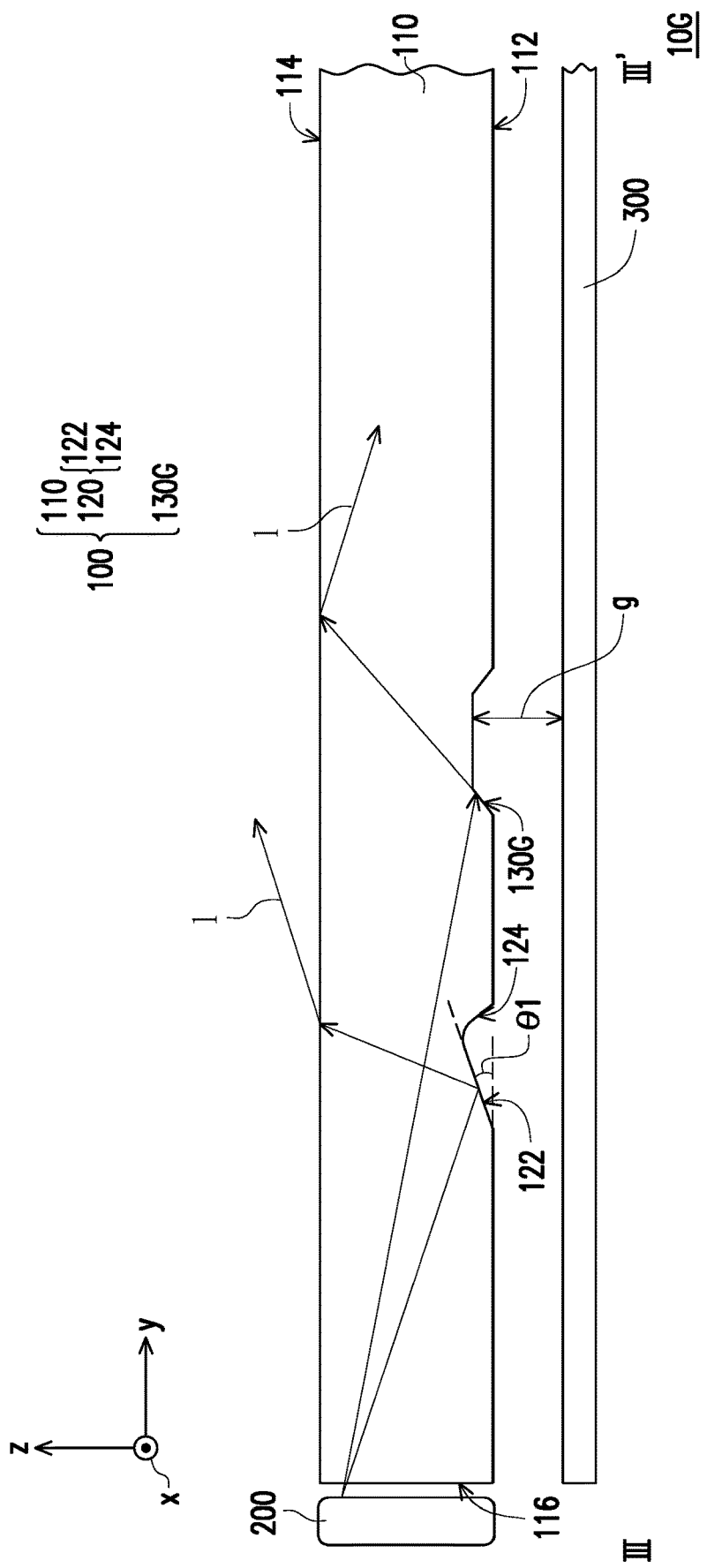
FIG. 11B is a schematic cross-sectional view of the backlight module according to yet another embodiment of the invention.
Figure 11C:
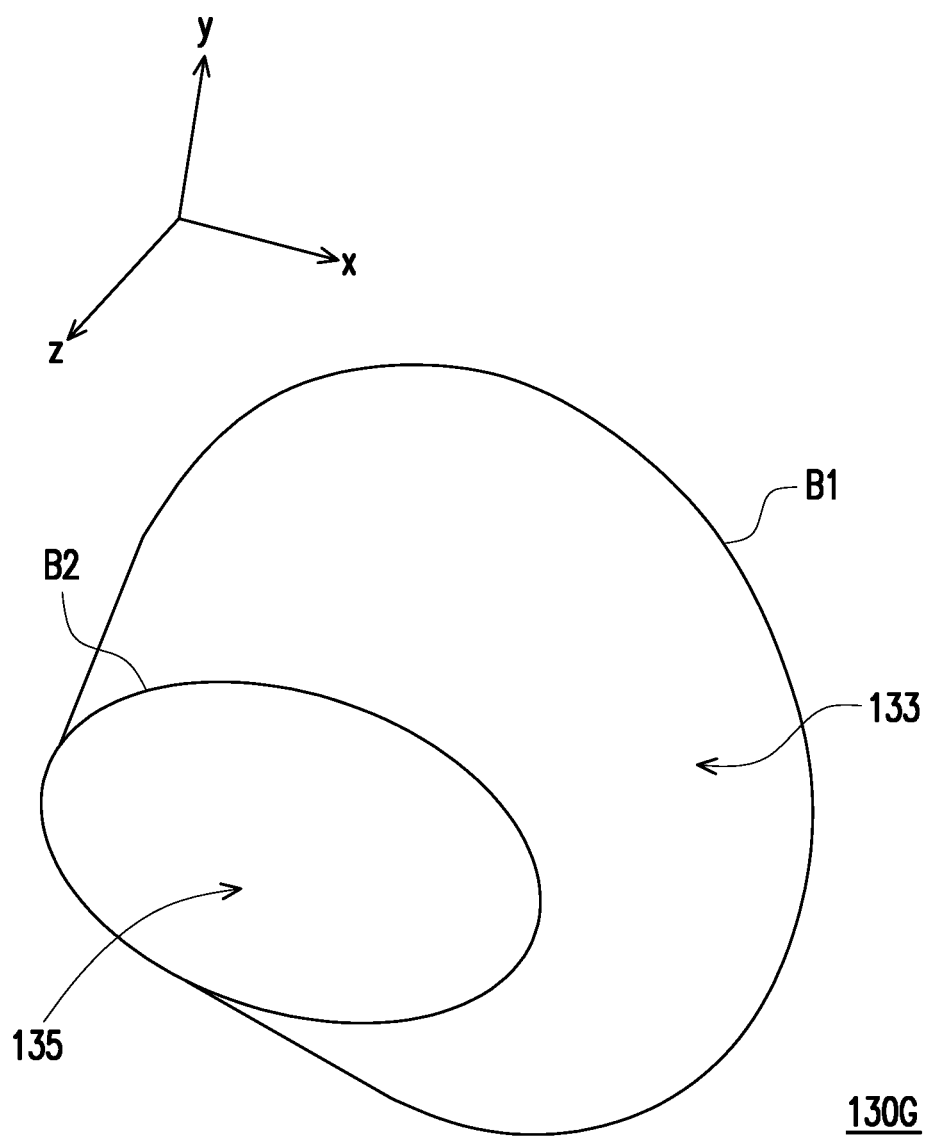
FIG. 11C is a schematic three-dimensional view of a second optical microstructure according to yet another embodiment of the invention.

FIG. 11A is a schematic bottom view of a backlight module according to yet another embodiment of the invention. FIG. 11B is a schematic cross-sectional view of the backlight module according to yet another embodiment of the invention. FIG. 11B corresponds to a section line of FIG. 11A. FIG. 11C is a schematic three-dimensional view of a second optical microstructure according to yet another embodiment of the invention. It should be noted that, for the convenience of illustration and description, the second optical microstructure 130G presented in FIG. 7C is illustrated as a situation complementary to the second optical microstructure 130G presented in FIG. 7B.

A backlight module 10G of FIG. 11A is similar to the backlight module 10 of FIG. 1A, and a difference there between is that a second optical microstructure 130G of the backlight module 10G of FIG. 11A is different from the second optical microstructure 130 of the backlight module 10 of FIG. 1A. Referring to FIG. 11A, FIG. 11B and FIG. 11C, to be specific, in the embodiment, each second optical microstructure 130G includes a side surface 133 and an opposing surface 135, the opposing surface 135 is disposed opposite to the bottom surface 112, the side surface 133 is connected between the bottom surface 112 and the opposing surface 135, and the side surface 133 and the bottom surface 112 have a first boundary B1, the side surface 133 and the opposing surface 135 have a second boundary B2, an orthogonal projection of the second boundary B2 on the bottom surface 112 is located within an orthogonal projection of the first boundary B1 on the bottom surface 112, and a shape of the orthogonal projection of the first boundary B1 is different from a shape of the orthogonal projection of the second boundary B2. For example, in the embedment, the first boundary B1 may be a circle or an ellipse with a larger area, the second boundary B2 may be a circle or an ellipse with a smaller area, and the orthogonal projection of the second boundary B2 on the bottom surface 112 falls within the orthogonal projection of the first boundary B1 on the bottom surface 112, but the invention is not limited thereto. In addition, in the embodiment, one second optical microstructure 130G may be regarded as a sub-optical microstructure.

It should be noted that the second optical microstructure 130G of FIG. 11A to FIG. 11C is shown as extending along the x-axis direction x, i.e., a long-axis direction of the ellipse presented by the first boundary B1 is the x-axis direction x, and a long-axis direction of the ellipse presented by the second boundary B2 is the x-axis direction x, but in other embodiments, the second optical microstructure 130G may also be rotated by a certain angle for placement, for example, rotated by 90 degrees, so that the second optical microstructure extends along the y-axis direction y, i.e., the long axis direction of the ellipse presented by the first boundary B1 may be changed to the y-axis direction y, and the long-axis direction of the ellipse presented by the second boundary B2 may be changed to the y-axis direction y. In addition, the second optical microstructures 130G may be arranged on the bottom surface 112 of the main body 110 of the light guide element 100 in the form of a regular matrix or a random distribution, or the second optical microstructures 130G extending in different directions may also be adopted.

Figure 12A:
FIG. 12A is a schematic top view of a sub-optical microstructure of a second optical microstructure according to an embodiment of the invention.
Figure 12B:
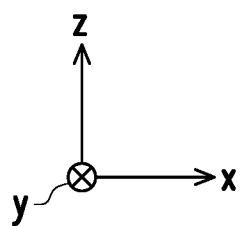
FIG. 12B is a schematic cross-sectional view of the sub-optical microstructure of the second optical microstructure according to an embodiment of the invention.
Figure 12B:
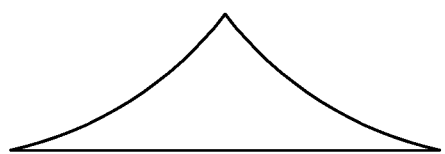

FIG. 12A is a schematic top view of a sub-optical microstructure of a second optical microstructure according to an embodiment of the invention. FIG. 12B is a schematic cross-sectional view of the sub-optical microstructure of the second optical microstructure according to an embodiment of the invention.

Referring to FIG. 12A and FIG. 12B, in the embodiment, a cross section of a sub-optical microstructure 130rH of a second optical microstructure 130H on a plane where the x-axis direction x and the z-axis direction z are located has two concave arc line segments.

Figure 13A:
FIG. 13A is a schematic top view of a sub-optical microstructure of a second optical microstructure according to another embodiment of the invention.
Figure 13B:
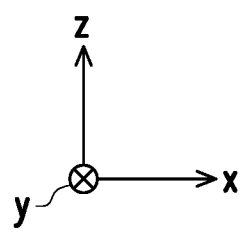
FIG. 13B is a schematic cross-sectional view of the sub-optical microstructure of the second optical microstructure according to another embodiment of the invention.
Figure 13B:

FIG. 13A is a schematic top view of a sub-optical microstructure of a second optical microstructure according to another embodiment of the invention. FIG. 13B is a schematic cross-sectional view of the sub-optical microstructure of the second optical microstructure according to another embodiment of the invention.

Referring to FIG. 13A and FIG. 13B, in the embodiment, a cross section of a sub-optical microstructure 130rI of a second optical microstructure 130I on the plane where the x-axis direction x and the z-axis direction z are located has a convex arc line segment.

Figure 14A:
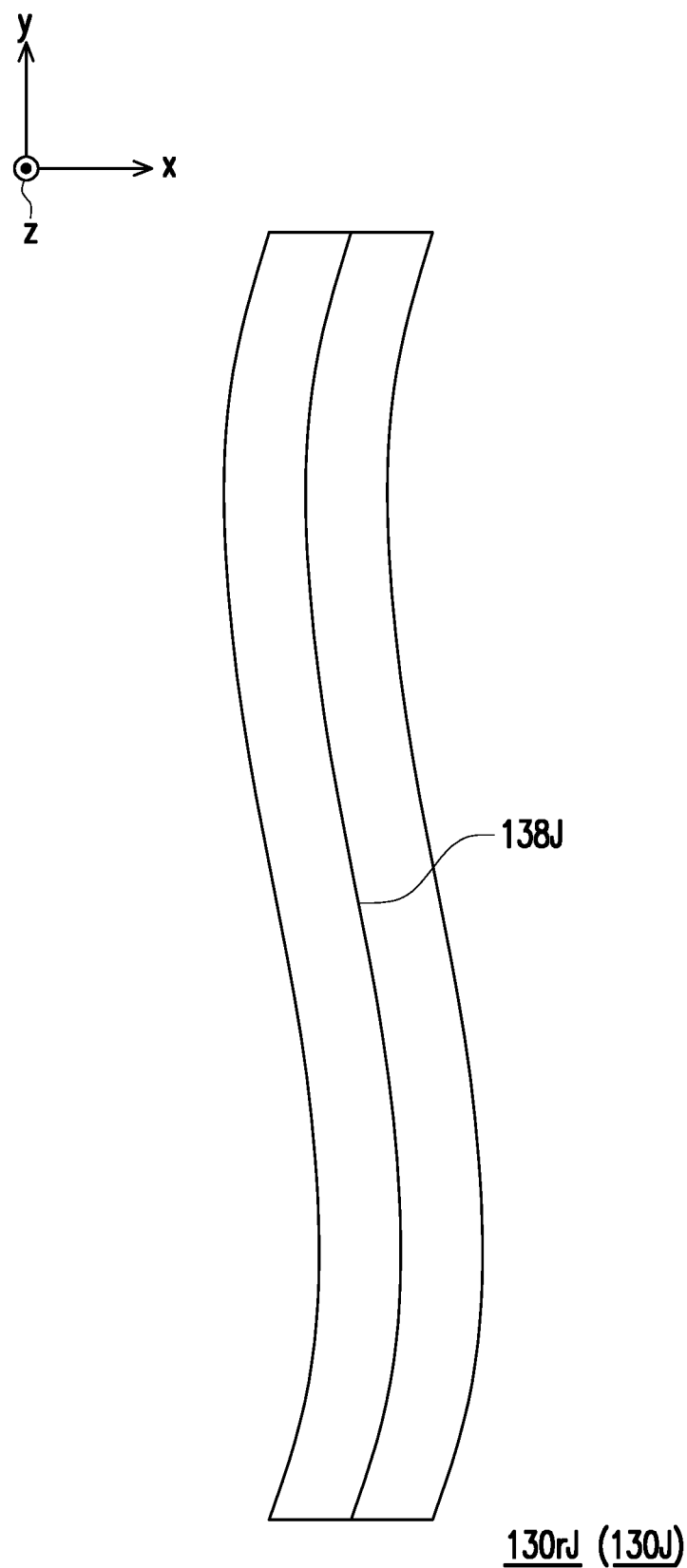
FIG. 14A is a schematic top view of a sub-optical microstructure of a second optical microstructure according to still another embodiment of the invention.
Figure 14B:
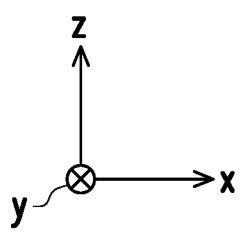
FIG. 14B is a schematic cross-sectional view of the sub-optical microstructure of the second optical microstructure according to still another embodiment of the invention.
Figure 14B:
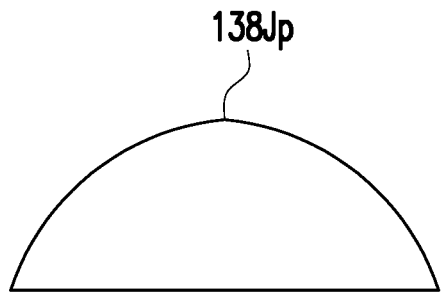

FIG. 14A is a schematic top view of a sub-optical microstructure of a second optical microstructure according to still another embodiment of the invention. FIG. 14B is a schematic cross-sectional view of the sub-optical microstructure of the second optical microstructure according to still another embodiment of the invention.

Referring to FIG. 14A and FIG. 14B, in the embodiment, a cross section of a sub-optical microstructure 130rJ of a second optical microstructure 130J on the plane where the x-axis direction x and the z-axis direction z are located has two convex arc line segments, and a connection point 138Jp of the two convex arc line segments is a point on a ridgeline 138J of the sub-optical microstructure 130rJ of the second optical microstructure 130J.

Figure 15A:
FIG. 15A is a schematic top view of a sub-optical microstructure of a second optical microstructure according to yet another embodiment of the invention.
Figure 15B:
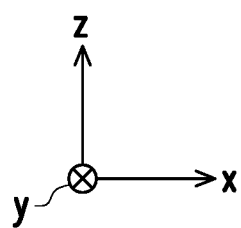
FIG. 15B is a schematic cross-sectional view of the sub-optical microstructure of the second optical microstructure according to yet another embodiment of the invention.
Figure 15B:
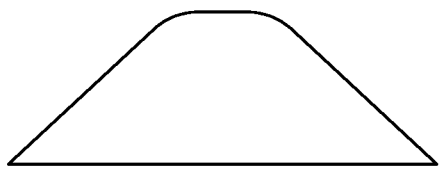

FIG. 15A is a schematic top view of a sub-optical microstructure of a second optical microstructure according to yet another embodiment of the invention. FIG. 15B is a schematic cross-sectional view of the sub-optical microstructure of the second optical microstructure according to yet another embodiment of the invention.

Figure 16A:
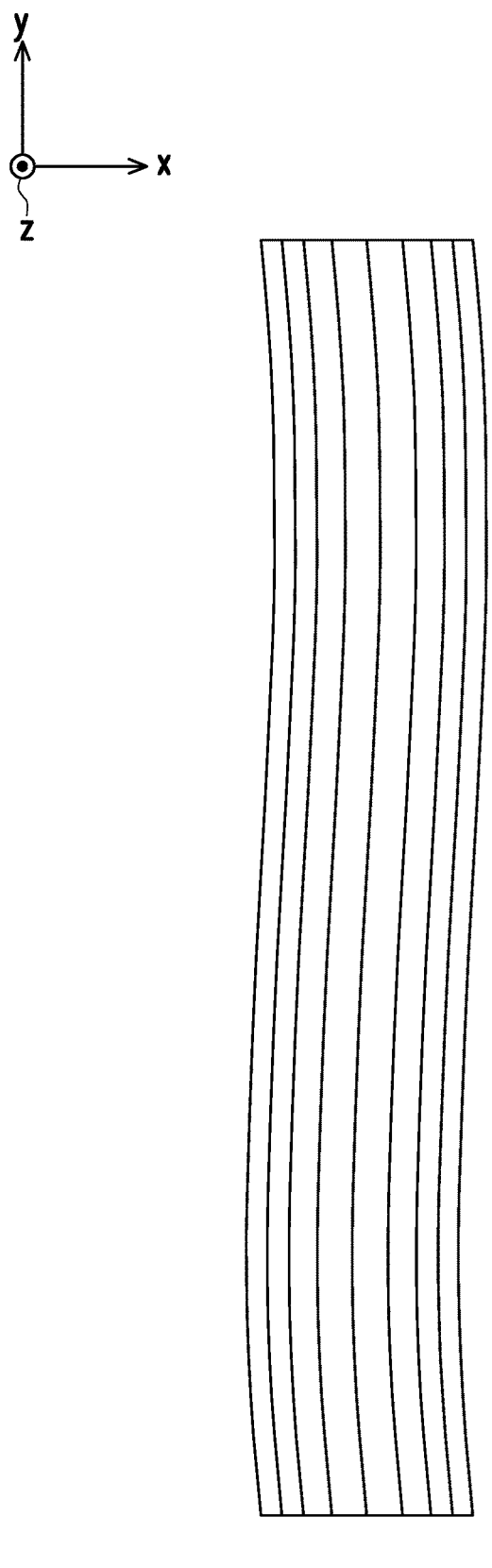
FIG. 16A is a schematic top view of a sub-optical microstructure of a second optical microstructure according to an embodiment of the invention.
Figure 16B:
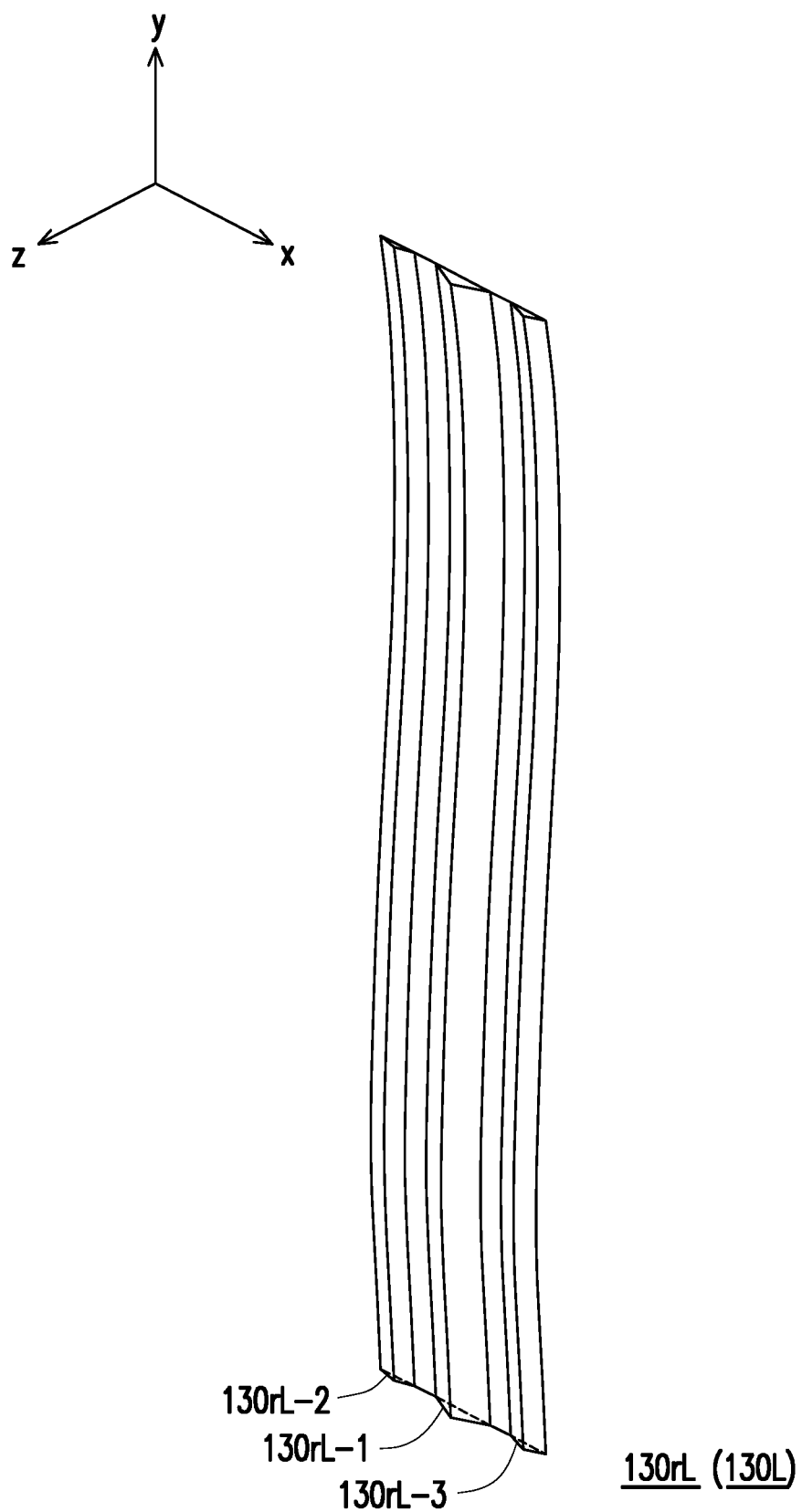
FIG. 16B is a schematic three-dimensional view of the sub-optical microstructure of the second optical microstructure according to an embodiment of the invention.

Referring to 15A and FIG. 15B, in the embodiment, a cross section of a sub-optical microstructure 130rK of a second optical microstructure 130K on the plane where the x-axis direction x and the z-axis direction z are located is approximately trapezoidal with two rounded corners FIG. 16A is a schematic top view of a sub-optical microstructure of a second optical microstructure according to an embodiment of the invention. FIG. 16B is a schematic three-dimensional view of the sub-optical microstructure of the second optical microstructure according to an embodiment of the invention. FIG. 16C is a schematic side view of the sub-optical microstructure of the second optical microstructure according to an embodiment of the invention.

Referring to FIG. 16A, FIG. 16B and FIG. 16C, in the embodiment, a sub-optical microstructure 130rL of a second optical microstructure 130L may include a first sub-optical microstructure 130rL-1, a second sub-optical microstructure 130rL-2 and a third sub-optical microstructure 130rL-3 arranged in the x-axis direction x, where the second sub-optical microstructure 130rL-2 and the third sub-optical microstructure 130rL-3 are respectively located at two sides of the first sub-optical microstructure 130rL-1. In the embodiment, a height H1 of the first sub-optical microstructure 130rL-1 in the z-axis direction z is greater than a height H2 of the second sub-optical microstructure 130rL-2 in the z-axis direction z and a height H3 of the third sub-optical microstructure 130rL-3 in the z-axis direction z. In addition, in the embodiment, the height H1 of the first sub-optical microstructure 130rL-1 in the z-axis direction z, the height H2 of the second sub-optical microstructure 130rL-2 in the z-axis direction z, and the height H3 of the third sub-optical microstructure 130rL-3 in the z-axis direction z are fixed.

Figure 17A:
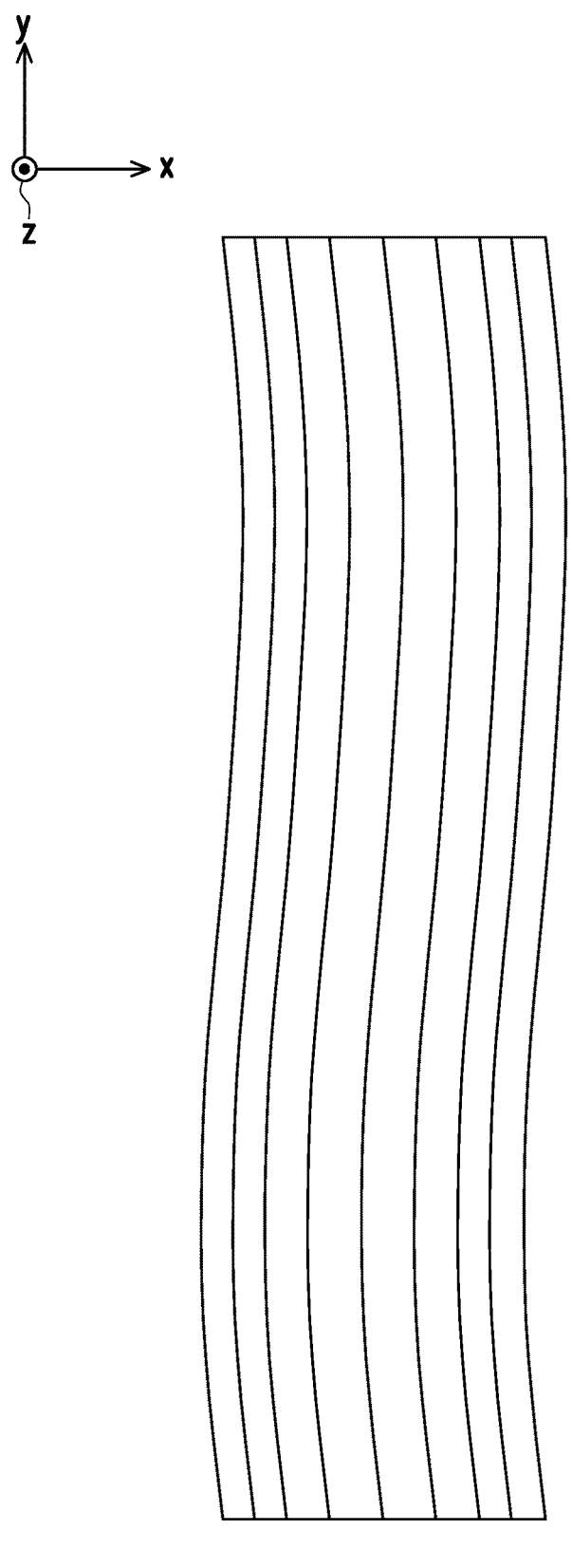
FIG. 17A is a schematic top view of a sub-optical microstructure of a second optical microstructure according to another embodiment of the invention.
Figure 17B:
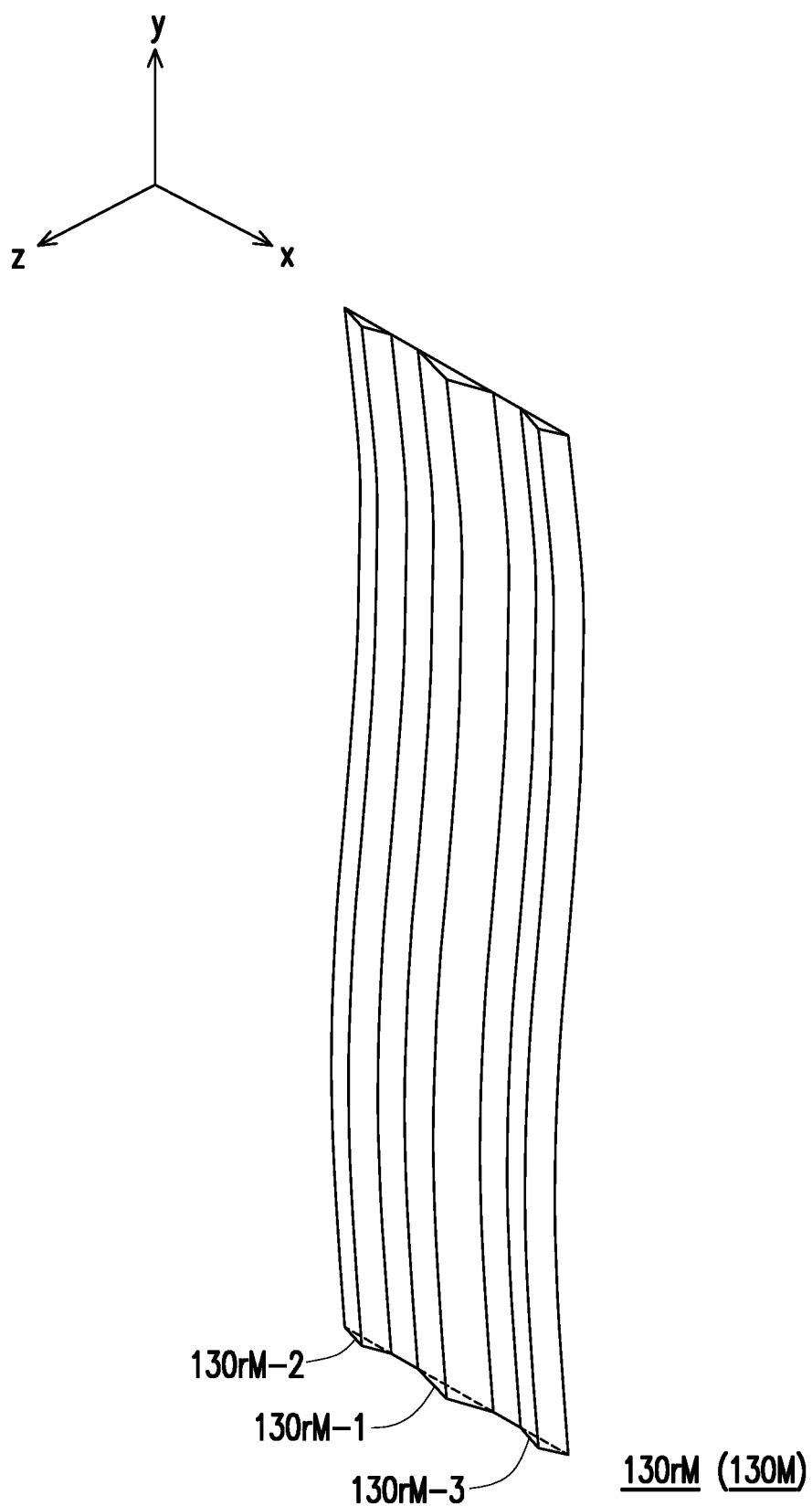
FIG. 17B is a schematic three-dimensional view of the sub-optical microstructure of the second optical microstructure according to another embodiment of the invention.
Figure 17C:
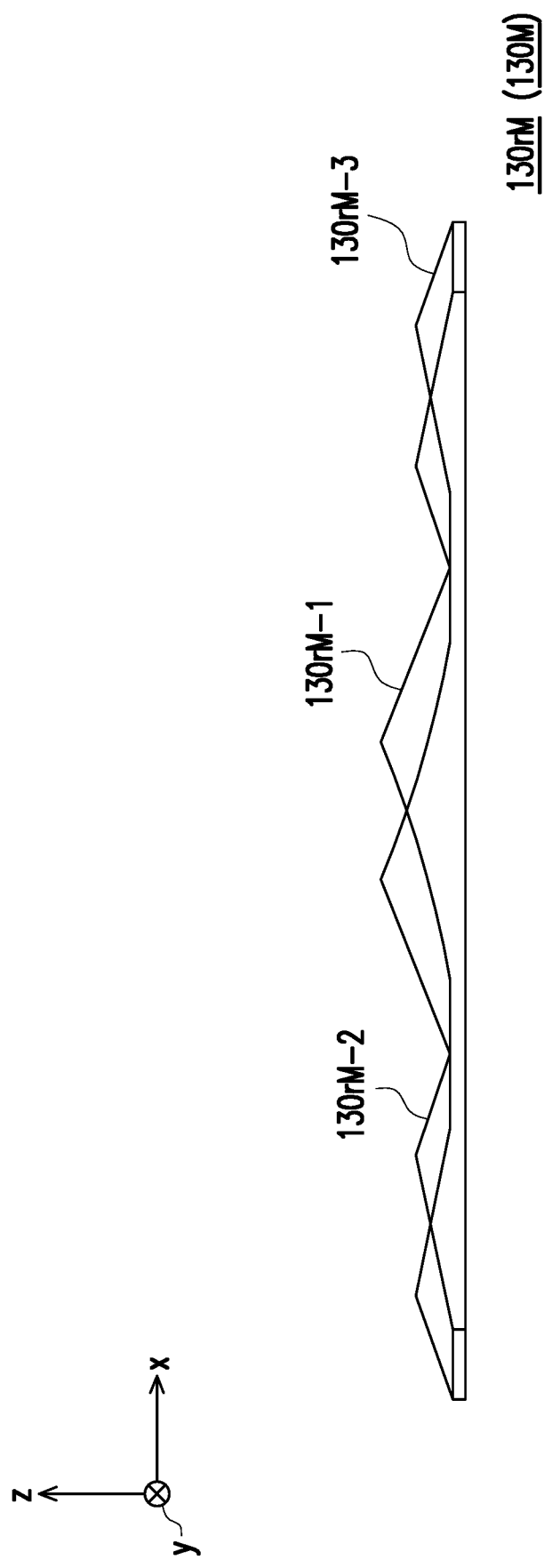
FIG. 17C is a schematic side view of the sub-optical microstructure of the second optical microstructure according to another embodiment of the invention.

FIG. 17A is a schematic top view of a sub-optical microstructure of a second optical microstructure according to another embodiment of the invention. FIG. 17B is a schematic three-dimensional view of the sub-optical microstructure of the second optical microstructure according to another embodiment of the invention. FIG. 17C is a schematic side view of the sub-optical microstructure of the second optical microstructure according to another embodiment of the invention.

A sub-optical microstructure 130rM of a second optical microstructure 130M of FIG. 17A to FIG. 17C is similar to the sub-optical microstructure 130rL of the second optical microstructure 130L of FIG. 16A to FIG. 16C, and a difference there between is that in the embodiment of FIG. 17A to FIG. 17C, the height H1 of a first sub-optical microstructure 130rM-1 in the z-axis direction z, the height H2 of a second sub-optical microstructure 130rM-2 in the z-axis direction z, and the height H3 of a third sub-optical microstructure 130rM-3 in the z-axis direction z fluctuate.

Figure 18A:
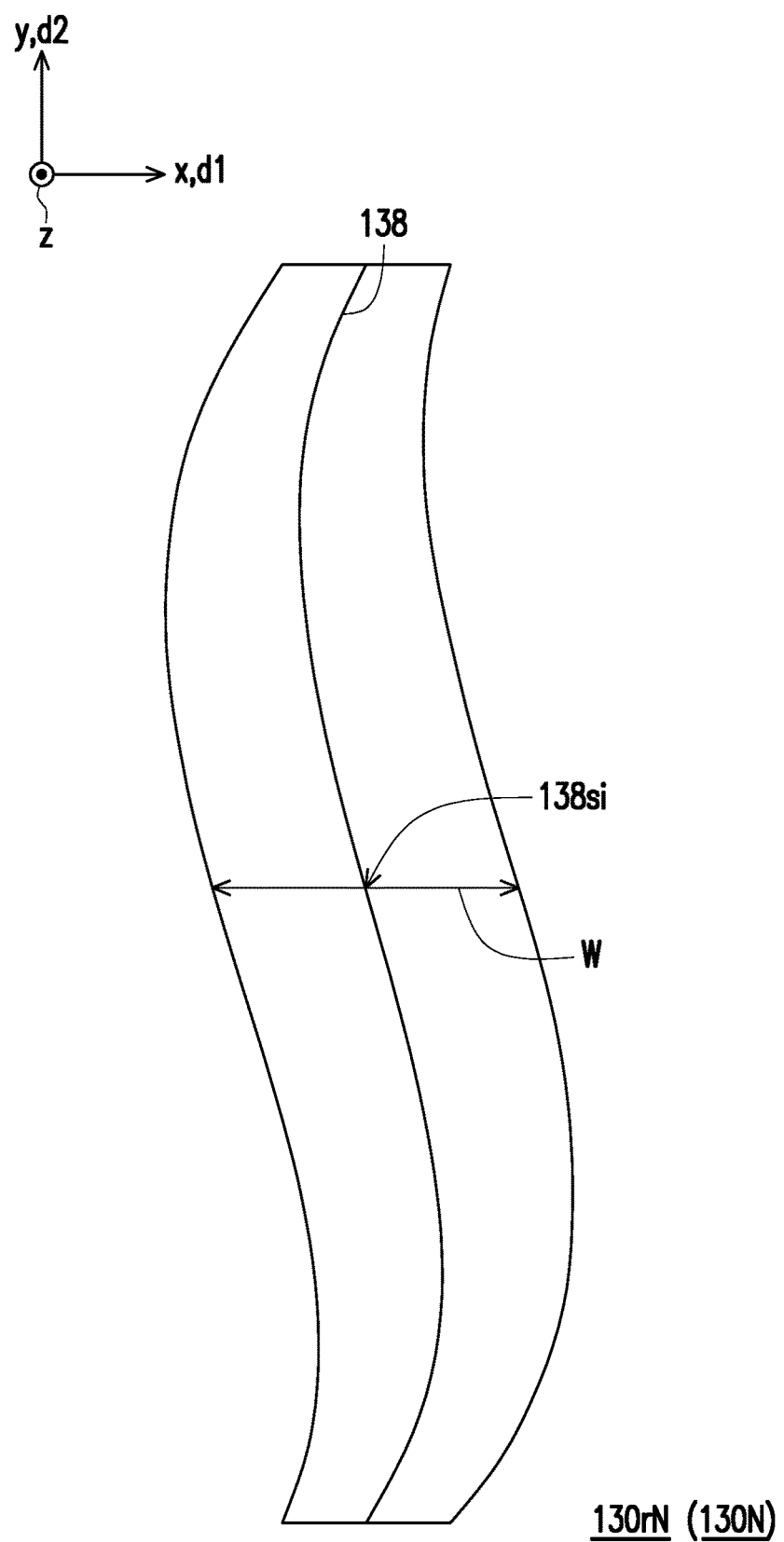
FIG. 18A is a schematic top view of a sub-optical microstructure of a second optical microstructure according to still another embodiment of the invention.
Figure 18B:
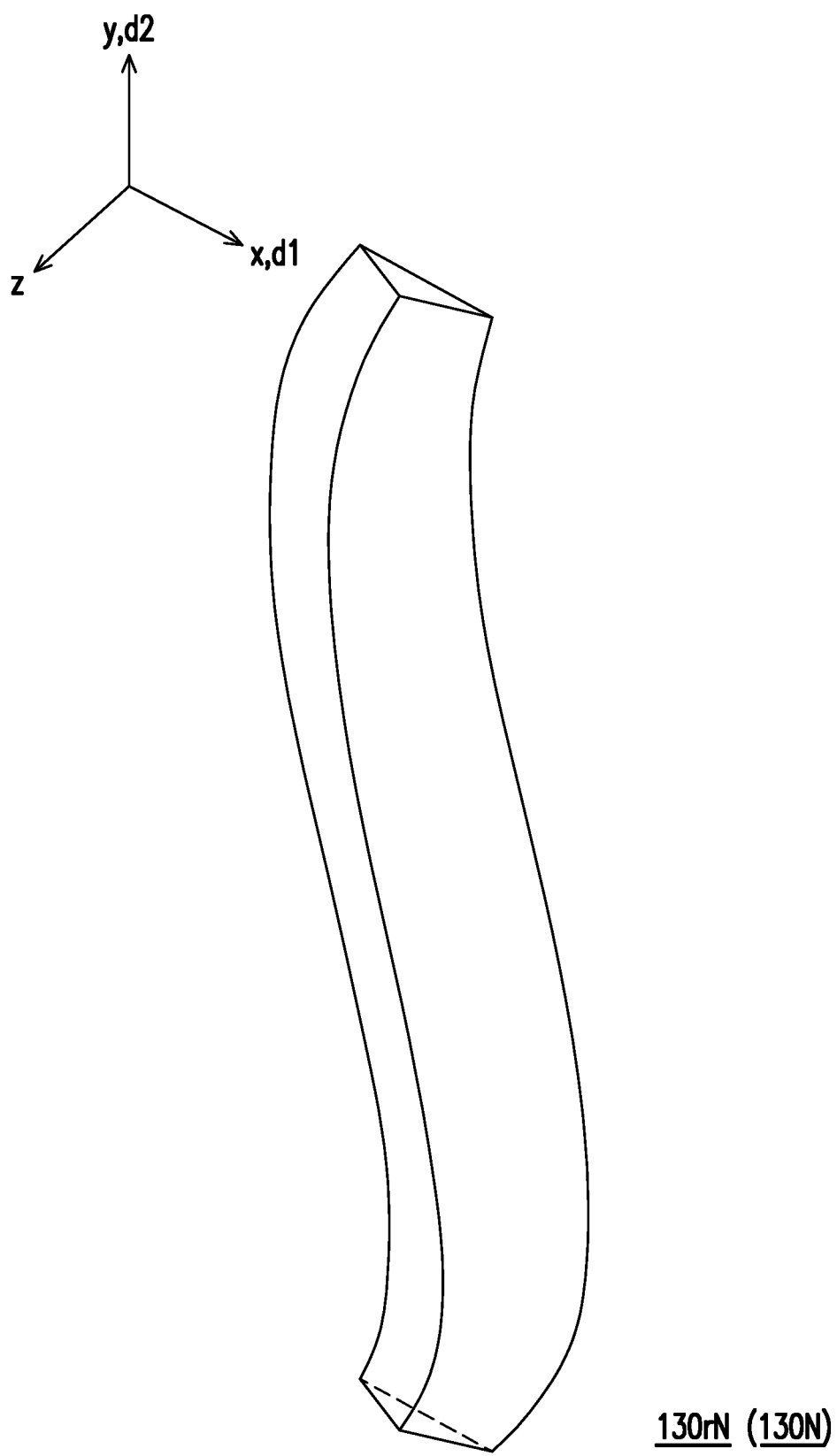
FIG. 18B is a schematic three-dimensional view of the sub-optical microstructure of the second optical microstructure according to still another embodiment of the invention.

FIG. 18A is a schematic top view of a sub-optical microstructure of a second optical microstructure according to still another embodiment of the invention. FIG. 18B is a schematic three-dimensional view of the sub-optical microstructure of the second optical microstructure according to still another embodiment of the invention.

A sub-optical microstructure 130rN of a second optical microstructure 130N of FIG. 18A to FIG. 18C is similar to the sub-optical microstructure 130r of the second optical microstructure 130 of FIG. 3A to FIG. 3B, and a difference there between is that in the embodiment of FIG. 18A to FIG. 18C, the plurality of second optical microstructures 130N are arranged in the arrangement direction d1, each second optical microstructure 130N includes the plurality of sub-optical microstructures 130rN, and the plurality of sub-optical microstructures 130rN included in each second optical microstructure 130N are arranged in the extending direction d2, and a width W of each sub-optical microstructure 130rN in the arrangement direction d1 is gradually changed. In detail, in the embodiment, the width W of the sub-optical microstructure 130rN gradually decreases from the inflection point 138si of the ridgeline 138 to the upper and lower sides.

Figure 19A:
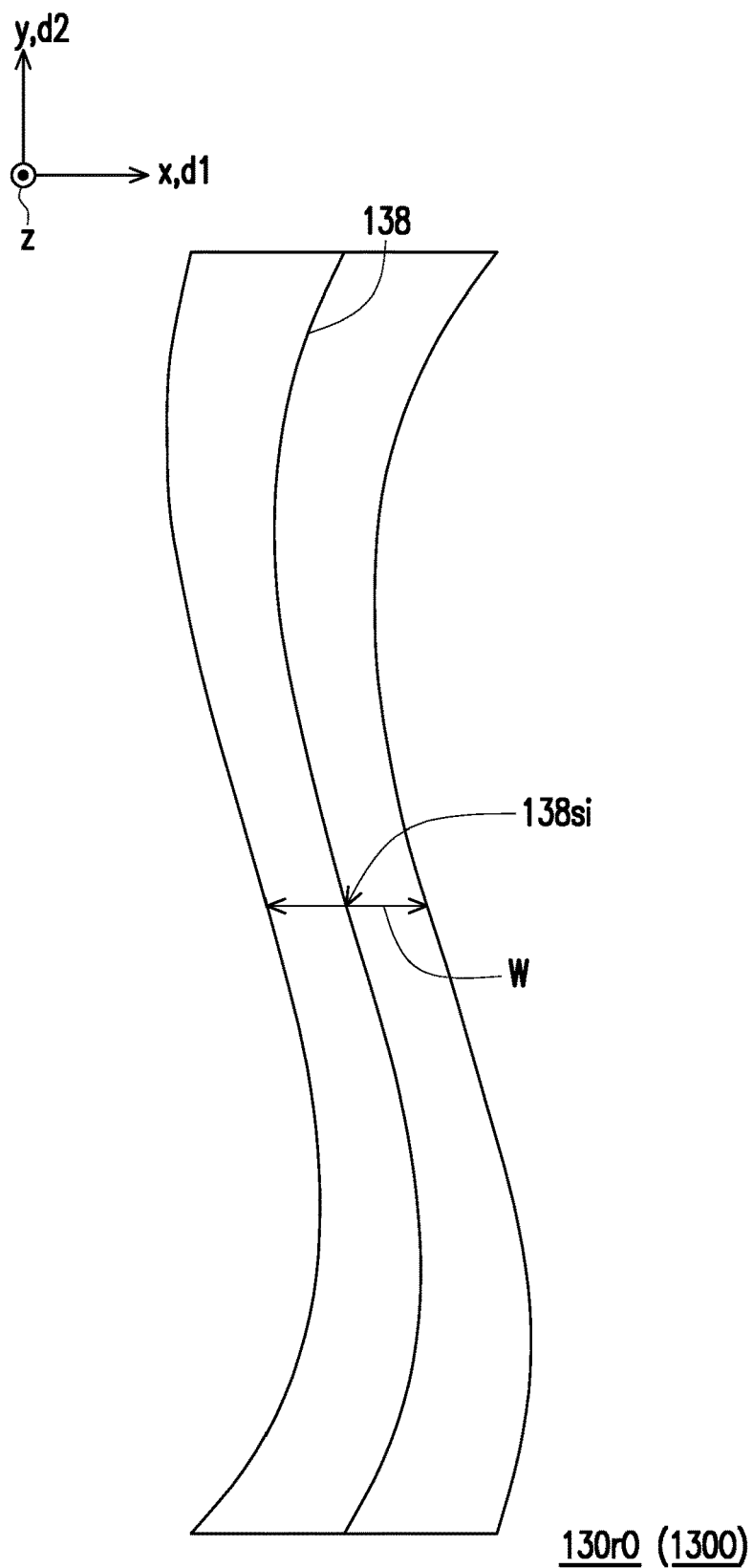
FIG. 19A is a schematic top view of a sub-optical microstructure of a second optical microstructure according to yet another embodiment of the invention.
Figure 19B:
FIG. 19B is a schematic three-dimensional view of the sub-optical microstructure of the second optical microstructure according to yet another embodiment of the invention.

FIG. 19A is a schematic top view of a sub-optical microstructure of a second optical microstructure according to yet another embodiment of the invention. FIG. 19B is a schematic three-dimensional view of the sub-optical microstructure of the second optical microstructure according to yet another embodiment of the invention.

A sub-optical microstructure 130rO of a second optical microstructure 130O of FIG. 19A to FIG. 19B is similar to the sub-optical microstructure 130rN of the second optical microstructure 130N of FIG. 18A to FIG. 18B, and a difference there between is that in the embodiment of FIG. 19A to FIG. 19C, a width W of the sub-optical microstructure 130rO in the arrangement direction d1 gradually increases from the inflection point 138si of the ridgeline 138 to the upper and lower sides.

Figure 20A:
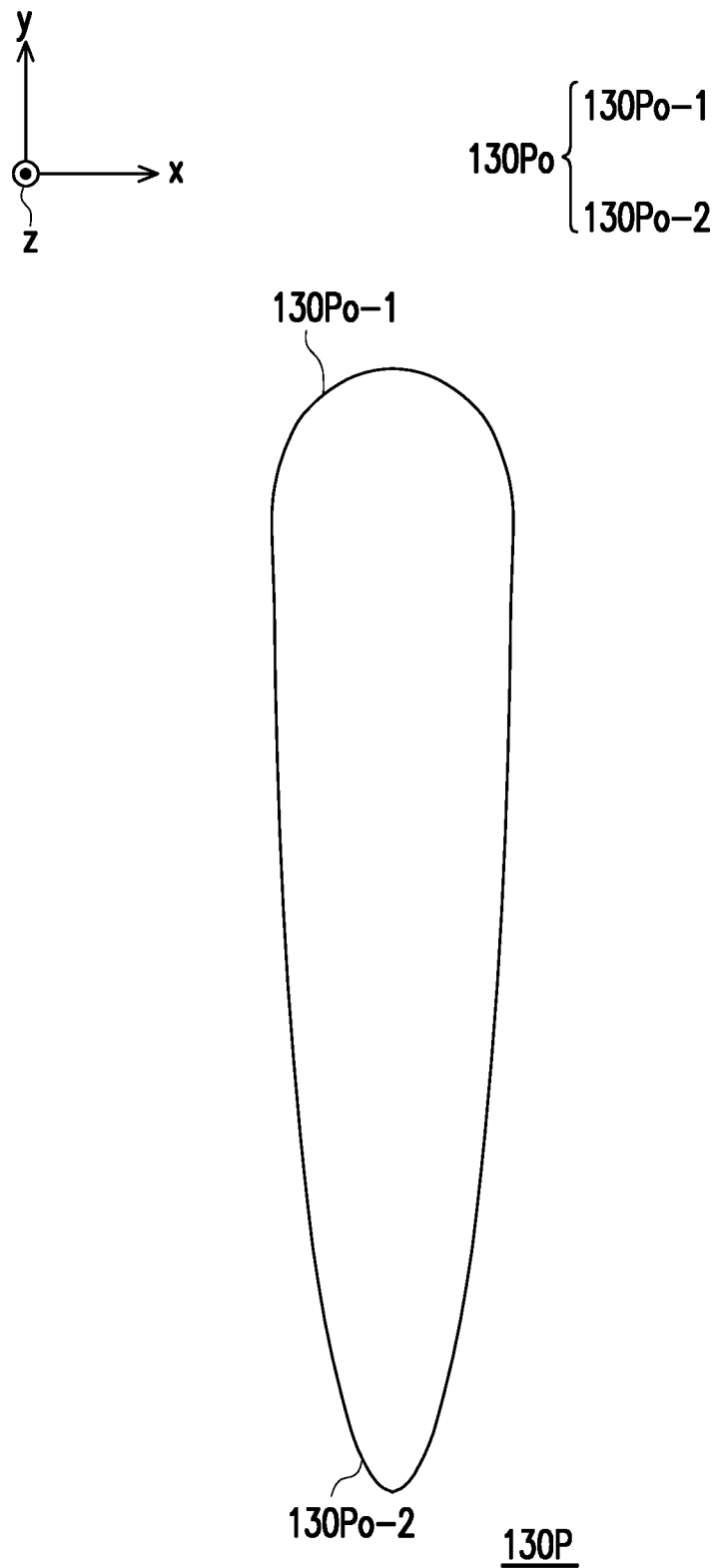
FIG. 20A is a schematic top view of a second optical microstructure according to an embodiment of the invention.
Figure 20B:
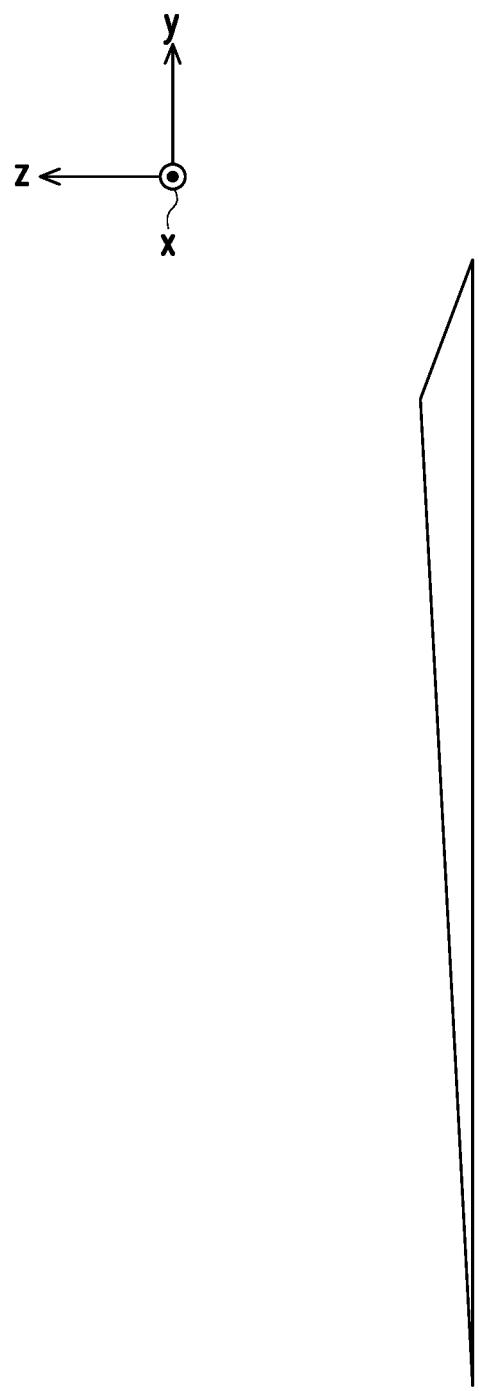
FIG. 20B is a schematic cross-sectional view of the second optical microstructure according to an embodiment of the invention.
Figure 20C:
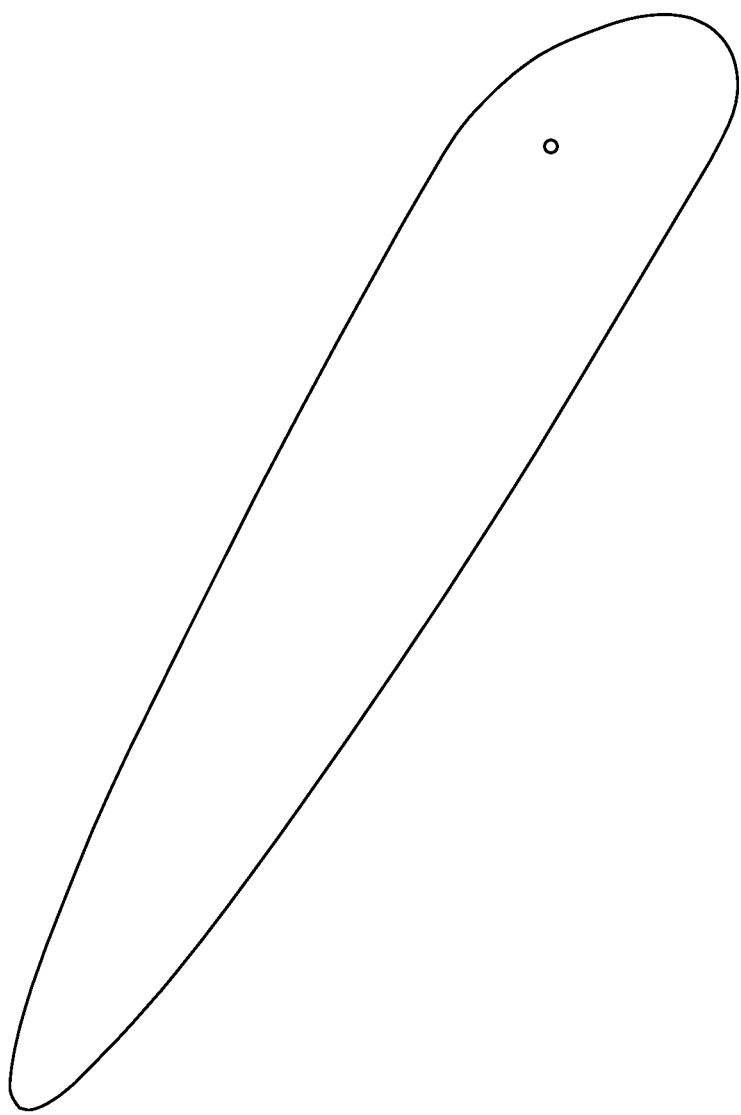
FIG. 20C is a schematic three-dimensional view of the second optical microstructure according to an embodiment of the invention.

FIG. 20A is a schematic top view of a second optical microstructure according to an embodiment of the invention. FIG. 20B is a schematic cross-sectional view of the second optical microstructure according to an embodiment of the invention. FIG. 20C is a schematic three-dimensional view of the second optical microstructure according to an embodiment of the invention.

Referring to FIG. 20A, FIG. 20B and FIG. 20C, to be specific, in the embodiment, an orthogonal projection of each second optical microstructure 130P on the bottom surface 112 (referring to FIG. 1A and FIG. 1B) has an outer profile 130Po, and the outer profile 130Po includes a first curved section 130Po-1 and a second curved section 130Po-2 disposed opposite to each other. The first curved section 130Po-1 and the second curved section 130Po-2 respectively protrude toward opposite directions. In brief, the outer profile 130Po of the second optical microstructure 130P may be approximately spindle-shaped. In addition, if a radius of curvature of the first curved section 130Po-1 is greater than a radius of curvature of the second curved section 130Po-2, a light-facing area of the second optical microstructure 130P is reduced, thereby reducing the influence on the light output distribution of the backlight module.

It should be noted that the various second optical microstructures of FIGS. 12A-20C are shown as extending along the y-axis direction y, but in other embodiments, the various second optical microstructures of FIGS. 12A-20C may also be rotated by a certain angle for placement, for example, rotated by 90 degrees, so that the second optical microstructure extends along the x-axis direction x.

Figure 21A:
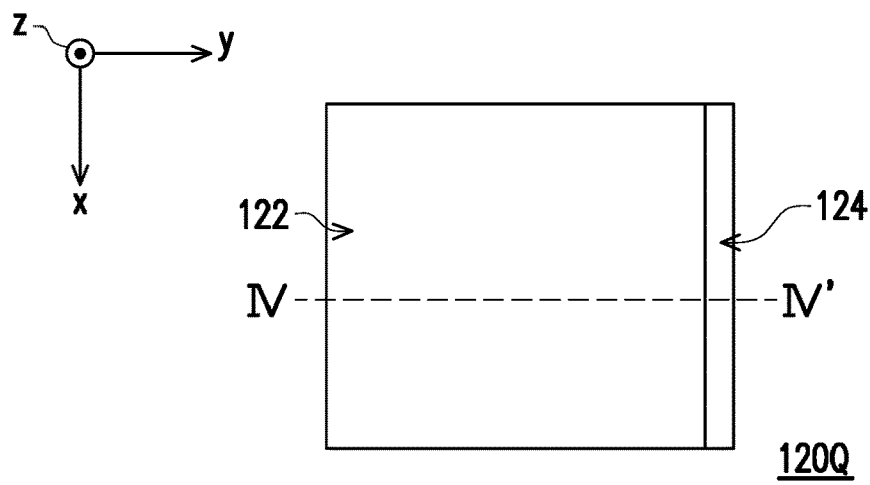
FIG. 21A is a schematic top view of a first optical microstructure according to another embodiment of the invention.
Figure 21B:
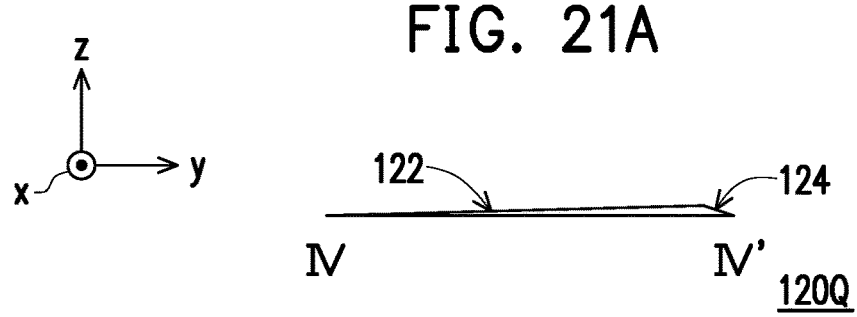
FIG. 21B is a schematic cross-sectional view of the first optical microstructure according to another embodiment of the invention.
Figure 21C:
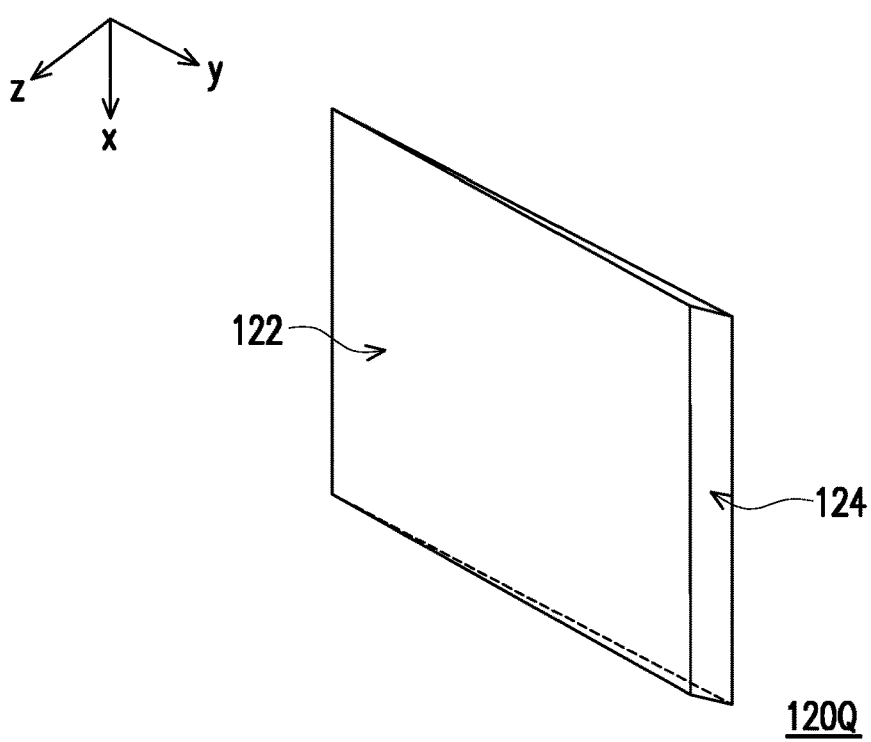
FIG. 21C is a schematic three-dimensional view of the first optical microstructure according to another embodiment of the invention.

FIG. 21A is a schematic top view of a first optical microstructure according to another embodiment of the invention. FIG. 21B is a schematic cross-sectional view of the first optical microstructure according to another embodiment of the invention. FIG. 21B corresponds to a section line IV-IV' of FIG. 21A. FIG. 21C is a schematic three-dimensional view of the first optical microstructure according to another embodiment of the invention.

Referring to FIG. 21A, FIG. 21B and FIG. 21C, a difference between a first optical microstructure 120Q of the embodiment and the aforementioned first optical microstructure 120 is that in the embodiment, an orthogonal projection of the first optical microstructure 120Q on the bottom surface 112 (referring to FIG. 1A and FIG. 1B) may be rectangular.

Figure 22A:
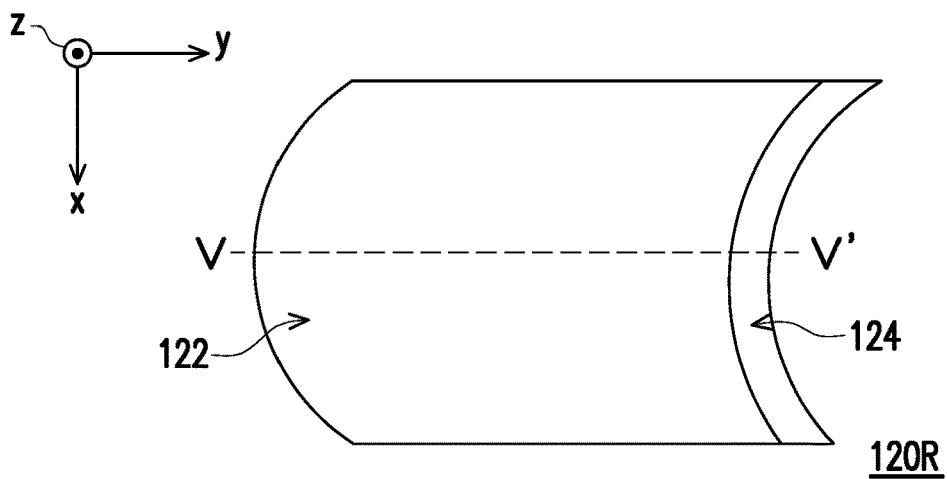
FIG. 22A is a schematic top view of a first optical microstructure according to still another embodiment of the invention.
Figure 22B:
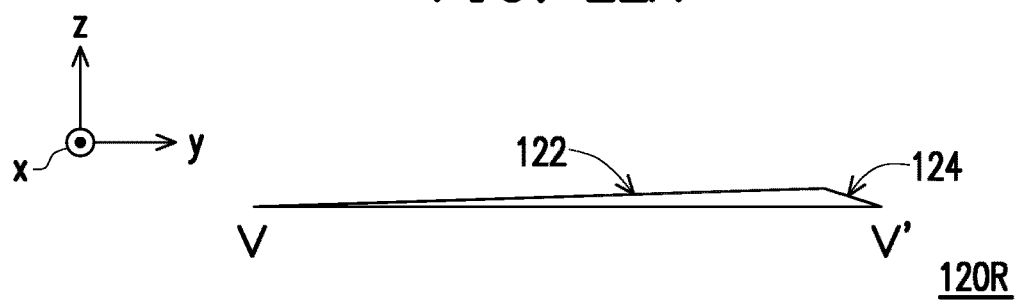
FIG. 22B is a schematic cross-sectional view of the first optical microstructure according to still another embodiment of the invention.
Figure 22C:
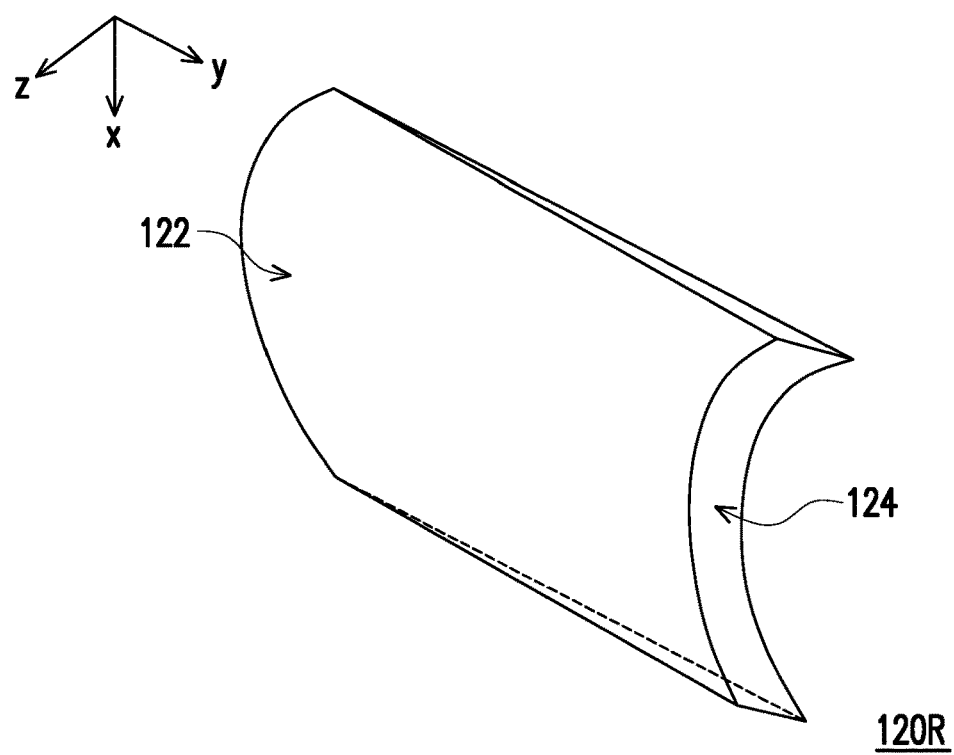
FIG. 22C is a schematic three-dimensional view of the first optical microstructure according to still another embodiment of the invention.

FIG. 22A is a schematic top view of a first optical microstructure according to still another embodiment of the invention. FIG. 22B is a schematic cross-sectional view of the first optical microstructure according to still another embodiment of the invention. FIG. 22B corresponds to a section line V-V' of FIG. 22A. FIG. 22C is a schematic three-dimensional view of the first optical microstructure according to still another embodiment of the invention.

Referring to FIG. 22A, FIG. 22B and FIG. 22C, a difference between a first optical microstructure 120R of the embodiment and the aforementioned first optical microstructure 120 is that in the embodiment, an orthogonal projection of the first optical microstructure 120R on the bottom surface 112 (referring to FIG. 1A and FIG. 1B) is similar to a shape of a floating plate.

Figure 23A:
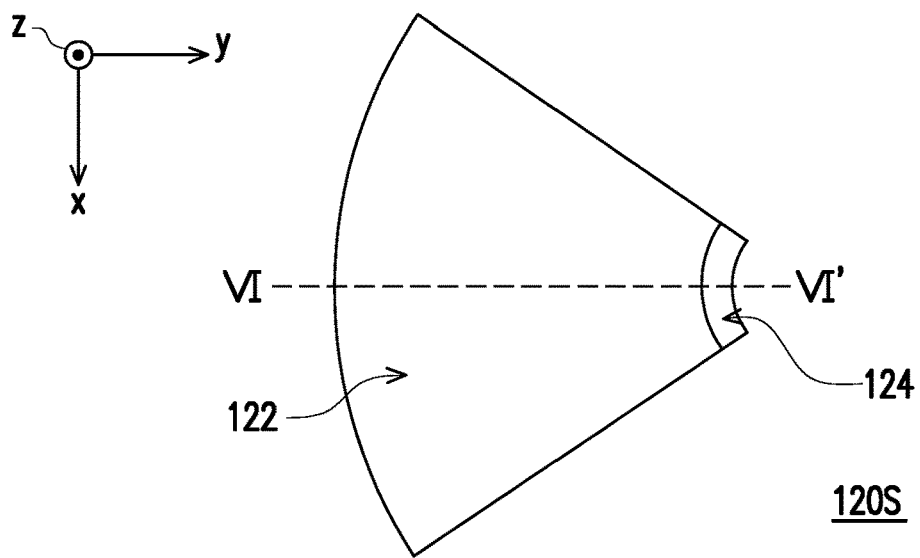
FIG. 23A is a schematic top view of a first optical microstructure according to yet another embodiment of the invention.
Figure 23B:
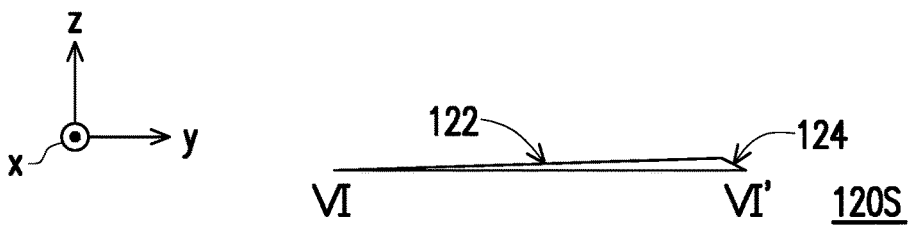
FIG. 23B is a schematic cross-sectional view of the first optical microstructure according to yet another embodiment of the invention.
Figure 23C:
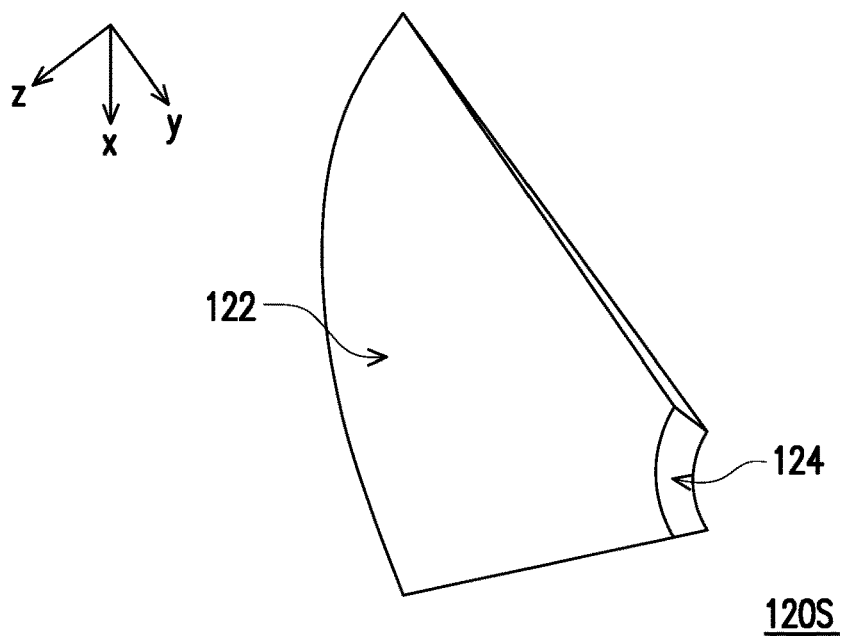
FIG. 23C is a schematic three-dimensional view of the first optical microstructure according to yet another embodiment of the invention.

FIG. 23A is a schematic top view of a first optical microstructure according to yet another embodiment of the invention. FIG. 23B is a schematic cross-sectional view of the first optical microstructure according to yet another embodiment of the invention. FIG. 23B corresponds to a section line VI-VI' of FIG. 23A. FIG. 23C is a schematic three-dimensional view of the first optical microstructure according to yet another embodiment of the invention.

Referring to FIG. 23A, FIG. 23B and FIG. 23C, a difference between a first optical microstructure 120S of the embodiment and the aforementioned first optical microstructure 120 is that in the embodiment, an orthogonal projection of the first optical microstructure 120S on the bottom surface 112 (referring to FIG. 1A and FIG. 1B) is similar to a fan shape.

Figure 24A:
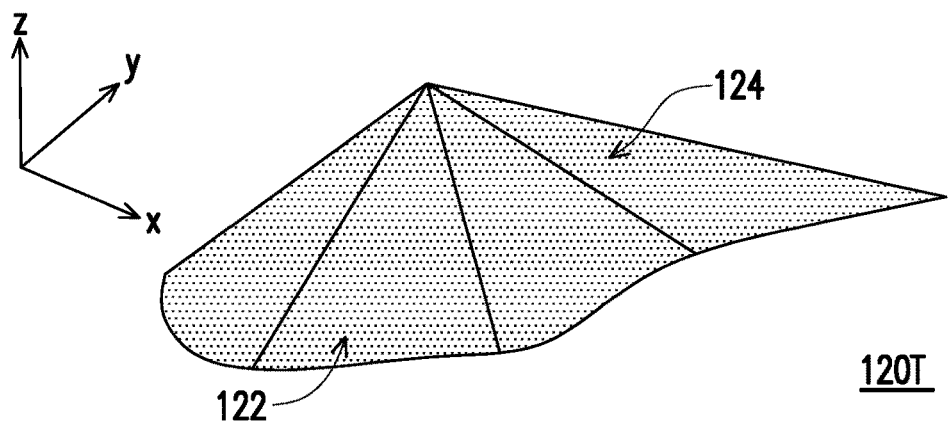
FIG. 24A is a schematic three-dimensional view of a first optical microstructure according to an embodiment of the invention.
Figure 24B:
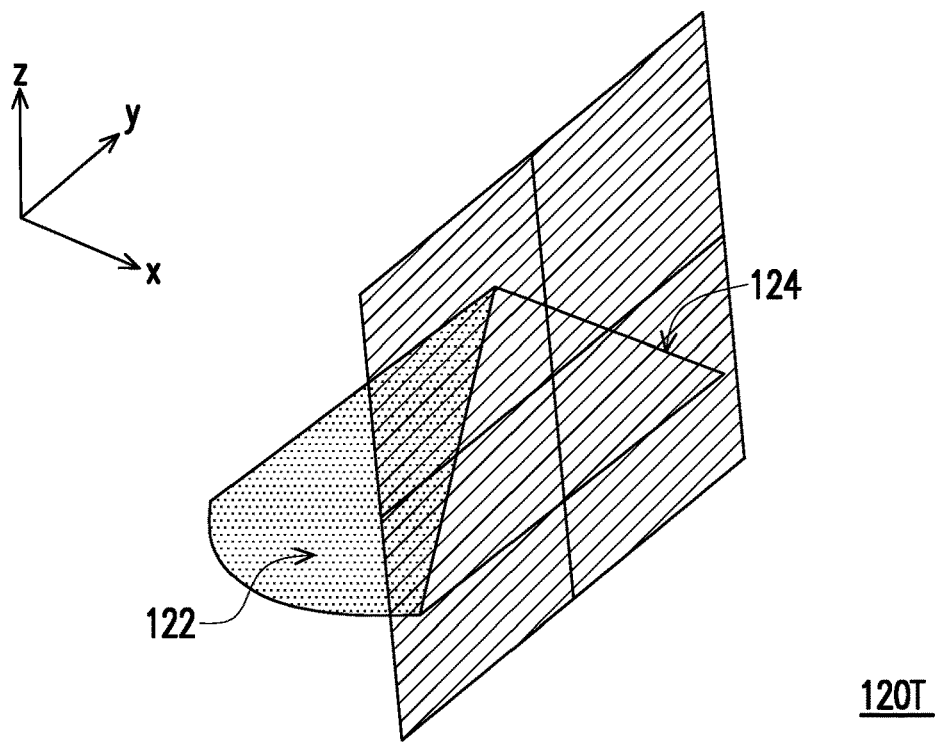
FIG. 24B is a cross section of the first optical microstructure according to an embodiment of the invention.
Figure 24C:
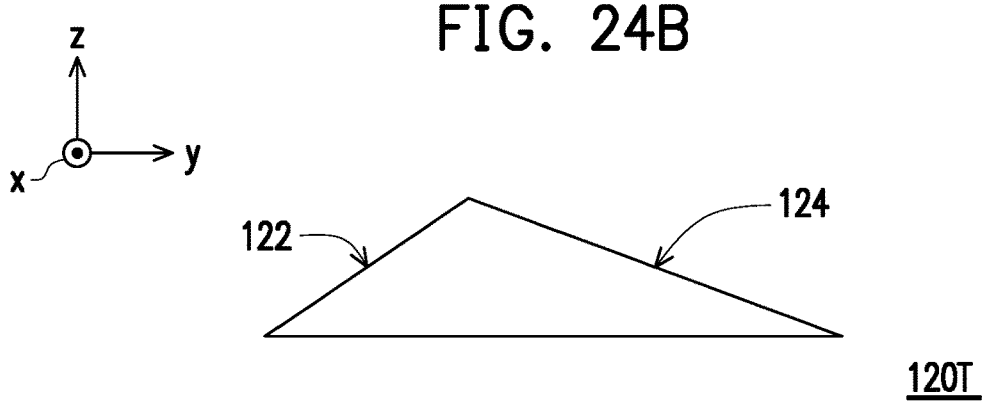
FIG. 24C is a schematic cross-sectional view of the first optical microstructure according to an embodiment of the invention.

FIG. 24A is a schematic three-dimensional view of a first optical microstructure according to an embodiment of the invention. FIG. 24B is a cross section of the first optical microstructure according to an embodiment of the invention. FIG. 24C is a schematic cross-sectional view of the first optical microstructure according to an embodiment of the invention.

Referring to FIG. 24A, FIG. 24B and FIG. 24C, a difference between a first optical microstructure 120T of the embodiment and the aforementioned first optical microstructure 120 is that in the embodiment, an orthogonal projection of the first optical microstructure 120T on the bottom surface 112 (referring to FIG. 1A and FIG. 1B) is an irregular shape.

Figure 25:
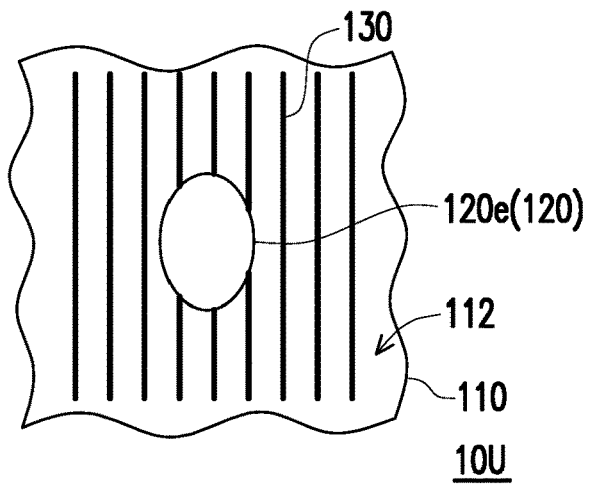
FIG. 25 is a schematic bottom view of a part of a backlight module according to yet another embodiment of the invention.

FIG. 25 is a schematic bottom view of a part of a backlight module according to yet another embodiment of the invention. A backlight module 10U of FIG. 25 is similar to the backlight module 10 of FIG. 1A, and differences there between are as follows.

In the embodiment of FIG. 1A, the plurality of second optical microstructures 130 are continuous structures and extend across at least one of the plurality of first optical microstructures 120. For example, in the embodiment of FIG. 1A, both of the first optical microstructures 120 and the second optical microstructures 130 may be structures recessed into the bottom surface 112, where the first optical microstructure 120 is recessed inward from the bottom surface 112, a part of the second optical microstructure 130 that is not overlapped with the first optical microstructure 120 is recessed inward from the bottom surface 112, and another part of the second optical microstructure 130 that is overlapped with the first optical microstructure 120 is further recessed inward from the first optical microstructure 120. In another embodiment that is not shown, the first optical microstructures 120 and the second optical microstructures 130 may also be structures protruding from the bottom surface 112, where the first optical microstructures 120 protrude outward from the bottom surface 112, and a part of the second optical microstructure 130 that is not overlapped with the first optical microstructure 120 protrudes outward from the bottom surface 112, and another part of the second optical microstructure 130 that is overlapped with the first optical microstructure 120 further protrudes outward from the first optical microstructure 120.

In the embodiment of FIG. 25, the plurality of second optical microstructures 130 are located outside one first optical microstructure 120, and the plurality of second optical microstructures 130 are connected to an edge 120e of the first optical microstructure 120.

Figure 26:
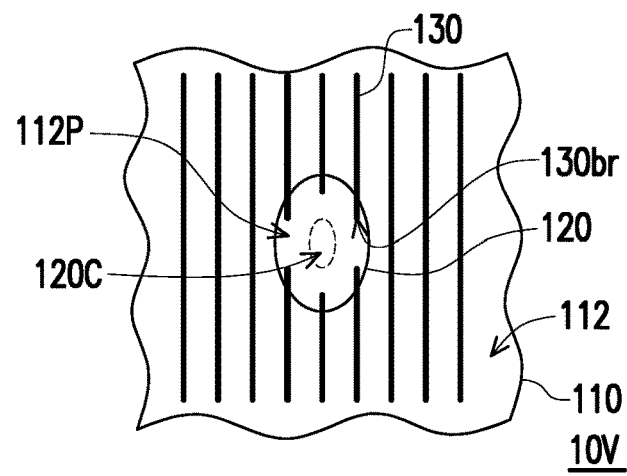
FIG. 26 is a schematic bottom view of a part of a backlight module according to an embodiment of the invention.

FIG. 26 is a schematic bottom view of a part of a backlight module according to an embodiment of the invention. A backlight module 10V of FIG. 26 is similar to the backlight module 10 of FIG. 1A, and differences there between are as follows. In the embodiment of FIG. 26, one of the plurality of first optical microstructures 120 has a central area 120C and a peripheral area 120P surrounding the central area 120C, the plurality of second optical microstructures 130 are overlapped with the peripheral area 120P of the first optical microstructure 120, and the plurality of second optical microstructures 130 have a plurality of breaks 130br overlapped with the central area 120C of the first optical microstructure 120.

Figure 27:
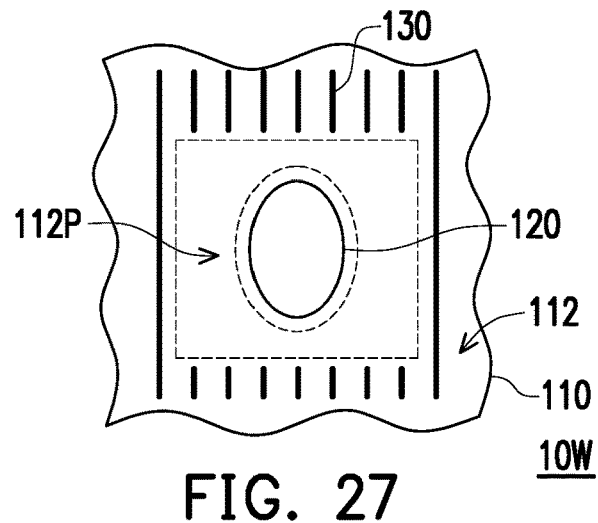
FIG. 27 is a schematic bottom view of a part of a backlight module according to another embodiment of the invention.

FIG. 27 is a schematic bottom view of a part of a backlight module according to another embodiment of the invention. A backlight module 10W of FIG. 27 is similar to the backlight module 10 of FIG. 1A, and differences there between are as follows. In the embodiment of FIG. 27, a part 112p of the bottom surface 112 surrounds one of the plurality of first optical microstructures 120, and the part 112p of the bottom surface 112 spaces apart the first optical microstructure 120 and the plurality of second optical microstructures 130.

Figure 28A:
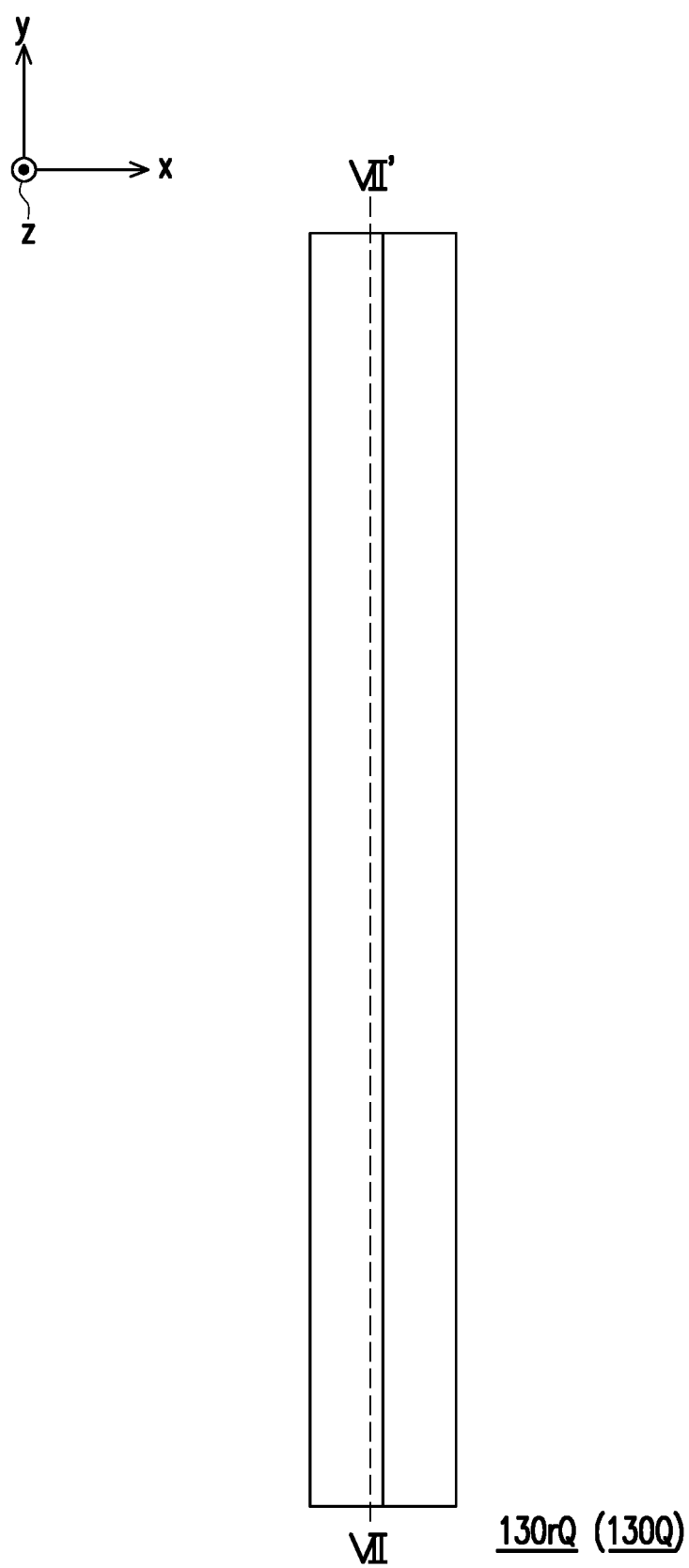
FIG. 28A is a schematic top view of a sub-optical microstructure of a second optical microstructure according to an embodiment of the invention.
Figure 28B:
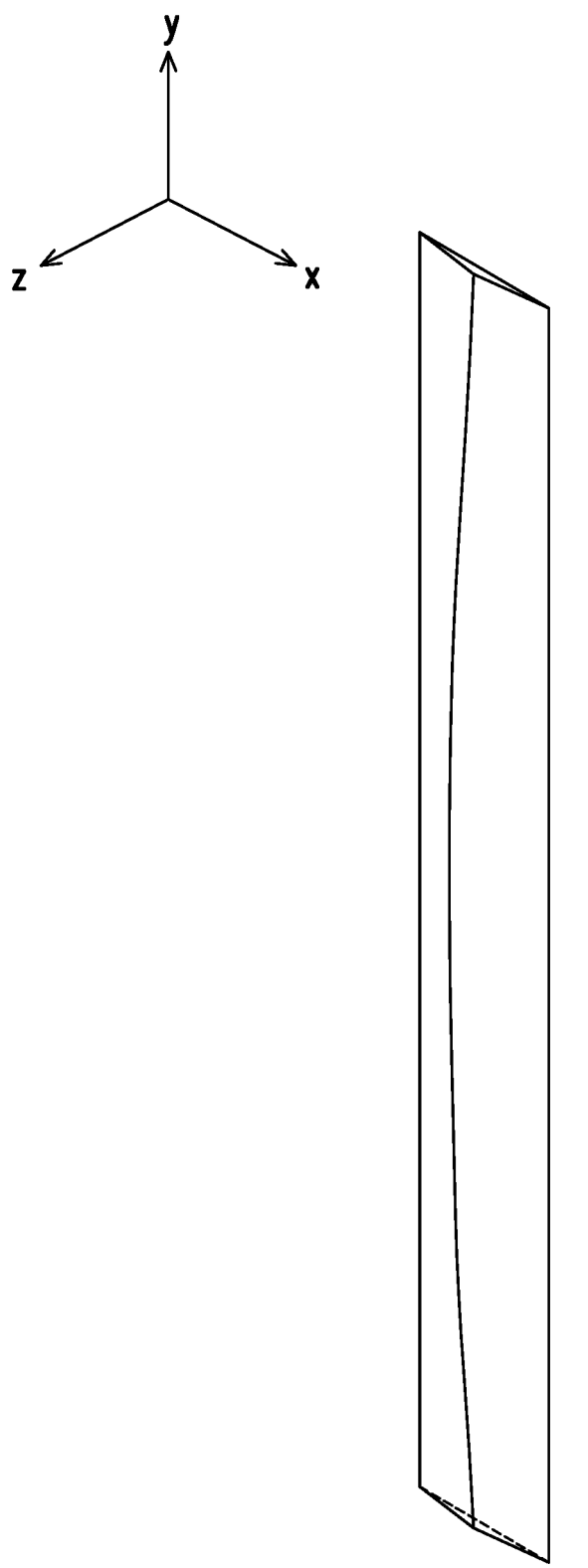
FIG. 28B is a schematic three-dimensional view of the sub-optical microstructure of the second optical microstructure according to an embodiment of the invention.
Figure 28C:
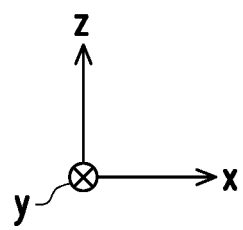
FIG. 28C is a schematic side view of the sub-optical microstructure of the second optical microstructure according to an embodiment of the invention.
Figure 28C:
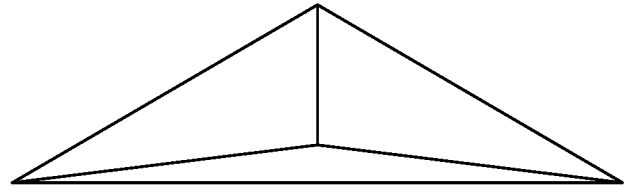
Figure 28D:
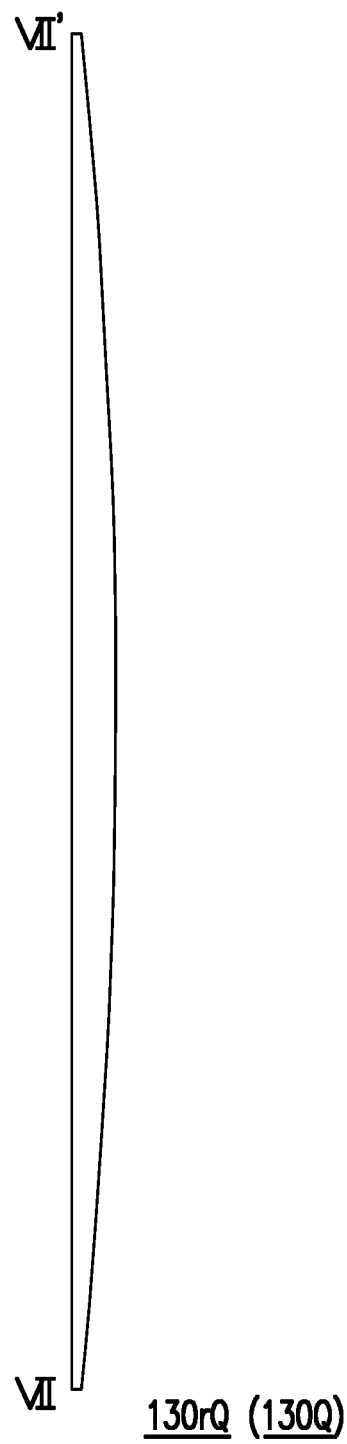
FIG. 28D is a schematic cross-sectional view of the sub-optical microstructure of the second optical microstructure according to an embodiment of the present invention.

FIG. 28A is a schematic top view of a sub-optical microstructure of a second optical microstructure according to an embodiment of the invention. FIG. 28B is a schematic three-dimensional view of the sub-optical microstructure of the second optical microstructure according to an embodiment of the invention. FIG. 28C is a schematic side view of the sub-optical microstructure of the second optical microstructure according to an embodiment of the invention. FIG. 28D is a schematic cross-sectional view of the sub-optical microstructure of the second optical microstructure according to an embodiment of the present invention. FIG. 28D corresponds to a section line VII-VII' of FIG. 28A.

Referring to FIG. 28A, FIG. 28B, FIG. 28C and FIG. 28D, in the embodiment, a sub-optical microstructure 130rQ of a second optical microstructure 130Q may be curved in the z-axis direction z, i.e., a height of the sub-optical microstructure 130rQ in the z-axis direction z fluctuates. In addition, the second optical microstructure 130Q may be used in the backlight module 10C of FIG. 8 to serve as the second optical microstructure 130C in FIG. 8, or may be used in the backlight module 10D in FIG. 9 to serve as the second optical microstructure 130D in FIG. 9, specifically, an orthogonal projection of the sub-optical microstructure 130rQ of the second optical microstructure 130Q on the bottom surface 112 of FIG. 8 or FIG. 9 is a linear stripe pattern.

In summary, the backlight module of an embodiment of the invention includes the light guide element and the light-emitting element disposed beside the light incident surface of the light guide element. The light guide element includes a plurality of first optical microstructures and a plurality of second optical microstructures that are recessed into or protrude from the bottom surface of the main body, where at least one of the plurality of second optical microstructures is disposed between two adjacent first optical microstructures. In particular, the value of $\tan^{-1}(\Delta H/\Delta L)$ calculated according to the height difference and the length difference between the peak point and the valley points of the projection of the second optical microstructure on the reference plane perpendicular to the light incident surface is less than or equal to a half of the first angle of the first optical microstructure.

The first optical microstructures are used for deflecting the light beam emitted by the light-emitting element out of the light guide element. The second optical microstructures are used to make enough air gaps existing between the light guide element and the reflective sheet, so as to avoid the adsorption between the reflective sheet and the light guide element, thereby mitigating the adverse caused by the adsorption between the reflective sheet and the light guide element. In addition, since the value of $\tan^{-1}(\Delta H/\Delta L)$ calculated according to the height difference and length difference between the peak point and the valley points of the projection of the second optical microstructure on the reference plane perpendicular to the light incident surface is less than or equal to a half of the first angle of the first optical microstructure, while the second optical microstructures are used to avoid the adsorption between the reflective sheet and the light guide element, the arrangement of the second optical microstructures will not excessively affect the light output distribution of the backlight module.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide element, comprising
a main body having a bottom surface, a light emitting surface opposite to the bottom surface, and a light incident surface connected between the light emitting surface and the bottom surface;
a plurality of first optical microstructures disposed on the bottom surface, each of the first optical microstructures having a first surface, wherein the first surface is configured to deflect a light beam out of the light emitting surface, a first acute angle is included between the first surface and the bottom surface, the first acute angle is a first angle of the first optical microstructures, and an angle value of the first angle is V1, where V1>0; and
a plurality of second optical microstructures disposed on the bottom surface, at least one of the second optical microstructures disposed between adjacent two of the first optical microstructures, the plurality of second optical microstructures comprising a plurality of sub-optical microstructures, wherein
a projection of each of the sub-optical microstructures on a reference plane perpendicular to the light incident surface has a peak point farthest from the bottom surface and a first valley point and a second valley point closest to the bottom surface, the peak point is located between the first valley point and the second valley point, a height difference between the peak point and one of the first valley point and the second valley point in a z-axis direction perpendicular to the bottom surface is ΔH, a length difference between the peak point and the one of the first valley point and the second valley point in a y-axis direction perpendicular to the light incident surface is ΔL, and a value obtained by $\tan^{-1}(\Delta H/\Delta L)$ is V2, where V2>0 and V2≤0.5·V1 wherein an orthogonal projection of each of the sub-optical microstructures on the bottom surface comprises a curved pattern, the curved pattern comprises a first sub-curved pattern and a second sub-curved pattern respectively protruding toward opposite directions, and the plurality of first sub-curved patterns and the plurality of second sub-curved patterns of the plurality of sub-optical microstructures comprised in each of the second optical microstructures are alternately arranged and are connected to each other.

2. The light guide element according to claim 1, wherein an arrangement density of the plurality of first optical microstructures increases as a distance from the plurality of first optical microstructures to the light incident surface increases, and an arrangement density of the plurality of second optical microstructures decreases as a distance from the plurality of second optical microstructures to the light incident surface increases.

3. The light guide element according to claim 1, wherein the plurality of second optical microstructures are arranged in an arrangement direction, and in a region of the bottom surface close to the light incident surface, adjacent two of the plurality of first optical microstructures have a first pitch in the arrangement direction, adjacent two of the plurality of second optical microstructures have a second pitch in the arrangement direction, and the second pitch is smaller than the first pitch.

4. The light guide element according to claim 1, wherein each of the sub-optical microstructures has a ridgeline, an orthogonal projection of the ridgeline on the bottom surface comprises a repeating line segment, the repeating line segment comprises a first sub-line segment and a second sub-line segment respectively protruding toward opposite directions, wherein the first sub-line segment and the second sub-line segment are connected at an inflection point of the repeating line segment, a first reference line is tangent to a vertex of the first sub-line segment, a second reference line is tangent to a vertex of the second sub-line segment, a third reference line passes through the inflection point and is parallel to the first reference line and the second reference line, the repeating line segment has a length L, the first reference line and the third reference line have a first distance D1, and the second reference line and the third reference line have a second distance D2, where (D1+D2)<L/10.

5. The light guide element according to claim 1, wherein the plurality of second optical microstructures are arranged in an arrangement direction, the plurality of sub-optical microstructures are connected to each other in an extending direction, and the arrangement direction is intersected with the extending direction.

6. The light guide element according to claim 1, wherein the plurality of second optical microstructures are arranged in an arrangement direction, the plurality of sub-optical microstructures are spaced apart from each other in an extending direction, and the arrangement direction is intersected with the extending direction.

7. The light guide element according to claim 1, wherein each of the second optical microstructures comprises a side surface and an opposing surface, the opposing surface is disposed opposite to the bottom surface, the side surface is connected between the bottom surface and the opposing surface, the side surface and the bottom surface have a first boundary, the side surface and the opposing surface have a second boundary, an orthogonal projection of the second boundary on the bottom surface is located within an orthogonal projection of the first boundary on the bottom surface, and a shape of the orthogonal projection of the first boundary is different from a shape of the orthogonal projection of the second boundary.

8. The light guide element according to claim 1, wherein an orthogonal projection of each of the second optical microstructures on the bottom surface has an outer profile, the outer profile comprises a first curved section and a second curved section disposed opposite to each other, and the first curved section and the second curved section respectively protrude toward opposite directions.

9. The light guide element according to claim 1, wherein the plurality of second optical microstructures are arranged in an arrangement direction, the plurality of sub-optical microstructures comprised in each of the second optical microstructures are arranged in an extending direction, the arrangement direction is intersected with the extending direction, and the extending direction is perpendicular to the light incident surface.

10. The light guide element according to claim 1, wherein the plurality of second optical microstructures are arranged in an arrangement direction, the plurality of sub-optical microstructures comprised in each of the second optical microstructures are arranged in an extending direction, the arrangement direction is intersected with the extending direction, and the extending direction is parallel to the light incident surface.

11. The light guide element according to claim 1, wherein the plurality of second optical microstructures are arranged in an arrangement direction, the plurality of sub-optical microstructures comprised in each of the second optical microstructures are arranged in an extending direction, the arrangement direction is intersected with the extending direction, the plurality of sub-optical microstructures are curved in the z-axis direction, and the z-axis direction is perpendicular to the arrangement direction and the extending direction.

12. The light guide element according to claim 1, wherein the plurality of second optical microstructures are arranged in an arrangement direction, the plurality of sub-optical microstructures comprised in each of the second optical microstructures are arranged in an extending direction, the arrangement direction is intersected with the extending direction, and a width of each of the plurality of sub-optical microstructures is gradually changed in the arrangement direction.

13. The light guide element according to claim 1, wherein the plurality of second optical microstructures are located outside one of the plurality of first optical microstructures, and the plurality of second optical microstructures are connected to an edge of the first optical microstructure.

14. The light guide element according to claim 1, wherein one of the plurality of first optical microstructures has a central area and a peripheral area surrounding the central area, the plurality of second optical microstructures are overlapped with the peripheral area of the first optical microstructure, and the plurality of second optical microstructures have a plurality of breaks overlapped with the central area of the first optical microstructure.

15. The light guide element according to claim 1, wherein the plurality of second optical microstructures are continuous structures and extend across one of the plurality of first optical microstructures.

16. The light guide element according to claim 1, wherein a part of the bottom surface surrounds one of the plurality of first optical microstructures, and the part of the bottom surface spaces apart the first optical microstructure and the plurality of second optical microstructures.

17. The light guide element according to claim 1, wherein $0.5 \leq V1 \leq 30$.

18. The light guide element according to claim 1, wherein the bottom surface has a square partition region, and a side length of the partition region is 20 mm, in the partition region, adjacent two of the plurality of first optical microstructures have a first pitch, and if the first pitch is greater than 60 μm, at least one of the plurality of second optical microstructures is disposed between adjacent two of the plurality of first optical microstructures.

19. The light guide element according to claim 1, wherein the plurality of first optical microstructures and the plurality of second optical microstructures are recessed into the bottom surface.

20. The light guide element according to claim 1, wherein the plurality of first optical microstructures and the plurality of second optical microstructures are protruding from the bottom surface.

21. A backlight module, comprising
a light guide element comprising
a main body having a bottom surface, a light emitting surface opposite to the bottom surface, and a light incident surface connected between the light emitting surface and the bottom surface;
a plurality of first optical microstructures disposed on the bottom surface, each of the first optical microstructures having a first surface, wherein the first surface is configured to deflect a light beam out of the light emitting surface, a first acute angle is included between the first surface and the bottom surface, the first acute angle is a first angle of the first optical microstructures, and an angle value of the first angle is V1, where V1>0; and
a plurality of second optical microstructures disposed on the bottom surface, at least one of the second optical microstructures disposed between adjacent two of the first optical microstructures, the plurality of second optical microstructures comprising a plurality of sub-optical microstructures, wherein
a projection of each of the sub-optical microstructures on a reference plane perpendicular to the light incident surface has a peak point farthest from the bottom surface and a first valley point and a second valley point closest to the bottom surface, the peak point is located between the first valley point and the second valley point, a height difference between the peak point and one of the first valley point and the second valley point in a z-axis direction perpendicular to the bottom surface is ΔH, a length difference between the peak point and the one of the first valley point and the second valley point in a y-axis direction perpendicular to the light incident surface is ΔL, and a value obtained by $\tan^{-1}(\Delta H/\Delta L)$ is V2, where V2>0 and $V2 \leq 0.5 \cdot V1$; and
a light-emitting element arranged beside the light incident surface wherein an orthogonal projection of each of the sub-optical microstructures on the bottom surface comprises a curved pattern, the curved pattern comprises a first sub-curved pattern and a second sub-curved pattern respectively protruding toward opposite directions, and the plurality of first sub-curved patterns and the plurality of second sub-curved patterns of the plurality of sub-optical microstructures comprised in each of the second optical microstructures are alternately arranged and are connected to each other.

22. The backlight module according to claim 21, wherein the plurality of first optical microstructures and the plurality of second optical microstructures are recessed into the bottom surface.

23. The backlight module according to claim 21, wherein the plurality of first optical microstructures and the plurality of second optical microstructures are protruding from the bottom surface.

* * * * *